United States Patent
Engelke et al.

(10) Patent No.: US 12,035,070 B2
(45) Date of Patent: *Jul. 9, 2024

(54) CAPTION MODIFICATION AND AUGMENTATION SYSTEMS AND METHODS FOR USE BY HEARING ASSISTED USER

(71) Applicant: Ultratec, Inc., Madison, WI (US)

(72) Inventors: Christopher Engelke, Verona, WI (US); Kevin R. Colwell, Middleton, WI (US); Robert M. Engelke, Madison, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,445

(22) Filed: Nov. 10, 2022

(65) Prior Publication Data
US 2023/0066793 A1    Mar. 2, 2023

Related U.S. Application Data

(63) Continuation of application No. 17/180,702, filed on Feb. 19, 2021, now Pat. No. 11,539,900.
(Continued)

(51) Int. Cl.
*H04N 5/278* (2006.01)
*H04M 3/42* (2006.01)
(Continued)

(52) U.S. Cl.
CPC ........ *H04N 5/278* (2013.01); *H04M 3/42042* (2013.01); *H04M 3/42382* (2013.01);
(Continued)

(58) Field of Classification Search
None
See application file for complete search history.

(56) References Cited

U.S. PATENT DOCUMENTS

| 2,004,253 A | 6/1935 | Tasker |
| 3,372,246 A | 3/1968 | Knuepfer et al. |

(Continued)

FOREIGN PATENT DOCUMENTS

| CN | 102572372 A | 7/2012 |
| DE | 2647097 | 4/1978 |

(Continued)

OTHER PUBLICATIONS

In the United States Patent and Trademark Office Before the Patent Trial and Appeal Board, Petitioner's Reply to Patent Owner's Response, *CaptionCall LLC v. Ultratec Inc.*, Case IPR2014-00780, U.S. Pat. No. 6,603,835, Apr. 20, 2015, 30 pages.

(Continued)

*Primary Examiner* — Hemant S Patel
(74) *Attorney, Agent, or Firm* — Quarles & Brady LLP

(57) ABSTRACT

A system and method for facilitating communication between an assisted user (AU) and a hearing user (HU) includes receiving an HU voice signal as the AU and HU participate in a call using AU and HU communication devices, transcribing HU voice signal segments into verbatim caption segments, processing each verbatim caption segment to identify an intended communication (IC) intended by the HU upon uttering an associated one of the HU voice signal segments, for at least a portion of the HU voice signal segments (i) using an associated IC to generate an enhanced caption different than the associated verbatim caption, (ii) for each of a first subset of the HU voice signal segments, presenting the verbatim captions via the AU communication device display for consumption, and (iii) for each of a second subset of the HU voice signal segments, presenting enhanced captions via the AU communication device display for consumption.

20 Claims, 15 Drawing Sheets

Related U.S. Application Data

(60) Provisional application No. 62/979,708, filed on Feb. 21, 2020.

(51) Int. Cl.

| | | |
|---|---|---|
| *H04M 11/00* | (2006.01) | |
| *H04N 21/239* | (2011.01) | |
| *H04N 21/431* | (2011.01) | |
| *H04N 21/439* | (2011.01) | |
| *H04N 21/488* | (2011.01) | |

(52) U.S. Cl.
CPC ....... *H04M 3/42391* (2013.01); *H04M 11/00* (2013.01); *H04N 21/2393* (2013.01); *H04N 21/4394* (2013.01); *H04N 21/4884* (2013.01); *H04N 21/4316* (2013.01)

(56) References Cited

U.S. PATENT DOCUMENTS

| | | |
|---|---|---|
| 3,507,997 A | 4/1970 | Weitbrecht |
| 3,515,814 A | 6/1970 | Morgan et al. |
| 3,585,303 A | 6/1971 | Chieffo et al. |
| 3,598,920 A | 8/1971 | Fischer et al. |
| 3,800,089 A | 3/1974 | Reddick |
| 3,896,267 A | 7/1975 | Sachs et al. |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes et al. |
| 4,307,266 A | 12/1981 | Messina |
| 4,354,252 A | 10/1982 | Lamb |
| 4,415,065 A | 11/1983 | Sandstedt |
| 4,426,555 A | 1/1984 | Underkoffler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill |
| 4,754,474 A | 6/1988 | Feinson |
| D296,894 S | 7/1988 | Chen |
| 4,777,469 A | 10/1988 | Engelke et al. |
| 4,790,003 A | 12/1988 | Kepley et al. |
| 4,799,254 A | 1/1989 | Dayton |
| 4,815,121 A | 3/1989 | Yoshida |
| 4,817,135 A | 3/1989 | Winebaum |
| 4,839,919 A | 6/1989 | Borges |
| 4,849,750 A | 7/1989 | Andros |
| 4,866,778 A | 9/1989 | Baker |
| 4,868,860 A | 9/1989 | Andros et al. |
| 4,879,738 A | 11/1989 | Petro |
| 4,897,868 A | 1/1990 | Engelke et al. |
| D306,727 S | 3/1990 | Fritzsche |
| 4,908,866 A | 3/1990 | Goldwasser et al. |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts et al. |
| 5,033,088 A | 7/1991 | Shipman |
| 5,051,924 A | 9/1991 | Bergeron et al. |
| D322,785 S | 12/1991 | Wu |
| 5,081,673 A | 1/1992 | Engelke et al. |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley et al. |
| 5,192,948 A | 3/1993 | Neustein |
| 5,199,077 A | 3/1993 | Wilcox et al. |
| 5,210,689 A | 5/1993 | Baker et al. |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile et al. |
| 5,294,982 A | 3/1994 | Salomon et al. |
| 5,307,399 A | 4/1994 | Dai et al. |
| 5,311,516 A | 5/1994 | Kuznicki et al. |
| 5,318,340 A | 6/1994 | Henry |
| 5,325,417 A | 6/1994 | Engelke et al. |
| 5,327,479 A | 7/1994 | Engelke et al. |
| 5,339,358 A | 8/1994 | Danish et al. |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore et al. |
| 5,392,343 A | 2/1995 | Davitt et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke et al. |
| 5,459,458 A | 10/1995 | Richardson et al. |
| 5,463,665 A | 10/1995 | Millios et al. |
| D364,865 S | 12/1995 | Engelke et al. |
| 5,475,733 A | 12/1995 | Eisdorfer et al. |
| 5,475,798 A | 12/1995 | Handlos |
| 5,477,274 A | 12/1995 | Akiyoshi et al. |
| 5,487,102 A | 1/1996 | Rothschild et al. |
| 5,487,671 A | 1/1996 | Shpiro |
| 5,497,373 A | 3/1996 | Hulen et al. |
| 5,508,754 A | 4/1996 | Orphan |
| 5,517,548 A | 5/1996 | Engelke et al. |
| 5,519,443 A | 5/1996 | Salomon et al. |
| 5,519,808 A | 5/1996 | Benton, Jr. et al. |
| 5,521,960 A | 5/1996 | Aronow |
| 5,522,089 A | 5/1996 | Kikinis et al. |
| 5,537,436 A | 7/1996 | Bottoms et al. |
| 5,559,855 A | 9/1996 | Dowens et al. |
| 5,559,856 A | 9/1996 | Dowens |
| 5,574,776 A | 11/1996 | Leuca et al. |
| 5,574,784 A | 11/1996 | LaPadula et al. |
| 5,581,593 A | 12/1996 | Engelke et al. |
| 5,604,786 A | 2/1997 | Engelke et al. |
| D379,181 S | 5/1997 | Sawano et al. |
| 5,649,060 A | 7/1997 | Ellozy et al. |

(56) References Cited

U.S. PATENT DOCUMENTS

| | | |
|---|---|---|
| 5,671,267 A | 9/1997 | August et al. |
| 5,680,443 A | 10/1997 | Kasday et al. |
| 5,687,222 A | 11/1997 | McLaughlin et al. |
| 5,701,338 A | 12/1997 | Leyen et al. |
| 5,710,806 A | 1/1998 | Lee et al. |
| 5,712,901 A | 1/1998 | Meermans |
| 5,724,405 A | 3/1998 | Engelke et al. |
| 5,745,550 A | 4/1998 | Eisdorfer et al. |
| 5,751,338 A | 5/1998 | Ludwig, Jr. |
| 5,787,148 A | 7/1998 | August |
| 5,799,273 A | 8/1998 | Mitchell et al. |
| 5,799,279 A | 8/1998 | Gould et al. |
| 5,809,112 A | 9/1998 | Ryan |
| 5,809,425 A | 9/1998 | Colwell et al. |
| 5,815,196 A | 9/1998 | Alshawi |
| 5,826,102 A | 10/1998 | Escobar et al. |
| 5,850,627 A | 12/1998 | Gould et al. |
| 5,855,000 A | 12/1998 | Waibel et al. |
| D405,793 S | 2/1999 | Engelke et al. |
| 5,867,817 A | 2/1999 | Catallo et al. |
| 5,870,709 A | 2/1999 | Bernstein |
| 5,883,986 A | 3/1999 | Kopec et al. |
| 5,893,034 A | 4/1999 | Hikuma et al. |
| 5,899,976 A | 5/1999 | Rozak |
| 5,905,476 A | 5/1999 | McLaughlin et al. |
| 5,909,482 A | 6/1999 | Engelke |
| 5,915,379 A | 6/1999 | Wallace et al. |
| 5,917,888 A | 6/1999 | Giuntoli |
| 5,926,527 A | 7/1999 | Jenkins et al. |
| 5,940,475 A | 8/1999 | Hansen |
| 5,974,116 A | 10/1999 | Engelke et al. |
| 5,978,014 A | 11/1999 | Martin et al. |
| 5,978,654 A | 11/1999 | Colwell et al. |
| 5,982,853 A | 11/1999 | Liebermann |
| 5,982,861 A | 11/1999 | Holloway et al. |
| 5,991,291 A | 11/1999 | Asai et al. |
| 5,991,723 A | 11/1999 | Duffin |
| 5,995,590 A | 11/1999 | Brunet et al. |
| 6,002,749 A | 12/1999 | Hansen et al. |
| 6,067,516 A | 5/2000 | Levay et al. |
| 6,072,860 A | 6/2000 | Kek et al. |
| 6,075,534 A | 6/2000 | VanBuskirk et al. |
| 6,075,841 A | 6/2000 | Engelke et al. |
| 6,075,842 A | 6/2000 | Engelke et al. |
| 6,100,882 A | 8/2000 | Sharman et al. |
| 6,101,532 A | 8/2000 | Horibe et al. |
| 6,122,613 A | 9/2000 | Baker |
| 6,141,341 A | 10/2000 | Jones et al. |
| 6,141,415 A | 10/2000 | Rao |
| 6,173,259 B1 | 1/2001 | Bijl et al. |
| 6,175,819 B1 | 1/2001 | Van Alstine |
| 6,181,736 B1 | 1/2001 | McLaughlin et al. |
| 6,181,778 B1 | 1/2001 | Ohki et al. |
| 6,188,429 B1 | 2/2001 | Martin et al. |
| 6,233,314 B1 | 5/2001 | Engelke |
| 6,243,684 B1 | 6/2001 | Stuart et al. |
| 6,278,772 B1 | 8/2001 | Bowater et al. |
| 6,298,326 B1 | 10/2001 | Feller |
| 6,307,921 B1 | 10/2001 | Engelke et al. |
| 6,314,396 B1 | 11/2001 | Monkowski |
| 6,317,716 B1 | 11/2001 | Braida et al. |
| 6,324,507 B1 | 11/2001 | Lewis et al. |
| 6,345,251 B1 | 2/2002 | Jansson et al. |
| 6,345,252 B1 | 2/2002 | Beigi et al. |
| 6,366,882 B1 | 4/2002 | Bijl et al. |
| 6,374,221 B1 | 4/2002 | Haimi-Cohen |
| 6,377,925 B1 | 4/2002 | Greene, Jr. et al. |
| 6,381,472 B1 | 4/2002 | LaMedica, Jr. et al. |
| 6,385,582 B1 | 5/2002 | Iwata |
| 6,385,586 B1 | 5/2002 | Dietz |
| 6,389,114 B1 | 5/2002 | Dowens et al. |
| 6,424,935 B1 | 7/2002 | Taylor |
| 6,430,270 B1 | 8/2002 | Cannon et al. |
| 6,434,599 B1 | 8/2002 | Porter |
| 6,445,799 B1 | 9/2002 | Taenzer et al. |
| 6,457,031 B1 | 9/2002 | Hanson |
| 6,473,778 B1 | 10/2002 | Gibbon |
| 6,493,426 B2 | 12/2002 | Engelke et al. |
| 6,493,447 B1 | 12/2002 | Goss et al. |
| 6,504,910 B1 | 1/2003 | Engelke et al. |
| 6,507,735 B1 | 1/2003 | Baker et al. |
| 6,510,206 B2 | 1/2003 | Engelke et al. |
| 6,549,611 B2 | 4/2003 | Engelke et al. |
| 6,549,614 B1 | 4/2003 | Zebryk et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,625,259 B1 | 9/2003 | Hollatz et al. |
| 6,633,630 B1 | 10/2003 | Owens et al. |
| 6,661,879 B1 | 12/2003 | Schwartz et al. |
| 6,668,042 B2 | 12/2003 | Michaelis |
| 6,668,044 B1 | 12/2003 | Schwartz et al. |
| 6,701,162 B1 | 3/2004 | Everett |
| 6,704,709 B1 | 3/2004 | Kahn et al. |
| 6,748,053 B2 | 6/2004 | Engelke et al. |
| 6,754,631 B1 | 6/2004 | Din |
| 6,763,089 B2 | 7/2004 | Feigenbaum |
| 6,775,360 B2 | 8/2004 | Davidson et al. |
| 6,778,824 B2 | 8/2004 | Wonak et al. |
| 6,813,603 B1 | 11/2004 | Groner et al. |
| 6,816,468 B1 | 11/2004 | Cruickshank |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto et al. |
| 6,882,707 B2 | 4/2005 | Engelke et al. |
| 6,885,731 B2 | 4/2005 | Engelke et al. |
| 6,894,346 B2 | 5/2005 | Onose et al. |
| 6,934,366 B2 | 8/2005 | Engelke et al. |
| 6,934,376 B1 | 8/2005 | McLaughlin et al. |
| 6,947,896 B2 | 9/2005 | Hanson |
| 6,948,066 B2 | 9/2005 | Hind et al. |
| 6,950,500 B1 | 9/2005 | Chaturvedi et al. |
| 6,980,953 B1 | 12/2005 | Kanevsky et al. |
| 7,003,082 B2 | 2/2006 | Engelke et al. |
| 7,003,463 B1 | 2/2006 | Maes et al. |
| 7,006,604 B2 | 2/2006 | Engelke |
| 7,016,479 B2 | 3/2006 | Flathers et al. |
| 7,016,844 B2 | 3/2006 | Othmer et al. |
| 7,035,383 B2 | 4/2006 | ONeal |
| 7,042,718 B2 | 5/2006 | Aoki et al. |
| 7,088,832 B1 | 8/2006 | Cooper |
| 7,117,152 B1 | 10/2006 | Mukherji et al. |
| 7,117,438 B2 | 10/2006 | Wallace et al. |
| 7,130,790 B1 | 10/2006 | Flanagan et al. |
| 7,136,478 B1 | 11/2006 | Brand et al. |
| 7,142,642 B2 | 11/2006 | McClelland et al. |
| 7,142,643 B2 | 11/2006 | Brooksby |
| 7,164,753 B2 | 1/2007 | Engelke et al. |
| 7,191,135 B2 | 3/2007 | O'Hagan |
| 7,199,787 B2 | 4/2007 | Lee et al. |
| 7,221,405 B2 | 5/2007 | Basson et al. |
| 7,233,655 B2 | 6/2007 | Gailey et al. |
| 7,236,580 B1 | 6/2007 | Sarkar et al. |
| 7,260,771 B2 | 8/2007 | Chiu et al. |
| 7,287,009 B1 | 10/2007 | Liebermann |
| 7,292,977 B2 | 11/2007 | Liu |
| 7,295,663 B2 | 11/2007 | McLaughlin et al. |
| 7,313,231 B2 | 12/2007 | Reid |
| 7,315,612 B2 | 1/2008 | McClelland |
| 7,319,740 B2 | 1/2008 | Engelke et al. |
| 7,330,737 B2 | 2/2008 | Mahini |
| 7,346,506 B2 | 3/2008 | Lueck et al. |
| 7,363,006 B2 | 4/2008 | Mooney |
| 7,406,413 B2 | 7/2008 | Geppert et al. |
| 7,428,702 B1 | 9/2008 | Cervantes et al. |
| 7,430,283 B2 | 9/2008 | Steel, Jr. |
| 7,480,613 B2 | 1/2009 | Kellner |
| 7,496,510 B2 | 2/2009 | Frank et al. |
| 7,519,536 B2 | 4/2009 | Maes et al. |
| 7,555,104 B2 | 6/2009 | Engelke |
| 7,573,985 B2 | 8/2009 | McClelland et al. |

(56) References Cited

U.S. PATENT DOCUMENTS

| | | |
|---|---|---|
| 7,606,718 B2 | 10/2009 | Cloran |
| 7,613,610 B1 | 11/2009 | Zimmerman et al. |
| 7,660,398 B2 | 2/2010 | Engleke et al. |
| 7,660,715 B1 | 2/2010 | Thambiratnam |
| 7,739,114 B1 | 6/2010 | Chen et al. |
| 7,747,434 B2 | 6/2010 | Flanagan et al. |
| 7,792,701 B2 | 9/2010 | Basson et al. |
| 7,831,429 B2 | 11/2010 | O'Hagan |
| 7,836,412 B1 | 11/2010 | Zimmerman |
| 7,844,454 B2 | 11/2010 | Coles et al. |
| 7,848,358 B2 | 12/2010 | LaDue |
| 7,881,441 B2 | 2/2011 | Engelke et al. |
| 7,904,113 B2 | 3/2011 | Ozluturk et al. |
| 7,962,339 B2 | 6/2011 | Pieraccini et al. |
| 8,019,608 B2 | 9/2011 | Carraux et al. |
| 8,032,383 B1 | 10/2011 | Bhardwaj et al. |
| 8,055,503 B2 | 11/2011 | Scarano et al. |
| 8,180,639 B2 | 5/2012 | Pieraccini et al. |
| 8,213,578 B2 | 7/2012 | Engelke et al. |
| 8,249,878 B2 | 8/2012 | Carraux et al. |
| 8,259,920 B2 | 9/2012 | Abramson et al. |
| 8,265,671 B2 | 9/2012 | Gould et al. |
| 8,286,071 B1 | 10/2012 | Zimmerman et al. |
| 8,325,883 B2 | 12/2012 | Schultz et al. |
| 8,332,212 B2 | 12/2012 | Wittenstein et al. |
| 8,332,227 B2 | 12/2012 | Maes et al. |
| 8,335,689 B2 | 12/2012 | Wittenstein et al. |
| 8,352,883 B2 | 1/2013 | Kashik et al. |
| 8,369,488 B2 | 2/2013 | Sennett et al. |
| 8,370,142 B2 | 2/2013 | Frankel et al. |
| 8,379,801 B2 | 2/2013 | Romriell et al. |
| 8,407,052 B2 | 3/2013 | Hager |
| 8,416,925 B2 | 4/2013 | Engelke et al. |
| 8,423,361 B1 | 4/2013 | Chang et al. |
| 8,447,366 B2 | 5/2013 | Ungari et al. |
| 8,473,003 B2 | 6/2013 | Jung et al. |
| 8,504,372 B2 | 8/2013 | Carraux et al. |
| 8,526,581 B2 | 9/2013 | Charugundla |
| 8,538,324 B2 | 9/2013 | Hardacker et al. |
| 8,605,682 B2 | 12/2013 | Efrati et al. |
| 8,626,249 B2 | 1/2014 | Ungari et al. |
| 8,645,136 B2 | 2/2014 | Milstein |
| 8,682,672 B1 | 3/2014 | Ha et al. |
| 8,781,510 B2 | 7/2014 | Gould et al. |
| 8,806,455 B1 | 8/2014 | Katz |
| 8,867,532 B2 | 10/2014 | Wozniak et al. |
| 8,868,425 B2 | 10/2014 | Maes et al. |
| 8,874,070 B2 | 10/2014 | Basore et al. |
| 8,892,447 B1 | 11/2014 | Srinivasan et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 8,930,194 B2 | 1/2015 | Newman et al. |
| 8,972,261 B2 | 3/2015 | Milstein |
| 9,069,377 B2 | 6/2015 | Wilson et al. |
| 9,124,716 B1 | 9/2015 | Charugundla |
| 9,161,166 B2 | 10/2015 | Johansson et al. |
| 9,183,843 B2 | 11/2015 | Fanty et al. |
| 9,185,211 B2 | 11/2015 | Roach et al. |
| 9,191,789 B2 | 11/2015 | Pan |
| 9,215,406 B2 | 12/2015 | Paripally et al. |
| 9,215,409 B2 | 12/2015 | Montero et al. |
| 9,218,808 B2 | 12/2015 | Milstein |
| 9,231,902 B2 | 1/2016 | Brown et al. |
| 9,245,522 B2 | 1/2016 | Hager |
| 9,247,052 B1 | 1/2016 | Walton |
| 9,277,043 B1 | 3/2016 | Bladon et al. |
| 9,305,552 B2 | 4/2016 | Kim et al. |
| 9,318,110 B2 | 4/2016 | Roe |
| 9,324,324 B2 | 4/2016 | Knighton |
| 9,336,689 B2 | 5/2016 | Romriell et al. |
| 9,344,562 B2 | 5/2016 | Moore et al. |
| 9,355,611 B1 | 5/2016 | Wang et al. |
| 9,380,150 B1 | 6/2016 | Bullough et al. |
| 9,392,108 B2 | 7/2016 | Milstein |
| 9,460,719 B1 | 10/2016 | Antunes et al. |
| 9,495,964 B2 | 11/2016 | Kim et al. |
| 9,502,033 B2 | 11/2016 | Carraux et al. |
| 9,535,891 B2 | 1/2017 | Raheja et al. |
| 9,536,567 B2 | 1/2017 | Garland et al. |
| 9,571,638 B1 | 2/2017 | Knighton et al. |
| 9,576,498 B2 | 2/2017 | Zimmerman et al. |
| 9,628,620 B1 | 4/2017 | Rae et al. |
| 9,632,997 B1 | 4/2017 | Johnson et al. |
| 9,633,657 B2 | 4/2017 | Svendsen et al. |
| 9,633,658 B2 | 4/2017 | Milstein |
| 9,633,696 B1 | 4/2017 | Miller et al. |
| 9,653,076 B2 | 5/2017 | Kim |
| 9,672,825 B2 | 6/2017 | Arslan et al. |
| 9,704,111 B1 | 7/2017 | Antunes et al. |
| 9,715,876 B2 | 7/2017 | Hager |
| 9,761,241 B2 | 9/2017 | Maes et al. |
| 9,774,747 B2 | 9/2017 | Garland et al. |
| 9,805,118 B2 | 10/2017 | Ko et al. |
| 9,848,082 B1 | 12/2017 | Lillard et al. |
| 9,852,130 B2 * | 12/2017 | Oh ................. G06F 40/284 |
| 9,858,256 B2 | 1/2018 | Hager |
| 9,858,929 B2 | 1/2018 | Milstein |
| 9,886,956 B1 | 2/2018 | Antunes et al. |
| 9,916,295 B1 | 3/2018 | Crawford |
| 9,947,322 B2 | 4/2018 | Kang et al. |
| 9,953,653 B2 | 4/2018 | Newman et al. |
| 10,032,455 B2 | 7/2018 | Newman et al. |
| 10,044,854 B2 | 8/2018 | Rae et al. |
| 10,049,669 B2 | 8/2018 | Newman et al. |
| 10,051,120 B2 | 8/2018 | Engelke et al. |
| 10,389,876 B2 | 8/2019 | Engelke et al. |
| 10,469,660 B2 | 11/2019 | Engelke et al. |
| 10,491,746 B2 | 11/2019 | Engelke et al. |
| 10,574,804 B2 | 2/2020 | Bullough et al. |
| 10,581,625 B1 | 3/2020 | Pandey et al. |
| 10,587,751 B2 | 3/2020 | Engelke et al. |
| 10,742,805 B2 | 8/2020 | Engelke et al. |
| 10,878,721 B2 | 12/2020 | Engelke et al. |
| 10,917,519 B2 | 2/2021 | Engelke et al. |
| 11,011,157 B2 | 5/2021 | Dernoncourt |
| 11,017,778 B1 | 5/2021 | Thomson et al. |
| 11,170,782 B2 | 11/2021 | Stoker et al. |
| 11,176,944 B2 | 11/2021 | Boekweg et al. |
| 11,363,141 B2 | 6/2022 | Friio |
| 11,368,581 B2 | 6/2022 | Engelke et al. |
| 11,539,900 B2 * | 12/2022 | Engelke ............ H04N 21/233 |
| 11,627,221 B2 | 4/2023 | Engelke et al. |
| 11,636,859 B2 | 4/2023 | Boekweg et al. |
| 11,664,029 B2 | 5/2023 | Engelke et al. |
| 11,741,963 B2 | 8/2023 | Engelke et al. |
| 2001/0005825 A1 | 6/2001 | Engelke et al. |
| 2002/0007275 A1 | 1/2002 | Goto et al. |
| 2002/0049589 A1 | 4/2002 | Poirier |
| 2002/0055351 A1 | 5/2002 | Elsey et al. |
| 2002/0085685 A1 | 7/2002 | Engelke et al. |
| 2002/0085703 A1 | 7/2002 | Proctor |
| 2002/0094800 A1 | 7/2002 | Trop et al. |
| 2002/0101537 A1 | 8/2002 | Basson et al. |
| 2002/0103008 A1 | 8/2002 | Rahn et al. |
| 2002/0114429 A1 | 8/2002 | Engelke et al. |
| 2002/0119800 A1 | 8/2002 | Jaggers et al. |
| 2002/0161578 A1 | 10/2002 | Saindon et al. |
| 2002/0178001 A1 | 11/2002 | Balluff et al. |
| 2002/0178002 A1 | 11/2002 | Boguraev et al. |
| 2002/0184373 A1 | 12/2002 | Maes |
| 2002/0193076 A1 | 12/2002 | Rogers et al. |
| 2003/0045329 A1 | 3/2003 | Kinoshita |
| 2003/0061396 A1 | 3/2003 | Wen et al. |
| 2003/0063731 A1 | 4/2003 | Woodring |
| 2003/0069997 A1 | 4/2003 | Bravin et al. |
| 2003/0097262 A1 | 5/2003 | Nelson |
| 2003/0128820 A1 | 7/2003 | Hirschberg et al. |
| 2003/0177190 A1 | 9/2003 | Moody et al. |
| 2003/0212547 A1 | 11/2003 | Engelke et al. |
| 2004/0064317 A1 | 4/2004 | Othmer et al. |
| 2004/0064322 A1 | 4/2004 | Georgiopoulos et al. |
| 2004/0066926 A1 | 4/2004 | Brockbank et al. |
| 2004/0083105 A1 | 4/2004 | Jaroker |

(56) References Cited

U.S. PATENT DOCUMENTS

| | | |
|---|---|---|
| 2004/0122657 A1 | 6/2004 | Brants et al. |
| 2004/0143430 A1 | 7/2004 | Said et al. |
| 2004/0186989 A1 | 9/2004 | Clapper |
| 2004/0266410 A1 | 12/2004 | Sand et al. |
| 2005/0025290 A1 | 2/2005 | Doherty et al. |
| 2005/0048992 A1 | 3/2005 | Wu et al. |
| 2005/0049879 A1 | 3/2005 | Audu et al. |
| 2005/0063520 A1 | 3/2005 | Michaelis |
| 2005/0094776 A1 | 5/2005 | Haldeman et al. |
| 2005/0094777 A1 | 5/2005 | McClelland |
| 2005/0129185 A1 | 6/2005 | McClelland et al. |
| 2005/0144012 A1 | 6/2005 | Afrashteh et al. |
| 2005/0180553 A1 | 8/2005 | Moore |
| 2005/0183109 A1 | 8/2005 | Basson et al. |
| 2005/0193062 A1 | 9/2005 | Komine et al. |
| 2005/0225628 A1 | 10/2005 | Antoniou |
| 2005/0226394 A1 | 10/2005 | Engelke et al. |
| 2005/0226398 A1 | 10/2005 | Bojeun |
| 2005/0232169 A1 | 10/2005 | McLaughlin et al. |
| 2005/0277431 A1 | 12/2005 | White |
| 2006/0026003 A1 | 2/2006 | Carus et al. |
| 2006/0047816 A1 | 3/2006 | Lawton et al. |
| 2006/0080432 A1 | 4/2006 | Spataro et al. |
| 2006/0089857 A1 | 4/2006 | Zimmerman et al. |
| 2006/0095575 A1 | 5/2006 | Sureka et al. |
| 2006/0105712 A1 | 5/2006 | Glass et al. |
| 2006/0133583 A1 | 6/2006 | Brooksby |
| 2006/0140354 A1 | 6/2006 | Engelke |
| 2006/0149558 A1 | 7/2006 | Kahn et al. |
| 2006/0167686 A1 | 7/2006 | Kahn |
| 2006/0172720 A1 | 8/2006 | Islam et al. |
| 2006/0190249 A1 | 8/2006 | Kahn et al. |
| 2006/0285652 A1 | 12/2006 | McClelland et al. |
| 2006/0285662 A1 | 12/2006 | Yin et al. |
| 2007/0011012 A1 | 1/2007 | Yurick et al. |
| 2007/0024583 A1 | 2/2007 | Gettemy et al. |
| 2007/0036282 A1 | 2/2007 | Engelke et al. |
| 2007/0048719 A1 | 3/2007 | He et al. |
| 2007/0074116 A1 | 3/2007 | Thomas |
| 2007/0100634 A1 | 5/2007 | Cooper et al. |
| 2007/0116190 A1 | 5/2007 | Bangor et al. |
| 2007/0118373 A1* | 5/2007 | Wise .................. G10L 21/06 704/235 |
| 2007/0124405 A1 | 5/2007 | Ulmer et al. |
| 2007/0126926 A1 | 6/2007 | Miyamoto et al. |
| 2007/0130257 A1 | 6/2007 | Bedi et al. |
| 2007/0153989 A1 | 7/2007 | Howell et al. |
| 2007/0168552 A1 | 7/2007 | Alse et al. |
| 2007/0208570 A1 | 9/2007 | Bhardwaj et al. |
| 2007/0274296 A1 | 11/2007 | Cross, Jr. et al. |
| 2007/0282597 A1* | 12/2007 | Cho .................. G06F 16/345 707/E17.094 |
| 2008/0005440 A1 | 1/2008 | Li et al. |
| 2008/0040111 A1 | 2/2008 | Miyamoto et al. |
| 2008/0043936 A1 | 2/2008 | Liebermann |
| 2008/0043953 A1 | 2/2008 | Newsom et al. |
| 2008/0064326 A1 | 3/2008 | Foster et al. |
| 2008/0129864 A1 | 6/2008 | Stone et al. |
| 2008/0152093 A1 | 6/2008 | Engelke et al. |
| 2008/0187108 A1 | 8/2008 | Engelke et al. |
| 2008/0215323 A1 | 9/2008 | Shaffer et al. |
| 2008/0319744 A1 | 12/2008 | Goldberg |
| 2008/0319745 A1 | 12/2008 | Caldwell et al. |
| 2009/0037171 A1 | 2/2009 | McFarland et al. |
| 2009/0089236 A1 | 4/2009 | Lamprecht et al. |
| 2009/0174759 A1 | 7/2009 | Yeh et al. |
| 2009/0276215 A1 | 11/2009 | Hager |
| 2009/0282106 A1 | 11/2009 | Jaffer et al. |
| 2009/0299743 A1 | 12/2009 | Rogers |
| 2009/0306981 A1 | 12/2009 | Cromack et al. |
| 2009/0326939 A1 | 12/2009 | Toner et al. |
| 2010/0007711 A1 | 1/2010 | Bell |
| 2010/0027765 A1 | 2/2010 | Schultz et al. |
| 2010/0030738 A1 | 2/2010 | Geer |
| 2010/0063815 A1 | 3/2010 | Cloran et al. |
| 2010/0076752 A1 | 3/2010 | Zweig et al. |
| 2010/0121629 A1 | 5/2010 | Cohen |
| 2010/0141834 A1 | 6/2010 | Cuttner |
| 2010/0145729 A1 | 6/2010 | Katz |
| 2010/0158213 A1 | 6/2010 | Mikan et al. |
| 2010/0204989 A1 | 8/2010 | Boes et al. |
| 2010/0228548 A1 | 9/2010 | Liu et al. |
| 2010/0268534 A1 | 10/2010 | Kishan Thambiratnam et al. |
| 2010/0293232 A1 | 11/2010 | Jackson et al. |
| 2010/0299131 A1 | 11/2010 | Lanham et al. |
| 2010/0323728 A1 | 12/2010 | Gould et al. |
| 2011/0013756 A1 | 1/2011 | Davies et al. |
| 2011/0022387 A1 | 1/2011 | Hager |
| 2011/0087491 A1 | 4/2011 | Wittenstein et al. |
| 2011/0099006 A1 | 4/2011 | Sundararaman et al. |
| 2011/0123003 A1* | 5/2011 | Romriell .................. H04L 12/66 715/256 |
| 2011/0128953 A1 | 6/2011 | Wozniak et al. |
| 2011/0161085 A1 | 6/2011 | Boda et al. |
| 2011/0170672 A1 | 7/2011 | Engelke et al. |
| 2011/0206189 A1 | 8/2011 | Kennedy et al. |
| 2011/0231184 A1 | 9/2011 | Kerr |
| 2011/0270609 A1 | 11/2011 | Jones et al. |
| 2011/0289134 A1 | 11/2011 | de los Reyes et al. |
| 2012/0016671 A1 | 1/2012 | Jaggi et al. |
| 2012/0022865 A1 | 1/2012 | Milstein |
| 2012/0062791 A1 | 3/2012 | Thakolsri et al. |
| 2012/0108196 A1 | 5/2012 | Musgrove et al. |
| 2012/0178064 A1 | 7/2012 | Katz |
| 2012/0179465 A1 | 7/2012 | Cox et al. |
| 2012/0214447 A1 | 8/2012 | Russell et al. |
| 2012/0245936 A1 | 9/2012 | Treglia |
| 2012/0250837 A1 | 10/2012 | Engleke et al. |
| 2012/0265529 A1 | 10/2012 | Nachtrab et al. |
| 2012/0284015 A1 | 11/2012 | Drewes |
| 2013/0013904 A1 | 1/2013 | Tran |
| 2013/0017800 A1 | 1/2013 | Gouvia et al. |
| 2013/0030804 A1 | 1/2013 | Zavaliagkos et al. |
| 2013/0035936 A1 | 2/2013 | Garland et al. |
| 2013/0045720 A1 | 2/2013 | Madhavapeddl et al. |
| 2013/0086293 A1 | 4/2013 | Bosse et al. |
| 2013/0144610 A1 | 6/2013 | Gordon et al. |
| 2013/0171958 A1 | 7/2013 | Goodson et al. |
| 2013/0219098 A1 | 8/2013 | Turnpenny et al. |
| 2013/0254264 A1 | 9/2013 | Hankinson et al. |
| 2013/0262563 A1 | 10/2013 | Lu |
| 2013/0289971 A1 | 10/2013 | Parkinson et al. |
| 2013/0308763 A1 | 11/2013 | Engleke et al. |
| 2013/0317818 A1 | 11/2013 | Bigham et al. |
| 2013/0331056 A1 | 12/2013 | McKown et al. |
| 2013/0340003 A1 | 12/2013 | Davis et al. |
| 2014/0018045 A1 | 1/2014 | Tucker |
| 2014/0039871 A1 | 2/2014 | Crawford |
| 2014/0039888 A1 | 2/2014 | Taubman et al. |
| 2014/0099909 A1 | 4/2014 | Daly et al. |
| 2014/0153705 A1 | 6/2014 | Moore et al. |
| 2014/0163981 A1 | 6/2014 | Cook et al. |
| 2014/0180667 A1 | 6/2014 | Johansson |
| 2014/0270101 A1 | 9/2014 | Maxwell et al. |
| 2014/0314220 A1 | 10/2014 | Charugundla |
| 2014/0341359 A1 | 11/2014 | Engelke et al. |
| 2015/0032450 A1 | 1/2015 | Hussain et al. |
| 2015/0058005 A1 | 2/2015 | Khare et al. |
| 2015/0073790 A1 | 3/2015 | Steuble et al. |
| 2015/0088508 A1 | 3/2015 | Bharadwaj et al. |
| 2015/0094105 A1 | 4/2015 | Pan |
| 2015/0106091 A1 | 4/2015 | Wetjen et al. |
| 2015/0120289 A1 | 4/2015 | Lev-Tov et al. |
| 2015/0130887 A1 | 5/2015 | Thelin et al. |
| 2015/0131786 A1 | 5/2015 | Roach et al. |
| 2015/0279352 A1 | 10/2015 | Willett et al. |
| 2015/0287043 A1 | 10/2015 | Michaelis et al. |
| 2015/0288815 A1 | 10/2015 | Charugundla |
| 2015/0341486 A1 | 11/2015 | Knighton |
| 2015/0358461 A1 | 12/2015 | Klaban |
| 2016/0012751 A1 | 1/2016 | Hirozawa |
| 2016/0027442 A1 | 1/2016 | Burton et al. |
| 2016/0119571 A1 | 4/2016 | Ko |
| 2016/0133251 A1 | 5/2016 | Kadirkamanathan et al. |

(56) References Cited

U.S. PATENT DOCUMENTS

| | | | |
|---|---|---|---|
| 2016/0155435 A1 | 6/2016 | Mohideen | |
| 2016/0179831 A1 | 6/2016 | Gruber et al. | |
| 2016/0277709 A1 | 9/2016 | Stringham et al. | |
| 2016/0295293 A1 | 10/2016 | McLaughlin | |
| 2017/0004207 A1 | 1/2017 | Baughman et al. | |
| 2017/0083214 A1 | 3/2017 | Furesjo et al. | |
| 2017/0085506 A1 | 3/2017 | Gordon | |
| 2017/0178182 A1 | 6/2017 | Kuskey et al. | |
| 2017/0187826 A1 | 6/2017 | Russell et al. | |
| 2017/0187876 A1 | 6/2017 | Hayes et al. | |
| 2017/0206808 A1* | 7/2017 | Engelke | H04M 3/42391 |
| 2017/0270929 A1 | 9/2017 | Aleksic et al. | |
| 2018/0012619 A1 | 1/2018 | Ryan et al. | |
| 2018/0013886 A1 | 1/2018 | Rae et al. | |
| 2018/0081869 A1 | 3/2018 | Hager | |
| 2018/0102130 A1 | 4/2018 | Holm et al. | |
| 2018/0197545 A1 | 7/2018 | Willett et al. | |
| 2018/0212790 A1 | 7/2018 | Jacobson et al. | |
| 2018/0270350 A1 | 9/2018 | Engelke et al. | |
| 2018/0315417 A1 | 11/2018 | Flaks et al. | |
| 2019/0108834 A1 | 4/2019 | Nelson et al. | |
| 2019/0295542 A1 | 9/2019 | Huang et al. | |
| 2020/0004803 A1 | 1/2020 | Dernoncourt et al. | |
| 2020/0007679 A1 | 1/2020 | Engelke et al. | |
| 2020/0143820 A1 | 5/2020 | Donofrio et al. | |
| 2020/0153958 A1 | 5/2020 | Engelke et al. | |
| 2020/0244800 A1 | 7/2020 | Engelke et al. | |
| 2020/0252507 A1 | 8/2020 | Engelke et al. | |
| 2020/0364067 A1 | 11/2020 | Accame et al. | |
| 2021/0058510 A1 | 2/2021 | Engelke et al. | |
| 2021/0073468 A1 | 3/2021 | Deshmukh et al. | |
| 2021/0210115 A1 | 7/2021 | Kothari et al. | |
| 2021/0233530 A1 | 7/2021 | Thomson et al. | |
| 2021/0234959 A1 | 7/2021 | Engelke et al. | |
| 2021/0274039 A1 | 9/2021 | Engelke et al. | |
| 2022/0014622 A1 | 1/2022 | Engelke et al. | |
| 2022/0014623 A1 | 1/2022 | Engelke et al. | |
| 2022/0028394 A1 | 1/2022 | Engelke et al. | |
| 2022/0103683 A1 | 3/2022 | Engelke et al. | |
| 2022/0284904 A1 | 9/2022 | Pu et al. | |
| 2022/0319521 A1 | 10/2022 | Liu | |

FOREIGN PATENT DOCUMENTS

| | | |
|---|---|---|
| DE | 2749923 | 5/1979 |
| DE | 3410619 | 10/1985 |
| DE | 3632233 | 4/1988 |
| DE | 10328884 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| EP | 2093974 A1 | 8/2009 |
| EP | 2373016 A2 | 10/2011 |
| FR | 2403697 A | 4/1979 |
| FR | 2432805 A | 2/1980 |
| FR | 2538978 A | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | S5544283 A | 3/1980 |
| JP | S5755649 A | 4/1982 |
| JP | S58134568 A | 8/1983 |
| JP | S60259058 A | 12/1985 |
| JP | S63198466 A | 8/1988 |
| JP | H04248596 A | 9/1992 |
| JP | 2011087005 A | 4/2011 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9750222 A1 | 12/1997 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 0155914 A1 | 8/2001 |
| WO | 0158165 A2 | 8/2001 |
| WO | 0180079 A2 | 10/2001 |
| WO | 0225910 A2 | 3/2002 |
| WO | 02077971 A1 | 10/2002 |
| WO | 03026265 A1 | 3/2003 |
| WO | 03030018 A1 | 4/2003 |
| WO | 03071774 A1 | 8/2003 |
| WO | 2005081511 A1 | 9/2005 |
| WO | 2008053306 A2 | 5/2008 |
| WO | 2015131028 A1 | 9/2015 |
| WO | 2015148037 A1 | 10/2015 |

OTHER PUBLICATIONS

In the United States Patent and Trademark Office Before the Patent Trial and Appeal Board, Final Written Decision, *CaptionCall LLC v. Ultratec Inc.*, Case IPR2014-00780, U.S. Pat. No. 6,603,835, Dec. 1, 2015, 56 pages.

In the United States Patent and Trademark Office Before the Patent Trial and Appeal Board, Patent Owner's Request for Rehearing by Expanded Panel, *CaptionCall LLC v. Ultratec Inc.*, Case IPR2014-00780, U.S. Pat. No. 6,603,835, Dec. 31, 2015, 20 pages.

In the United States Patent and Trademark Office Before the Patent Trial and Appeal Board, Patent Owner's Request for Rehearing by Expanded Panel, *CaptionCall LLC v. Ultratec Inc.*, Case IPR2013-00540, U.S. Pat. No. 6,233,314, Apr. 2, 2015, 19 pages.

In the United States Patent and Trademark Office Before the Patent Trial and Appeal Board, Decision Denying Patent Owner's Request for Rehearing, *CaptionCall LLC v. Ultratec Inc.*, Case IPR2013-00540, U.S. Pat. No. 6,233,314, Dec. 1, 2015, 18 pages.

In the United States Patent and Trademark Office Before the Patent Trial and Appeal Board, Patent Owner's Notice of Appeal, *CaptionCall LLC v. Ultratec Inc.*, Case IPR2013-00540, U.S. Pat. No. 6,233,314, Feb. 2, 2016, 19 pages.

In the United States Patent and Trademark Office Before the Patent Trial and Appeal Board, Patent Owner's Request for Rehearing by Expanded Panel, *CaptionCall LLC v. Ultratec Inc.*, Case IPR2013-00541, U.S. Pat. No. 5,909,482, Apr. 2, 2015, 19 pages.

In the United States Patent and Trademark Office Before the Patent Trial and Appeal Board, Decision Denying Patent Owner's Request for Rehearing, *CaptionCall LLC v. Ultratec Inc.*, Case IPR2013-00541, U.S. Pat. No. 5,909,482, Dec. 1, 2015, 18 pages.

In the United States Patent and Trademark Office Before the Patent Trial and Appeal Board, Patent Owner's Notice of Appeal, *CaptionCall LLC v. Ultratec Inc.*, Case IPR2013-00541, U.S. Pat. No. 5,909,482, Feb. 2, 2016, 19 pages.

In the United States Patent and Trademark Office Before the Patent Trial and Appeal Board, Patent Owner's Request for Rehearing by Expanded Panel, *CaptionCall LLC v. Ultratec Inc.*, Case IPR2013-00542, U.S. Pat. No. 7,319,470, Apr. 2, 2015, 19 pages.

In the United States Patent and Trademark Office Before the Patent Trial and Appeal Board, Decision Denying Patent Owner's Request for Rehearing, *CaptionCall LLC v. Ultratec Inc.*, Case IPR2013-00542, U.S. Pat. No. 7,319,470, Dec. 1, 2015, 15 pages.

In the United States Patent and Trademark Office Before the Patent Trial and Appeal Board, Patent Owner's Notice of Appeal, *CaptionCall LLC v. Ultratec Inc.*, Case IPR2013-00542, U.S. Pat. No. 7,319,470, Feb. 2, 2016, 12 pages.

In the United States Patent and Trademark Office Before the Patent Trial and Appeal Board, Patent Owner's Request for Rehearing by Expanded Panel, *CaptionCall LLC v. Ultratec Inc.*, Case IPR2013-00543, U.S. Pat. No. 7,555,104, Apr. 2, 2015, 19 pages.

(56) References Cited

OTHER PUBLICATIONS

In the United States Patent and Trademark Office Before the Patent Trial and Appeal Board, Decision Denying Patent Owner's Request for Rehearing, *CaptionCall LLC* v. *Ultratec Inc.*, Case IPR2013-00543, U.S. Pat. No. 7,555,104, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00543, U.S. Pat. No. 7,555,104, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00544, U.S. Pat. No. 8,213,578, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00544, U.S. Pat. No. 8,213,578, Dec. 1, 2015, 19 pages.
In the United States Patent and Trademark Office Before the Patent Trial and Appeal Board, Patent Owner's Notice of Appeal, *CaptionCall LLC* v. *Ultratec Inc.*, Case IPR2013-00544, U.S. Pat. No. 8,213,578, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00545, U.S. Pat. No. 6,594,346, Apr. 2, 2015, 16 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00545, U.S. Pat. No. 6,594,346, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00545, U.S. Pat. No. 6,594,346, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00549, U.S. Pat. No. 6,603,835, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00549, U.S. Pat. No. 6,603,835, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00549, U.S. Pat. No. 6,603,835, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00550, U.S. Pat. No. 7,003,082, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00550, U.S. Pat. No. 7,003,082, Dec. 1, 2015, 10 pages.
In the United States Patent and Trademark Office Before the Patent Trial and Appeal Board, Patent Owner's Notice of Appeal, *CaptionCall LLC* v. *Ultratec Inc.*, Case IPR2013-00550, U.S. Pat. No. 7,003,082, Feb. 2, 2016, 11 pages.
In the United States Patent and Trademark Office Before the Patent Trial and Appeal Board, Decision Denying Institution of Inter Partes Review, *CaptionCall LLC* v. *Ultratec Inc.*, Case IPR2014-01287, U.S. Pat. No. 7,660,398, Feb. 12, 2015, 15 pages.
In the United States Patent and Trademark Office Before the Patent Trial and Appeal Board, Request for Rehearing, *CaptionCall LLC* v. *Ultratec Inc.*, Case IPR2014-01287, U.S. Pat. No. 7,660,398, Mar. 13, 2015, 18 pages.
In the United States Patent and Trademark Office Before the Patent Trial and Appeal Board, Decision Denying Request for Rehearing, *CaptionCall LLC* v. *Ultratec Inc.*, Case IPR2014-01287, U.S. Pat. No. 7,660,398, Nov. 5, 2015, 7 pages.

In the United States Patent and Trademark Office Before the Patent Trial and Appeal Board, Petition for Inter Partes Review for U.S. Pat. No. 10,469,660, *CaptionCall, LLC* v. *Ultratec, Inc.*, Case IPR2020-01215, Jul. 1, 2020, 68 pages.
In the United States Patent and Trademark Office Before the Patent Trial and Appeal Board, Declaration of Benedict J. Occhiogrosso for U.S. Pat. No. 10,469,660, *CaptionCall, LLC* v. *Ultratec, Inc.*, Case IPR2020-01215, Jun. 23, 2020, 113 pages.
United States Patent and Trademark Office Before the Patent Trial and Appeal Board, Decision Denying Institution of Inter Partes Review for U.S. Pat. No. 10,469,660, *CaptionCall LLC* v. *Ultratec Inc.*, Case IPR2020-01215, Jan. 27, 2021, 24 pages.
United States Patent and Trademark Office Before the Patent Trial and Appeal Board, Petitioner's Request for Rehearing Pursuant to 37 C.F.R. 42.71(d), *CaptionCall LLC* v. *Ultratec Inc.*, Case IPR2020-01215, U.S. Pat. No. 10,469,660, Feb. 18, 2021, 19 pages.
U.S. Appl. No. 60/562,795 Provisional Application to McLaughlin et al., filed Apr. 16, 2004, 126 pages.
Blackberry, RIM Introduces New Color BlackBerry Handheld for CDMA2000 1X Wireless Networks, BlackBerry Press Release, Mar. 22, 2004, 2 pages.
Blackberry Wireless Handheld User Guide, 7750, Mar. 16, 2004, 144 pages.
Federal Communications Commission, Telecommunication Relay Services and Speech-to-Speech Services for Individuals With Hearing and Speech Disabilities, 68 Fed. Reg. 50973-50978 (Aug. 25, 2003).
PhoneDB, RIM BlackBerry 7750 Device Specs, Copyright 2006-2020 PhoneDB, 6 pages.
Phonesdata, Nokia 6620 Specs, Review, Opinions, Comparisons, Copyright 2020, 9 pages.
Sundgot, Nokia Unveils the 6600, InfoSync World, Jun. 16, 2003, 2 pages.
Wikipedia, Dell Axim, https://en.wikipedia.org/wiki/Dell_Axim, Last Edited on Feb. 23, 2020, 4 pages.
Wikipedia, Palm Tungsten, https://en.wikipedia.org/wiki/Palm_Tungsten, Last Edited on Oct. 6, 2019, 10 pages.
In the United States Patent and Trademark Office Before the Patent and Trial Appeal Board, Final Written Decision, U.S. Pat. No. 9,131,045, *CaptionCall, LLC* v. *Ultratec, Inc.*, Case IPR2015-01889, Apr. 11, 2017, 118 pages.
In the United States Patent and Trademark Office Before the Patent and Trial Appeal Board, Judgment for U.S. Pat. No. 7,881,441, *CaptionCall, LLC* v. *Ultratec, Inc.*, Case IPR2015-01886, Jun. 9, 2016, 4 pages.
In the United States Patent and Trademark Office Before the Patent Trial and Appeal Board, Petition for Inter Partes Review for U.S. Pat. No. 10,491,746, *CaptionCall, LLC* v. *Ultratec, Inc.*, Case IPR2020-01216, Jul. 1, 2020, 61 pages.
In the United States Patent and Trademark Office Before the Patent Trial and Appeal Board, Declaration of Benedict J. Occhiogrosso for U.S. Pat. No. 10,491,746, *CaptionCall, LLC* v. *Ultratec, Inc.*, Case IPR2020-01216, Jun. 23, 2020, 79 pages.
In the United States Patent and Trademark Office Before the Patent Trial and Appeal Board, Decision Denying Institution of Inter Partes Review for U.S. Pat. No. 10,491,746, *CaptionCall, LLC* v. *Ultratec, Inc.*, Case IPR2020-01216, Jan. 27, 2021, 22 pages.
Arlinger, Negative Consequences of Uncorrected Hearing Loss—A Review, International Journal of Audiology, 2003, 42:2S17-2S20.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.

(56) References Cited

OTHER PUBLICATIONS

Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 6,594,346, Case IPR2013-00545, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, In the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, In the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, In the United States Patent and Trademark Office Before the Patent Trial and Appeal Board, May 30, 2014.
Declaration of Brenda Battat, In Re: U.S. Pat. No. 8,231,578, Case IPR2013-00544, In the United States Patent and Trademark Office Before the Patent Trial and Appeal Board, May 8, 2014.
Declaration of Constance Phelps, In Re: U.S. Pat. No. 6,233,314, Case IPR2013-00540, In the United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.

CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, In the United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,917,822, Case IPR2015-00636, In the United States Patent and Trademark Office Before the Patent Trial and Appeal Board, Jan. 28, 2015, 65 pages.
In the United States Patent and Trademark Office Before the Patent Trial and Appeal Board, Decision—Institution of Inter Partes Review, *CaptionCall LLC* v. *Ultratec Inc.*, Case IPR2014-00780, U.S. Pat. No. 6,603,835, Dec. 4, 2014, 14 pages.
In the United States Patent and Trademark Office Before the Patent Trial and Appeal Board, Patent Owner Response Under 37 C.F.R. 42.120, *CaptionCall LLC* v. *Ultratec Inc.*, Case IPR2014-00780, U.S. Pat. No. 6,603,835, Feb. 11, 2015, 68 pages.
In the United States Patent and Trademark Office Before the Patent Trial and Appeal Board, Final Written Decision, *CaptionCall LLC* v. *Ultratec Inc.*, Case IPR2014-00540, U.S. Appl. No. 6,233,314, Mar. 3, 2015, 55 pages.
In the United States Patent and Trademark Office Before the Patent Trial and Appeal Board, Final Written Decision, *CaptionCall LLC* v. *Ultratec Inc.*, Case IPR2014-00541, U.S. Pat. No. 5,909,482, Mar. 3, 2015, 77 pages.
In the United States Patent and Trademark Office Before the Patent Trial and Appeal Board, Final Written Decision, *CaptionCall LLC* v. *Ultratec Inc.*, Case IPR2014-00542, U.S. Pat. No. 7,319,740, Mar. 3, 2015, 31 pages.
In the United States Patent and Trademark Office Before the Patent Trial and Appeal Board, Final Written Decision, *CaptionCall LLC* v. *Ultratec Inc.*, Case IPR2014-00543, U.S. Pat. No. 7,555,104, Mar. 3, 2015, 29 pages.
In the United States Patent and Trademark Office Before the Patent Trial and Appeal Board, Final Written Decision, *CaptionCall LLC* v. *Ultratec Inc.*, Case IPR2014-00544, U.S. Pat. No. 8,213,578, Mar. 3, 2015, 56 pages.
In the United States Patent and Trademark Office Before the Patent Trial and Appeal Board, Final Written Decision, *CaptionCall LLC* v. *Ultratec Inc.*, Case IPR2014-00545, U.S. Pat. No. 6,594,346, Mar. 3, 2015, 41 pages.
In the United States Patent and Trademark Office Before the Patent Trial and Appeal Board, Final Written Decision, *CaptionCall LLC* v. *Ultratec Inc.*, Case IPR2014-00549, U.S. Pat. No. 6,603,835, Mar. 3, 2015, 35 pages.
In the United States Patent and Trademark Office Before the Patent Trial and Appeal Board, Final Written Decision, *CaptionCall LLC* v. *Ultratec Inc.*, Case IPR2014-00550, U.S. Pat. No. 7,003,082, Mar. 3, 2015, 25 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.

(56) References Cited

OTHER PUBLICATIONS

CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office Before the Patent Trial and Appeal Board, Decision—Institution of Inter Partes Review, *CaptionCall LLC* v. *Ultratec Inc.*, Case IPR2013-00550, U.S. Pat. No. 7,003,082 B2, Mar. 5, 2014, 13 pages.
United States Patent and Trademark Office Before the Patent Trial and Appeal Board, Decision—Institution of Inter Partes Review, *CaptionCall LLC* v. *Ultratec Inc.*, Case IPR2013-00543, U.S. Pat. No. 7,555,104, Mar. 5, 2014, 16 pages.
United States Patent and Trademark Office Before the Patent Trial and Appeal Board, Decision—Institution of Inter Partes Review, *CaptionCall LLC* v. *Ultratec Inc.*, Case IPR2013-00540, U.S. Pat. No. 6,233,314, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00545, U.S. Pat. No. 6,594,346, Mar. 5, 2014, 21 pages.
United States Patent and Trademark Office Before the Patent Trial and Appeal Board, Decision—Institution of Inter Partes Review, *CaptionCall LLC* v. *Ultratec Inc.*, Case IPR2013-00541, U.S. Pat. No. 5,909,482, Mar. 5, 2014, 32 pages.
United States Patent and Trademark Office Before the Patent Trial and Appeal Board, Decision—Institution of Inter Partes Review, *CaptionCall LLC* v. *Ultratec Inc.*, Case IPR2013-00544, U.S. Pat. No. 8,213,578, Mar. 5, 2014, 22 pages.
United States Patent and Trademark Office Before the Patent Trial and Appeal Board, Decision—Institution of Inter Partes Review, *CaptionCall LLC* v. *Ultratec Inc.*, Case IPR2013-00542, U.S. Pat. No. 7,319,740, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00549, U.S. Pat. No. 6,603,835 B2, Mar. 5, 2014, 26 pages.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 pages.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of the U.S. Pat. No. 7,660,398 U.S. Patent, 489 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
In the United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.
In the United States Patent and Trademark Office Before the Patent Trial and Appeal Board, Patent Owner's Preliminary Response, *CaptionCall LLC* v. *Ultratec Inc.*, Case IPR2015-00636, U.S. Pat. No. 8,917,822, Jun. 9, 2015, 66 pages.
In the United States Patent and Trademark Office Before the Patent Trial and Appeal Board, Decision Instituting Review, *CaptionCall LLC* v. *Ultratec Inc.*, Case IPR2015-00636, U.S. Pat. No. 8,917,822, Sep. 8, 2015, 20 pages.
In the United States Patent and Trademark Office Before the Patent Trial and Appeal Board, Patent Owner Response, *CaptionCall LLC* v. *Ultratec Inc.*, Case IPR2015-00636, U.S. Pat. No. 8,917,822, Nov. 23, 2015, 65 pages.
In the United States Patent and Trademark Office Before the Patent Trial and Appeal Board, Patent Owner's Contingent Motion to Amend, *CaptionCall LLC* v. *Ultratec Inc.*, Case IPR2015-00636, U.S. Pat. No. 8,917,822, Nov. 23, 2015, 39 pages.
In the United States Patent and Trademark Office Before the Patent Trial and Appeal Board, Petitioner's Reply to Patent Owner Response, *CaptionCall LLC* v. *Ultratec Inc.*, Case IPR2015-00636, U.S. Pat. No. 8,917,822, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, In the United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In the United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In the United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In the United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In the United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-30 of U.S. Pat. No. 8,908,838, *CaptionCall LLC* v. *Ultratec Inc.*, Case IPR2015-00637, U.S. Pat. No. 8,908,838, Jan. 29, 2015, 67 pages.
In the United States Patent and Trademark Office Before the Patent Trial and Appeal Board, Patent Owner's Preliminary Response, *CaptionCall LLC* v. *Ultratec Inc.*, Case IPR2015-00637, U.S. Pat. No. 8,908,838, Jun. 9, 2015, 65 pages.
In the United States Patent and Trademark Office Before the Patent Trial and Appeal Board, Decision Instituting Review, *CaptionCall LLC* v. *Ultratec Inc.*, Case IPR2015-00637, U.S. Pat. No. 8,908,838, Sep. 8, 2015, 25 pages.
In the United States Patent and Trademark Office Before the Patent Trial and Appeal Board, Patent Owner Response, *CaptionCall LLC* v. *Ultratec Inc.*, Case IPR2015-00637, U.S. Pat. No. 8,908,838, Nov. 23, 2015, 65 pages.
In the United States Patent and Trademark Office Before the Patent Trial and Appeal Board, Patent Owner's Contingent Motion to Amend, *CaptionCall LLC* v. *Ultratec Inc.*, Case IPR2015-00637, U.S. Pat. No. 8,908,838, Nov. 23, 2015, 38 pages.
In the United States Patent and Trademark Office Before the Patent Trial and Appeal Board, Petitioner's Reply to Patent Owner Response, *CaptionCall LLC* v. *Ultratec Inc.*, Case IPR2015-00637, U.S. Pat. No. 8,908,838, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00637, U.S. Pat. No. 8,908,838, Jan. 26, 2016, 28 pages.
Declaration of Benedict J. Occhiogrosso, In Re: U.S. Pat. No. 8,908,838, Case IPR2015-00637, In the United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In the United States Patent and Trademark Office Before the Patent Trial and Appeal Board, Jan. 26, 2016, 62 pages.

(56) References Cited

OTHER PUBLICATIONS

Declaration of Ivan Zatkovich, In Re: U.S. Pat. No. 8,908,838, Case IPR2015-00637, In the United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, In the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, In the United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, In the United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-74 of U.S. Pat. No. 9,131,045, *CaptionCall LLC* v. *Ultratec Inc.*, Case IPR2015-01889, U.S. Pat. No. 9,131,045, Sep. 9, 2015, 66 pages.
In the United States Patent and Trademark Office Before the Patent Trial and Appeal Board, Patent Owner's Preliminary Response, *CaptionCall LLC* v. *Ultratec Inc.*, Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, In the United States Patent and Trademark Office Before the Patent Trial and Appeal Board, Sep. 9, 2015, 63 pages.
In the United States Patent and Trademark Office Before the Patent Trial and Appeal Board, Petition for Inter Partes Review of Claims 1-18 of U.S. Pat. No. 5,974,116, *CaptionCall LLC* v. *Ultratec Inc.*, Case IPR2015-01355, U.S. Pat. No. 5,974,116, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01355, U.S. Pat. No. 5,974,116, Sep. 18, 2015, 43 pages.
In the United States Patent and Trademark Office Before the Patent Trial and Appeal Board, Decision Instituting Review, *CaptionCall LLC* v. *Ultratec Inc.*, Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, In the United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claim 1 of U.S. Pat. No. 6,934,366, *CaptionCall LLC* v. *Ultratec Inc.*, Case IPR2015-01357, U.S. Pat. No. 6,934,366, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01357, U.S. Pat. No. 6,934,366, Sep. 22, 2015, 37 pages.
In the United States Patent and Trademark Office Before the Patent Trial and Appeal Board, Decision Instituting Review, *CaptionCall LLC* v. *Ultratec Inc.*, Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, In the United States Patent and Trademark Office Before the Patent Trial and Appeal Board, Jun. 8, 2015, 46 pages.
In the United States Patent and Trademark Office Before the Patent Trial and Appeal Board, Petition for Inter Partes Review of Claim 1 of U.S. Pat. No. 7,006,604, *CaptionCall LLC* v. *Ultratec Inc.*, Case IPR2015-01358, U.S. Pat. No. 7,006,604, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01358, U.S. Pat. No. 7,006,604, Sep. 22, 2015, 34 pages.
In the United States Patent and Trademark Office Before the Patent Trial and Appeal Board, Decision Instituting Review, *CaptionCall LLC* v. *Ultratec Inc.*, Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, In the United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claims 1-3 and 5-7 of U.S. Pat. No. 6,493,426, *CaptionCall LLC* v. *Ultratec Inc.*, Case IPR2015-01359, U.S. Pat. No. 6,493,426, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01359, U.S. Pat. No. 6,493,426, Sep. 22, 2015, 40 pages.
In the United States Patent and Trademark Office Before the Patent Trial and Appeal Board, Decision Instituting Review, *CaptionCall LLC* v. *Ultratec Inc.*, Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, In the United States Patent and Trademark Office Before the Patent Trial and Appeal Board, Jun. 8, 2015, 47 pages.
In the United States Patent and Trademark Office Before the Patent Trial and Appeal Board, Petition for Inter Partes Review of Claims 1-4 of U.S. Pat. No. 8,515,024, *CaptionCall LLC* v. *Ultratec Inc.*, Case IPR2015-01885, U.S. Pat. No. 8,515,024, Sep. 8, 2015, 35 pages.
In the United States Patent and Trademark Office Before the Patent Trial and Appeal Board, Patent Owner's Preliminary Response, *CaptionCall LLC* v. *Ultratec Inc.*, Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, In the United States Patent and Trademark Office Before the Patent Trial and Appeal Board, Sep. 8, 2015, 23 pages.
In the United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC* v. *Ultratec Inc.*, Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, In the United States Patent and Trademark Office Before the Patent Trial and Appeal Board, Sep. 8, 2015, 29 pages.
United States Patent and Trademark Office Before the Patent Trial and Appeal Board, Petition for Inter Partes Review of U.S. Pat. No. 10,742,805, *CaptionCall LLC* v. *Ultratec Inc.*, Case IPR2021-01337, Aug. 24, 2021, 65 pages.
United States Patent and Trademark Office Before the Patent Trial and Appeal Board, Declaration of Benedict J. Occhiogrosso, Re: U.S. Pat. No. 10,742,805, *CaptionCall LLC* v. *Ultratec Inc.*, Case IP2021-01337, Jul. 29, 2021, 83 pages.
Rodman, The Effect of Bandwidth on Speech Intelligibility, White Paper, Jan. 16, 2003, Copyright 2003 Polycom, Inc., 9 pages.
United States Patent and Trademark Office Before the Patent Trial and Appeal Board, Petition for Inter Partes Review for U.S. Pat. No. 10,587,751, *CaptionCall, LLC* v. *Ultratec, Inc.*, Case IPR2020-01217, Jul. 1, 2020, 64 pages.
United States Patent and Trademark Office Before the Patent Trial and Appeal Board, Declaration of Benedict J. Occhiogrosso for U.S. Pat. No. 10,587,751, *CaptionCall, LLC* v. *Ultratec, Inc.*, Case IPR2020-01217, Jun. 23, 2020, 106 pages.
United States Patent and Trademark Office Before the Patent Trial and Appeal Board, Decision Granting Institution of Inter Partes Review for U.S. Pat. No. 10,587,751, *CaptionCall, LLC* v. *Ultratec, Inc.*, Case IPR2020-01217, Jan. 27, 2021, 24 pages.
United States Patent and Trademark Office Before the Patent Trial and Appeal Board, Judgment Granting Request for Entry of Adverse

(56) References Cited

OTHER PUBLICATIONS

Judgment After Institution of Trial for U.S. Pat. No. 10,587,751, *CaptionCall, LLC v. Ultratec, Inc.*, Case IPR2020-01217, Apr. 28, 2021, 3 pages.
Declaration of Paul W. Ludwick, In Re: U.S. Pat. No. 6,594,346, Case IPR2013-00545, In the United States Patent and Trademark Office Before the Patent Trial and Appeal Board, May 11, 2014.
Declaration of Paul W. Ludwick, In Re: U.S. Pat. No. 7,555,104, Case IPR2013-00542 and IPR2013-00543, In the United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, In the United States Patent and Trademark Office Before the Patent Trial and Appeal Board, May 12, 2014.
Declaration of Paul W. Ludwick, In Re: U.S. Pat. No. 6,233,314, Case IPR2013-00540, In the United States Patent and Trademark Office Before the Patent Trial and Appeal Board, May 30, 2014.
Declaration of Paul W. Ludwick, In Re: U.S. Pat. No. 5,909,482, Case IPR2013-00541, In the United States Patent and Trademark Office Before the Patent Trial and Appeal Board, May 30, 2014.
Declaration of Paul W. Ludwick, In Re: U.S. Pat. No. 8,213,578, Case IPR2013-00544, In the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, In the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, In the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, In the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, In the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,233,314, Case IPR2013-00540, In the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, In the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In the United States Patent and Trademark Office Before the Patent Trial and Appeal Board, May 30, 2014.
Declaration of Kelby Brick, Esq., CDI, In Re: U.S. Pat. No. 7,555,104, Case IPR2013-00543, In the United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In the United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In the United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In the United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In the United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, In the United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In the United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In the United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, In the United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In the United States Patent and Trademark Office Before the Patent Trial and Appeal Board, Apr. 28, 2014.
Curtis et al., Doctor-Patient Communication on the Telephone, Can Fam Physician, 1989, 35:123-128.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
Cooper, R. J., Break Feature for Half-Duplex Modem, IBM Technical Disclosure Bulletin, vol. 17, No. 8, pp. 2386-2387, Jan. 1975.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education

(56) References Cited

OTHER PUBLICATIONS

Conference, 1993, 23rd Annual Conference 'Engineering Education: Renewing America's Technology' Proceedings, IEEE, pp. 92-97.
Gopalakrishnan, Effective Set-Up for Performing Phone Conversations by the Hearing Impaired, IBM Technical Disclosure Bulletin, vol. 34, No. 78, pp. 423-426, 1991.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Moskowitz, Telocator Alphanumeric Protocol, Version 1.8, Feb. 4, 1997.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Smith, R. L., ASCII to Baudot, Radio Electronics, pp. 51-58, Mar. 1976.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
Vaseghi, Chapter 14: Echo Cancellation, Advanced Digital Signal Processing and Noise Reduction, Second Edition, John Wiley & Sons, Ltd., 2000, pp. 396-415.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
PCT International Search Report and Written Opinion, PCT/US2015/017954, dated Aug. 17, 2015, 15 pages.

\* cited by examiner

CAPTION MODIFICATION AND AUGMENTATION SYSTEMS AND METHODS FOR USE BY HEARING ASSISTED USER

CROSS-REFERENCE TO RELATED APPLICATIONS

This application is a continuation of U.S. patent application Ser. No. 17/180,702, filed on Feb. 19, 2021, which application claims the benefit of priority to U.S. Provisional Application No. 62/979,708, filed Feb. 21, 2020. The contents of each of these applications are incorporated herein by reference in their entirety.

STATEMENT REGARDING FEDERALLY SPONSORED RESEARCH OR DEVELOPMENT

Not applicable.

BACKGROUND OF THE DISCLOSURE

The present invention is related to communication enhancement systems and more specifically to captioning systems for assisting hard of hearing users (e.g., assisted user's (AU's)) in understanding voice communications by remote hearing users where both users use communication devices.

The ability for people to communicate with each other is very important. While most normally hearing and seeing persons do not think much about their ability to perceive meaning in communications (e.g., written language, audible language, visual representations (e.g., expressions, gestures, etc.), etc.) initiated by other people, the communication process is fairly complex. To this end, think of what it takes for a first person to communicate a complex thought to a second person. First, the first person has to impart the complex thought to the second person in some way that can be perceived by the second person. For instance, in the case of written text, a clear transcript of the text which captures the first person's thought has to be provided to and visually perceivable by the second person. As another instance, in a case where the first person speaks to the second person, the first person's voice has to be clearly received and heard by the second person.

Second, the second person has to understand the meaning of each separate word received either in text or in sound. Thus, if the first person uses one or more words that the second person is unfamiliar with, the second person will be unable to perceive the first person's thought even if the second person correctly hears all the words uttered by the first person.

Third, the second person has to be able to stitch the first person's uttered words together to form a more complex concept corresponding to the sequence of uttered words.

Fourth, in many cases, often the more complex concept has to be modified in the second person's mind based on context. Here, context is typically based at least in part on prior thoughts communicated by the first person. For instance, where recent prior thoughts relate to politics, a new complex thought including the word "party" may be automatically associated with politics as opposed to a fun gathering (e.g., "politics" provides context for use of the word "party"). If the second person misperceived prior communications, context is wrong and an intended thought can be wrong.

Fifth, to really understand a communication, in many cases the second person has to consider communication prosody. Here, the term "prosody" is used to refer to elements of speech that are not individual phonetic segments (vowels and consonants) but are properties of syllables and larger units of speech, including linguistic functions such as intonation, tone, stress, and rhythm. In this regard, a single phrase or word can have several different meanings or intentions where each is belied by prosody associated with utterance of the phrase or word. For instance, consider the different prosody with which a person can utter the words "Yeah, right", where different prosodies cause the phrase to reveal agreement or skepticism or to indicate a query.

When it comes to verbal communication capabilities, obviously deaf and hard of hearing persons (e.g., assisted users (AUs)) are disadvantaged as, by definition, they simply cannot consistently perceive clear voiced communications. In addition, because these people cannot hear well, often they cannot pick up on communication prosody and therefore are frequently left with no mechanism for perceiving communication related thereto. Moreover, for an AU that has some hearing capability, when the AU misperceives one or more audible communications (e.g., speech), those misperceptions typically wrongly skew understanding of subsequent communications (e.g., any misperceptions contextually affect understanding of subsequent communications).

Inability or compromised ability to hear has made it difficult and in some cases impossible for AUs to carry on conventional phone communications with hearing users (HUs). To overcome the problems that AUs have using conventional phone systems, an entire industry has evolved for supporting AUs during phone type voice communications. One particularly advantageous solution affords a captioned telephone device to an AU for providing captions of an HU's voice signal to the AU essentially in real time as an HU speaks. Here, while an HU is speaking, the AU reads HU voice signal captions when necessary to determine what the HU said.

In some cases, the captions are generated via an automated speech recognition (ASR) engine that feeds the HU voice signal to software that automatically converts that voice signal to captions. Here, initial captions may be erroneous and in many cases the ASR engine continues to consider caption words in context as more HU voice signal words are converted to text subsequent to any uttered word and makes caption error corrections on the fly. In other cases an HU voice signal is provided to a remote human call assistant (CA) who listens to the HU voice signal and generates CA captions and/or corrections which are transmitted back to the AU's captioned device to be presented as text while the HU speaks.

While existing captioning systems work well for quickly generating highly accurate verbatim HU voice signal captions, some AUs find it difficult to discern caption meanings in real time for several reasons. First, many aspects of spoken language result in captions that have characteristics different than the types of things people are accustomed to reading. To this end, published written language (e.g., books, articles in newspapers, magazines, online publications, etc.) typically includes well thought out and properly constructed sentences. In contrast, spoken language, especially in the context of a two or more person conversation, often includes speaking turns that comprise partial and incomplete phrases, single words or other non-word utterances (e.g., a grunt, a moan, a heavy breadth, etc.). While people are generally comfortable reading well thought out written language (e.g., complete sentences), they simply are not used to reading short spoken language utterances and tend to have a hard time following the meaning of those utterances in real time.

Second, ability to follow partial phrase, single word and non-word utterances is exacerbated by, in many cases, generally discontinuous speech where a speaker may utter the beginning of one thought, then redirect verbally to a next thought only to redirect again to yet a third thought or back to the first thought. In these cases, captions corresponding to discontinuous thought are confusing and exacerbate difficulty of perceiving meaning.

Third, lack of context or misperceived context which often occurs when communicating with an AU exacerbates confusion. Consider an HU voice caption "So that's it". What does this phrase mean without a contextual understanding of what was prior conveyed? Existing captioning systems are supposed to solve this problem by enabling an AU to scroll back in prior text to read prior captions and assess meaning. One problem here is that often, as described above, prior text is in spoken form, not written, and includes only the HU side of the conversation, not the AU's utterances, making it difficult to discern context after the fact. Another problem is that scrolling up requires additional AU activity while actively listening which can be burdensome for some AU's especially older AU's that may be uncomfortable with technology and multitasking while carrying on a conversation.

Fourth, without ability to perceive prolix at times, AUs are at a substantial communication disadvantage that cannot be addressed via captioned devices.

In many cases while two people are talking, one or both are also performing some other parallel task or activity. For instance, in many cases as two people converse via a phone system, one or both of the people may be looking at their schedules to assess availability for a subsequent call or they may be adding tasks to "To Do" lists. Thus, for instance, an AU trying to listen to an HU voice may have to also read and perceive captions and simultaneously use scheduling software to set up a future appointment or add tasks to a list. In the case of an AU, especially an elderly AU that may be uncomfortable with technology in general, multitasking while communicating via voice and viewing captions can be difficult, exhausting and in many cases simply foregone.

SUMMARY OF THE DISCLOSURE

In some embodiments, while an HU and an AU participate in a voice call, a system processor generates verbatim HU voice signal captions, identifies an HU's intended communication for each uttered phrase, and then converts the verbatim captions to enhanced captions that are presented to the AU via a display screen or the like. One advantage associated with enhanced captions is that the enhanced captions often result in better communications between an HU and an AU than possible with verbatim captions. For instance, in some cases enhanced captions can include word simplifications so that complex or confusing words are replaced by simpler and more clear words. As another instance, when an HU utters a long phrase, that phrase may be simplified and shortened to convey the HU's intended communication in a more precise and succinct manner. As one other instance, in some cases where an utterance is part of a larger topic of conversation, each phrase uttered by an HU may be presented in context to avoid confusion that can result from utterances consumed out of context.

Another advantage is that enhanced captions may speed up AU consumption of captions so that captioning services can be provided more rapidly resulting in better alignment between HU voice signal broadcast and caption presentation.

Another advantage is related to reducing the time required to bring captions in line with broadcast HU voice signals when captioning is delayed for some reason. In this regard, at times captions are delayed behind HU voice signal broadcast for some reason so that the two types of communication are not synced which can cause AU confusion (e.g., the AU hears one thing and sees captions that are unrelated (e.g., correspond to prior audio broadcast). With verbatim captions, if captioning is behind by 35 words, the solution is to transcribe and present those 35 words to the AU as quickly as possible. Here, simply presenting 35 words in a block can be overwhelming and result in frustration and confusion. In the alternative, if the 35 words are presented progressively at a typical AU reading rate, catching up to the broadcast voice signal can take a long time. In the present case, by providing an abbreviated summary type caption instead of the verbatim caption, the HU's intended communication can be conveyed in a shorter time so that the caption time delay is reduced or substantially eliminated.

In cases where summary type captions are presented to an AU instead of verbatim captions, another advantage is that error corrections required to captions presented to an AU can be reduced or eliminated. In this regard, while accuracy is important in cases where captions are purported to be verbatim, accuracy is less important in cases where captions are summaries. This is because a summary simply has to capture the communication intended by an HU and present that intended communication for consumption and most intended communications can be discerned despite many verbatim captioning errors. Thus, where an erroneous verbatim caption is generated but the errors do not affect an HU's intended communication, once a summary type enhanced caption is presented to an AU, even if the system identifies the verbatim error and corrects the error, if the correction does not change the HU's intended communication, there is no reason to modify the summary caption presented to the AU.

In a similar fashion, in cases where verbatim captions are presented to an AU, if one or more errors are identified in an initial presented caption but the HU's intended communication is the same between the initial presented caption and a corrected caption, the system may automatically skip error correction to the initial presented caption to avoid distracting the AU. In this case, where an error in a caption presented to an AU causes a discrepancy between what the caption conveys and what a corrected caption would convey, the system would automatically affect an error correction to bring the caption in line with the HU's intended communication.

One other form of caption enhancement is communication augmentation. In this regard, while an HU and an AU participate in a call, a system processor may be programmed to examine text captions for words and phrases of particular importance or interest and then seek out additional information to present to the AU to augment captions. For instance, augmented information may include definitions of complex words or words corresponding to acronyms. As another instance, augmented information may include information derived from Google or other types of internet searches related to caption test or phrases. As one example, if an HU utters the phrase "Green Bay Packers", the system may automatically obtain and present the Packers' last year record, current year schedule and a website link to content related to the Green Bay Packers. Many other forms of content augmentation are contemplated.

In some cases, in addition to or instead of generating enhanced captions, the system may also be programmed to initiate some type of supplemental activity associated with an ongoing HU-AU conversation. For instance, in a case where a physician requests that a patient AU schedule an appointment with an oncologist, the system may automatically access the AU's electronic calendar and identify one or more suitable time slots for scheduling the appointment. Here, the slot selection may be solely based on open or unscheduled time slots or they may be based on more sophisticated information like time to travel to an oncologist's office location from the location at which the AU is scheduled to be located just prior to an open time slot as well as other information.

In some embodiments the disclosure include a method for facilitating communication between an assisted user (AU) using an AU communication device including a display and a hearing user (HU) using an HU communication device, each communication device including a speaker and a microphone and the AU communication device also including a display screen, the method comprising the steps of receiving an HU voice signal as the AU and HU participate in a call using the AU and HU communication devices, respectively, transcribing HU voice signal segments into verbatim caption segments, processing each verbatim caption segment to identify an intended communication (IC) wherein the IC is the communication intended by the HU upon uttering an associated one of the HU voice signal segments, for at least a portion of the HU voice signal segments, (i) using an associated IC to generate an enhanced caption that is different than the associated verbatim caption, (ii) for each of a first subset of the HU voice signal segments, presenting the verbatim captions via the AU communication device display for consumption, and (iii) for each of a second subset of the HU voice signal segments, presenting enhanced captions via the AU communication device display for consumption.

In some cases, the step of transcribing includes using an automated speech recognition engine to convert the HU voice signal segments to verbatim caption segments. In some cases, at least a subset of the enhanced captions includes summary type enhanced segment. In some cases, at least a subset of the enhanced captions includes word simplification enhanced segment.

In some cases, at least a subset of the enhanced captions includes communication contextualization type enhanced segment. In some cases, the method further includes, for each enhanced segment, calculating a confidence factor (CF) indicating likelihood the segment reflects an HU's intended communication. In some embodiments the method further includes the step of, for each CF, comparing the CF to a threshold CF and, when the CF exceeds the threshold CF, presenting the enhanced caption associated with the CF via the AU communication device display.

In some cases, the method includes the step of, for each CF, when the CF is less than the threshold CF, presenting the verbatim caption associated with the CF via the AU communication device display. In some cases, the enhanced captions include first and second sets of enhanced captions and wherein the first set is of a type different than the second set.

In some cases, the method includes visually distinguishing the enhanced captions from the verbatim captions on the display. In some cases, the method includes presenting the verbatim captions in one column on the display and presenting the enhanced captions in a second column on the display. In some cases, the method includes presenting a user interface to the AU and receiving commands via the interface selecting one of verbatim and enhanced captions, the method including presenting verbatim captions when the verbatim option is selected and presenting enhanced captions when the enhanced option is selected. In some cases, the interface also enables the AU to select a third option for presenting each of verbatim captions and enhanced captions.

Other embodiments include a method for facilitating communication between an assisted user (AU) using an AU communication device including a display and a hearing user (HU) using an HU communication device, each communication device including a speaker and a microphone and the AU communication device also including a display screen, the method comprising the steps of receiving an HU voice signal as the AU and HU participate in a call using the AU and HU communication devices, respectively, transcribing HU voice signal segments into verbatim caption segments, presenting each verbatim voice signal segment via the AU communication device display for consumption, processing at least a subset of the verbatim caption segments to identify an intended communication (IC) wherein the IC is the communication intended by the HU upon uttering an associated one of the HU voice signal segments, for each of at least a subset of the HU voice signal segments, using an associated IC to generate an enhanced caption that is different than the associated verbatim caption, and presenting at least a subset of the enhanced captions via the AU communication device display for consumption.

In some cases, an IC is identified for each of the verbatim caption segments. In some cases, the verbatim caption segments are presented in a first vertical column and the enhanced caption segments are presented in a second vertical column. In some cases, each enhanced caption includes a summary type caption that has the same meaning as an associated verbatim caption. In some embodiments the method further includes broadcasting the HU voice signal to the AU via a speaker. In some cases, each of the enhanced captions includes a summary type enhanced caption.

Still other embodiments include a method for facilitating communication between an assisted user (AU) using an AU communication device including a display and a hearing user (HU) using an HU communication device, each communication device including a speaker and a microphone and the AU communication device also including a display screen, the method comprising the steps of receiving an HU voice signal as the AU and HU participate in a call using the AU and HU communication devices, respectively, transcribing HU voice signal segments into verbatim caption segments, presenting each verbatim voice signal segment via the AU communication device display for consumption, for each verbatim caption segment, (i) processing the verbatim caption segment to identify an intended communication (IC) wherein the IC is the communication intended by the HU upon uttering an associated one of the HU voice signal segments, (ii) using the IC to generate an enhanced caption segment that is different than the associated verbatim caption segment, (iii) automatically selecting one of the verbatim caption segment and the enhanced caption segment; and (iv) presenting the selected one of the caption segments on the AU device display screen for consumption.

DETAILED DESCRIPTION OF THE DISCLOSURE

Figure 1:
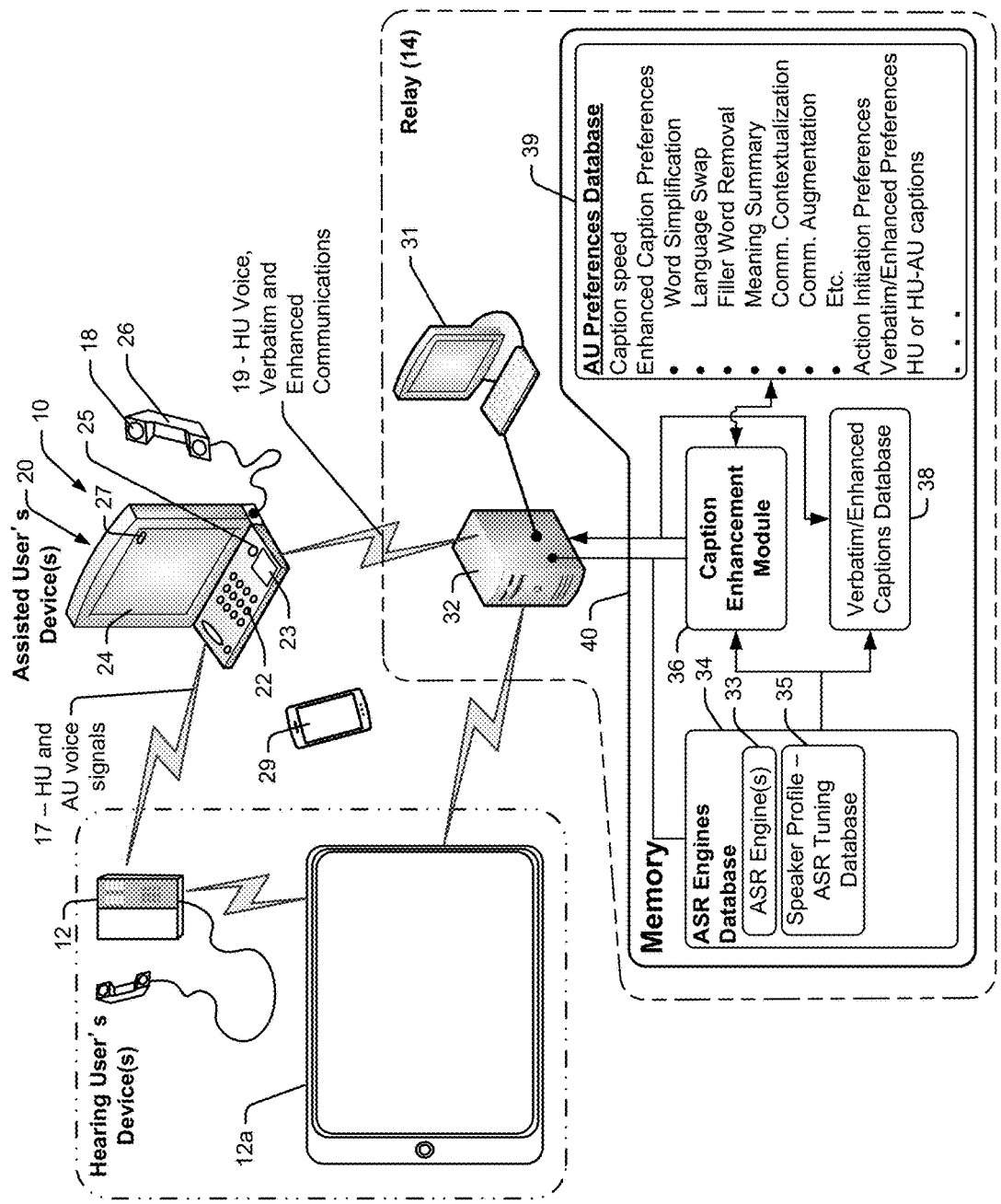
FIG. 1 is a schematic that illustrates a communication system that is consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary communication system 10 that includes at least a hearing user's (HU's) communication device 12 and an assisted user's (AU's) communication device 20 for facilitating communication between a hearing assisted user (AU) and a remote hearing user (HU). In at least some embodiments the HU uses a telephone 12 that includes a phone base subassembly and a receiver including a microphone and speaker for capturing an HU's voice signal and broadcasting an AU's voice signal, respectively. In other cases, the HU may use a wireless smart phone or tablet device 12a instead of telephone device 12 or in addition to the telephone device.

In at least some cases the AU's communication device includes a captioned phone device 20 that includes, among other things, a base assembly including a display screen 24 for visual output, a keypad 22 for receiving tactile input and a handset 26 that includes a microphone (not shown) and a speaker 18 for capturing the AU's voice signal to be transmitted to the HU using device 12 and for broadcasting the HU's voice signal for the AU to hear, respectively. Keypad 22 is typically a 0 through 9 numerical type pad (e.g., akin to the pads on a conventional telephone device) suitable for entering a phone number of an HU's phone device 12 or other HU phone numbers but may also include a full QWERTY board for entering other information (e.g., names, addresses and other information for an electronic contacts file, etc.). Device 20 may also include a touch pad 23 or a hardware button 25 that are purposefully provided in a location that is easily accessible to an AU using the device 20 as described in more detail below so that the AU does not become fatigued during device use from having to stretch out and select on screen icons on display 24 in at least some operating modes.

To further facilitate easy access, a remote control device 29 (e.g., dedicated to the system or an application program loaded onto a smart phone or other portable computing device) may be provided so that an AU can hold a device in her hand with her arm in a comfortable position while still wirelessly interacting with captioned phone device 20 via an interface including virtual buttons on device 29 or via a touch sensitive screen on device 29 that can be used to move a cursor around on the device screen 24 for selecting control icons and other information presented on screen 24. Although not shown, the keyboard and other input devices may also be provided as virtual buttons or the like that are touch selectable on display screen 24. Although not shown, in at least some embodiments, device 20 may cooperate with other input or output devices for facilitating enhanced audio and visual communications such as, for instance, larger display screens, more sensitive microphones and/or higher fidelity speakers included in a tablet or phone type device or other standalone devices, earbuds, a headphone set, etc., where linkages to those devices are wired or wireless (e.g., Bluetooth, 802.11b, NFC, or other wireless protocols) and are automatic (e.g., via automatic wireless pairing) or manual based on some user input to initiate a linkage.

Referring still to FIG. 1, in addition to the HU and AU communication devices, exemplary system 10 includes a remote relay 14. While illustrated system 10 includes relay 14, in other contemplated systems the functions and features describe herein in the context of relay 14 may be performed by other system devices such as, for instance, the AU's device 20 or the HU's communication device 12. In still other cases, two or more system components or processors may cooperate to perform various relay functions and processes. For instance, relay 14 may perform some of the functions described hereafter while AU device 20 performs the other functions.

Relay 14 includes, among other things, a relay server or other computing/processing device 32 that is linked to an electronic storage memory device or system 40 for accessing software engines, modules or computer programs stored thereon as well as to access and update various types of operational information and user preferences described hereafter. In some cases, server 32 may include more than one networked server or processor that cooperate to perform various functions and processes. In at least some cases one or more call assistant's (CA's) workstations 31 may be linked to server 32 for participating in captioning sessions as described hereafter.

Referring still to FIG. 1, in the illustrated embodiment memory 40 includes an ASR engines database 34, a caption enhancement module 36, a verbatim/enhanced captions database 38, and an AU preferences database 39. Engines database 34 includes one or more automated speech recognition (ASR) engines 33, each engine including a captioning software program or module that, when executed, receives voice signals during an HU-AU conversation and converts received voice signals to text captions or transcriptions. Captioning programs or engines 33 are well known in the software arts including the Dragon captioning programs from Nuance Software, Google Voice and other programs. In some cases, the communication programs are general captioning programs that are not trained for captioning specific speaker's voices and that, instead, are optimized for captioning voices of any speakers irrespective of voice characteristics.

In other cases, the system may be configured to tune one or more ASR engines during operation to quickly and accurately caption specific speaker's voice signals. For instance, during an AU-HU call, as an ASR engine 33 is used to generate HU voice signal captions or text, server 32 may compare the generated text to "true" text (e.g., accurate text for the voices signal) and then, based on the comparison, tune ASR engine parameters to increase caption accuracy and speed metrics over time. For instance, in some cases as an ASR uses context from words surrounding words in a caption hypothesis generated by the engine, the engine will correct word hypothesis automatically until the hypothesis no longer changes and, in that case, the final hypothesis will be treated as "true" text for engine training purposes. As another instance, in some cases a human call assistant (CA) associated with relay 14 may use workstation 31 to manually correct automated caption errors (e.g., listen to an HU voice signal and compare what was voiced to ASR text hypothesis to ID and correct errors) and the corrected text may be treated as "true" text for engine training purposes. True text is used to modify engine filters so that prior voice signal-text errors for a specific user voice signal are substantially less likely to occur subsequently. Similar training may be performed on an AU voice signal during one or more conversations with one or several HUs.

Once an ASR engine has been tuned for a specific HU's voice signal, ASR tuning parameters for that voice signal may be stored for use during subsequent calls with that HU so that the training process does not have to be repeated or can be expedited at the beginning of subsequent calls with that specific HU. In addition to storing HU specific ASR tuning parameter sets for specific HU voice signals, in at least some cases the system will also generate and store HU specific voice profiles for each HU voice signal that are useable to identify a current HU voice signal so that association HU specific tuning parameters can be identified at the beginning of any subsequent call. For instance, where an AU routinely converses with 10 different HUs, during initial calls with each HU, the system may identify 20 different voice characteristics of the HU's voice signal that can be used to distinguish one HU voice signal from others and those 20 characteristics are then stored as an HU specific voice profile for that specific HU. Here, HU specific ASR tuning parameters are also stored with the HU specific voice profile. At the beginning of any subsequent AU-HU voice call, the system processes an HU voice signal and uses characteristics thereof to identify an associated HU voice profile and ultimately the HU specific ASR tuning parameter set for the speaking HU.

In at least some cases the task of identifying the right ASR tuning parameter set for an HU's voice signal is expedited by associating a phone number or other calling address of an HU's device 20 (see again FIG. 1) with one or more ASR tuning parameter sets so that the universe of tuning parameter sets to choose from for an HU voice signal is one or a small number (e.g., one for each family member that uses device 20 to make calls in one exemplary case).

In other cases, an HU phone or other device 12 may automatically provide an ASR tuning parameter set to the relay 14 when a call or captioning service commences so that there is no need to identify an HU's voice profile and instead the tuning parameters provided by device 12 can simply be used to customize one or more of the ASR engines. Similarly, an AU device may store an AU's ASR tuning parameter set and provide that dataset to relay 14 at the beginning of a call for use in tuning an ASR engine 33 to increase captioning accuracy of the AU voice signal where required by the system.

While both HU and AU voice signals may be captioned during AU-HU communications in at least some embodiments, unless indicated otherwise hereafter, the systems in the present disclosure will be described in the context of processes wherein only HU voice signals are transcribed to text which is used to communicate with an AU in some fashion.

Referring still to FIG. 1, in operation, when an HU calls an AU or an AU calls an HU to initiate a conversation via a first communication link 17, in at least some cases, at least initially the call may proceed like a normal telephone call where the HU's voice signal is broadcast to the AU and the AU's voice signal is broadcast to the HU for audio communication where there is no visual or captioned communication between the AU and HU. Here, in the event that the AU has difficulty discerning what the HU is saying based on the audio broadcast, captioned device 20 may include a "Caption" or "Transcribe" or other captioning initiation button that is selectable by the AU to initiate a captioning session. In other cases, captioning may be turned on all the time for a specific AU that has particular difficulty hearing HU voice signals.

When captioning is enabled or initiated, in some cases a second communication link 19 (e.g., phone line, Internet connection, etc.) is established between captioned device 20 and relay server 32 and, in at least some embodiments, in addition to broadcasting the HU voice signal via speaker 18 to the AU, captioned device 20 also transmits the HU voice signal to server 32 for captioning. In other cases when captioning is initiated, HU device 12 may be controlled to send the HU voice signal directly to relay 14 for captioning. In any event, the HU voice signal is sent in some fashion to the relay or whatever system processor transcribes voice to text for captioning. In cases where the AU voice signal is also captioned, that signal is also transmitted to the relay or other captioning processor operating within the system.

Server 32 performs any of several different processes to generate verbatim caption text (e.g., captions that are essentially (e.g., but for captioning errors) word for word accurate when compared to HU utterances) corresponding to the HU voice signal. For instance, server 32 may use an HU's calling address and an associated HU voice profile to locate an ASR tuning parameter set for the specific HU and may then use that tuning parameter set to tune an ASR engine for optimized verbatim transcription. In other cases, a CA using workstation 31 (FIG. 1) may generate HU voice captions via typing or otherwise. In still other cases an ASR engine 34 may generate HU voice captions and a CA may listen to the HU voice signal and compare the ASR captions to the voice signal and may make error corrections as known in the art. In some cases, the HU voice captions (ASR, CA or ASR and CA corrected) are transmitted back to captioned device 20 via the second link 19 or another communication link. This captioning and display process only takes a short time (e.g., 1-3 seconds maximum) and therefore captions are presented to the AU at essentially the same time that the HU voice signal is broadcast via speaker 18. In some cases, the HU voice signal broadcast to the AU may be delayed for a short time (e.g., 1-3 seconds) so that text and voice are presented more simultaneously. In cases where an AU voice signal is captioned, a similar captioning process is performed, and the captions may be presented to the AU via device 20 in at least some cases. In other cases, the AU captions may be used by the system for other purposes such as, for instance, identifying communication context or current topics of conversation that can be used to inform understanding of HU voice communications.

Referring still to FIG. 1, in at least some cases memory 40 also maintains a caption enhancement module 36 that converts verbatim HU voice captions to "enhanced" captions. Here, "enhanced" captions can take many different forms including but not limited to and following and combinations of the following: (i) word simplification, (ii) language swap, (iii) filler word removal, (iv) meaning summary, (v) communication contextualization and (vi) communication augmentation. Each of these different forms of caption enhancements may be based either on a single specific utterance or both a specific utterance and other utterances prior to the specific utterance. Hereafter, unless indicated otherwise, enhanced captions based only on a single utterance will be referred to as a single utterance enhanced caption while captions based multiple utterances (e.g., a current utterance as well as at least some prior utterances) will be referred to as multiple utterance enhanced captions. In the case of multiple utterance enhanced captions, in some cases that type of caption may be based solely on an HU's utterances while in other cases that type of caption may be based at least in part on utterances from each of an HU and an AU during a call. In some cases, multiple utterance enhanced captions may be based at least in part on HU utterances prior to a specific call. For instance, in the case of an oncologist that speaks to many different patients about similar diagnosis and treatment plans each day, the oncologist may routinely utter the same or very similar phrases to each patient so that patterns emerge and can be used to facilitate enhanced captioning activities.

In the case of word simplification, the idea is that a complex word or phrase in HU voice captions is replaced by a simplified word or phrase that has essentially the same meaning. As some instances, in a phrase uttered by an HU, the word "perplexing" may be replaced by the phrase "difficult to understand", the term "exultant" may be replaced by the word "happy" and the word "staid" may be replaced by the word "serious". As other instances, where an HU uses an acronym, the system may automatically replace the acronym with the words associated therewith or may add the associated words in brackets after the acronym within a caption phrase.

Here, it is contemplated that enhancement module 36 (FIG. 1) may store or have access to a language simplification thesaurus/acronym reference database or the like where words and phrases and synonyms therefore are stored where different words and phrases having comparable meanings are ranked in order of complexity or sophistication so that when a complex word or phrase appears in a caption, the system can select a related and less complex word or phrase (e.g., a simpler rank) to swap into the caption to facilitate language/word simplification.

Language swap enhancements may occur when an AU speaks primary and secondary languages and a word or phrase in the AU's secondary language has several different meanings that each correspond to different words in the AU's primary language. For instance, assume an AU's primary and secondary languages are Spanish and English, respectively. Here, if an HU voice caption includes the phrase "Are you going to join the party?", the word "party" could be confusing as it could mean a fun gathering or a political party. In Spanish, the words "fiesta" and "partido" clearly mean a fun gathering and a political party, respectively. Thus, where context from the HU and AU voice communications can be used to determine that the HU meant a fun gathering when the word "party" was uttered, the system may automatically swap in the word "fiesta" for "party" so that enhanced caption text reads "Are you going to join the fiesta?" Here, again, the system may maintain a language swap reference database accessible and useable for identifying when words should be replaced to increase likelihood of AU understanding an intended communication by an HU.

Filler word removal enhancements simply means that when a sound, word or phrase includes an utterance that adds no discernable meaning to a larger phrase, any caption corresponding to the word, phrase or sound is removed from the HU voice captions. So, for instance, if an HU utters the sounds, "Um, ah, Hmmmmm, . . . " in the middle of a phrase, captions corresponding thereto can be removed thereby shortening the length of the overall captions presented to the AU. Here, in addition to eliminating meaningless captions, the amount of meaningful captions that can be presented on the display screen 24 of limited size can be increased substantially in many cases. In addition, meaningful captions can persist on a display for relatively longer durations when filler words that have no meaning are not presented.

To assess when utterances have no effect on meaning of larger including phrases, the system may maintain a list of hundreds of utterance captions that typically have no bearing on the meanings of phrases that include those utterances and may, at least initially, remove those captioned utterances from larger including phrases. In at least some cases when an utterance caption is initially removed from an including phrase, the system may perform parallel processes on the including phrase with the removed utterance and without the removed utterance to assess the HU's intended communications for each and to compare if removal of the utterance caption has any effect on caption meaning. In the rate case when a removed caption did affect ultimate meaning of an including phrase, the system may automatically go back in the caption presented to the AU and modify the caption to include the initially removed utterance caption to change meaning. Any corrections in captions presented to an AU may be in line and may be highlighted or otherwise visually distinguished so that the AU can perceive that a caption meaning has changed based on a caption correction.

Meaning summary enhancements occur when enhancement module 36 determines the meaning of a phrase and summarizes that phrase in a shorter, more succinct and ideally more quickly digestible form. In this regard, software programs (e.g., Dialogflow from Google, LEX from Amazon, etc.) are well known that can be trained to process verbatim captions and identify actual meaning of the verbatim captions. Once an intended meaning has been identified, the system can often summarize that meaning in a shorter and clearer manner than the way the information was expressed by a speaker and the summary can be provided instead of or in addition to the verbatim caption to increase consumption speed as well as understanding of the intended communication.

Communication contextualization is used to generate contextualized captions so that a caption or communication and its context can be fully understood on its own substantially independent of other prior communications. To this end, during a typical conversation, participants typically serially communicate about a small set of general topics and, while talking about each separate general topic, talk about more detailed sub-topics or points of interest related to the general topic. Here, instead of prefacing every specific sub-topic or comment with some type of association to one of the general topics, participants typically assume that utterances are contextually associated with a persistent general topic until there is some communication queue that changes the general topic of conversation. Thus, for instance, during the beginning of a conversation, an HU physician and an AU patient may talk initially and briefly about recent weather, then about last weekend's football game, then about test results for a recent patient test and finally about scheduling an appointment with an oncologist. Here, there are four general topics including the weather, a recent game, test results and scheduling a new appointment. While discussing one of the general topics (e.g., weather), the doctor and patient would assume all subtopics discussed to be associated with that one general topic. Thus, a physician's comment that "It was really a mess" during a portion of the conversation that occurs while discussing the weather would be associated with the weather and not the game, the test results or the appointment scheduling topics to follow. Similarly, a physician's comment that "We found a blockage" during a portion of the conversation that occurs while discussing test results would be associated with the test results and not the weather, the game or subsequent appointment topics.

Communication contextualization is used by the system to add context to at least some utterances so that if an AU is confused as to context, display screen 24 can be referenced to quickly assess context and better understand either a verbatim caption or some type of enhanced caption. For instance, in the above example where a doctor utters "It was really a mess", the system may automatically present the caption "The weather was really a mess" and, where the doctor utters "We found a blockage", the system may automatically present the caption "Reviewing the test results we located a blockage", to provide context to each of those utterances so that each utterance is understandable on its own. Context may be provided in many other ways, some of which are described hereafter.

In some cases, contextualization may only be applied to specific topics. For instance, in the case of a physician that routinely discusses test results, diagnosis, prescriptions and next appointments with patients, the system may be programmed for that physician to attempt to identify each of those general topics of conversation and to contextualize only utterances related to those topics as opposed to any of thousands of topics that an HU and AU may discuss. Here, by limiting the number of topics of conversation supported by the system for a specific HU or AU or generally, the ability for the system to clearly and accurately associate utterances with specific topics of conversation is enhanced appreciably.

Cases where contextualization is based on prior HU utterances are examples of multi-utterance enhanced captions where an ultimate enhanced caption associated with a specific HU utterance is modified, typically to be more informative, based on prior HU utterances during a call. Thus, again, a verbatim utterance "We found a blockage" may be enhanced and changed to "Reviewing the test results we located a blockage" based on prior HU utterances that are usable to determine the current topic of conversation related to the verbatim utterance. Thus, in some cases, server 32 uses the captions to assess instantaneous conversation contexts as well as to identify changes between contexts during a conversation. To this end, for instance, server 32 may be programmed to recognize typical context changing phrases such as "Let's turn to . . . " or "Why don't we talk about your . . . ", etc. In some cases, server 32 is programmed to simply assume a new context when one or a threshold number of uttered phrases have nothing to do with a prior context and/or are related to a second topic that is different from a prior topic. For instance, where three consecutive phrases are football related and have nothing to do with weather, server 32 may be programmed to determine that the context changed from weather to football and may automatically change captions previously presented to an AU so that the modified text reflects the new topic of conversation (e.g., football).

Communication augmentation is used to embellish the meaning of what is said in a voice signal. For instance, where a hearing user states "I really liked the Hamilton show last night", in reference to a popular musical/theatrical performance that occurred the prior evening, augmentation may include accessing a review of a show called "Hamilton" that occurred locally near an HU's home and presenting the review via the captioned device display 24. As another instance, augmentation may include identifying the definition of a complex word uttered by an HU and presenting that definition in text adjacent to or in some associating way relative to the word within a caption presented to an AU. As still one other instance, where an HU physician asks an AU to schedule an MRI session, the system may identify MRI as a sub-topic and may use Wikipedia or some other on line resources to provide textual information related to what an MRI is and what it is used for. Many other types of automatic augmentation are contemplated.

In at least some embodiments it is contemplated that, in addition to generating enhanced captions of different types as described above and in more detail hereafter, the system may also operate to automatically initiate various actions that are useful to an AU or at least to generate and provide action suggestions to an AU based on what is said during an AU-HU conversation. For instance, where an HU doctor utters the words "I want you to schedule an appointment with an oncologist can you hold on the line?", the system may automatically recognize the request to schedule the AU for an appointment, access an AU's electronic on-line schedule to identify scheduling options for the AU and present the AU's next week schedule with open time slots during normal business hours highlighted as selectable options for scheduling the appointment. Once the call is transferred to a scheduling assistant, the system may listen for an oncologist's identity and once the oncologist is identified, the system may automatically identify the oncologist's office location and a duration of time required to travel from the AU's scheduled locations preceding the AU's open schedule time slots to the oncologist's office location as well as travel times from the office location to the AU's scheduled locations subsequent to the open time slots and then limit scheduling options suggested to the patient accordingly. Where an appointment time and location are confirmed verbally, the system may automatically present the scheduling option via display screen 24 (e.g., as a selectable scheduling icon) or the like to be added to the patient's schedule. In at least some embodiments many other action initiation processes based on HU utterances, AU utterances or combinations of HU and AU utterances are contemplated including but not limited to, ordering medications or supplements, placing orders for products or services, identifying products or services that may be useful to an AU, generating reminders for an AU, instantiating or updating AU task lists, etc.

Referring yet again to FIG. 1, in at least some embodiments all verbatim and all enhanced captions are stored in a database 38 for subsequent access by server 32 for various purposes. For instance, in the case of multi-utterance enhanced captions, prior recent HU utterances are needed to generate enhanced captions for most recent utterances and subsequent utterances in at least some cases. Similarly, prior enhanced captions may also be used to enhance current or subsequent utterances in at least some cases. Where verbatim and/or enhanced captions are stored at the relay, in at least some cases all those captions are erased completely from memory at the end of a call. In other cases, captions may only be stored for only a short duration (e.g., one minute) during an ongoing call so that the captions are useful to inform subsequent enhanced captions for a short time. In still other cases, call captions (verbatim and/or enhanced) may be stored in an AU's device memory or some other database that is controlled entirely by the AU in the cloud or on some other server to ensure privacy.

AU's may have different preferences when it comes to enhanced captions and action initiation options. For instance, a first AU may want the system to facilitate all enhanced caption options, a second AU may prefer only word simplifications, a third AU may prefer word simplifications and context augmentation, a fourth AU may want meaning summary and context augmentation and a fifth AU may simply want verbatim captions without any enhanced caption options. In many cases a specific AU's preferences will not vary substantially between calls and, for that reason, it is contemplated that in at least some cases memory 40 will include AU preferences database 39 that, for each AU, lists the AU's enhanced caption and action initiation preferences. In some cases, an AU's preferences may be applied to all HU calls. In other cases, an AU may have HU specific preferences which are stored in a relay or device 20 database or memory device and which are implemented once a specific HU's voice signal is identified at the beginning of a call. Thus, for instance, for a first HU, an AU may prefer word simplification and communication contextualization, for a second HU, the AU may prefer meaning summary enhanced captions and for a third HU, the AU may prefer verbatim captions without any enhancements. Here, the system would prescribe AU preferences for each of the first, second and third HUs.

When an AU's device 20 establishes a communication link to the relay 14, relay 14 automatically identifies the AU via a device identifier or the identifier in combination with the AU's voice signal (e.g., based on the AU voice profiles stored in database 35) or other information and accesses the AU's enhanced caption and action initiation preferences in database 39. In other cases, the AU device 20 may maintain preferences for an AU that routinely uses device 20 and may provide those preferences to server 32 upon linking thereto. The preferences are used to configure enhancement module 36 so that server 32 facilitates the AU's preferences automatically for each call unless the AU manually changes one or more preferences for a specific call. Again, in cases where an AU has defined enhanced caption and/or action initiation preferences for a specific HU, upon identifying the HU or the HU's voice signal, those HU specific preferences are implemented for the specific HU.

In at least some cases, some caption enhancements can be performed relatively simply. For instance, in the case of many language simplification enhancements (e.g., where a complex word is replaced via a simpler and more familiar word), the system processor can simply employ a thesaurus to identify synonyms as replacement candidates for relatively complex words that appear in a caption. In at least some cases it is contemplated that thesaurus entries may be ranked from most familiar to least familiar and, when a complex caption word is identified, the server may simply replace the complex word with the most familiar word (e.g., highest ranked word) in the thesaurus.

In most cases caption enhancements require at least some degree of understanding of the context in which words are used in order for the enhancement to be implemented. For example, in many cases even language or word simplifications (e.g., replacement of a complex word with a simple or more widely used word) require more than just a correctly spelled word in order to identify simplifying replacements. For instance, the word "manual" may be used as either a noun (e.g., a handbook) or an adjective (e.g., labor-intensive) and, if that word is to be replaced, the context in which the word is used within an utterance would need to be known in order to replace the word with a simplified adjective or a simplified noun. Similarly, the word "complex" can be used as an adjective or a noun and which words can be used to replace the word "complex" in a sentence will therefore be a function of the context in which that word is used. Likewise, word swaps (e.g., replacing the word "party" with "fiesta" or "partido") require an understanding of context that surrounds the original word prior to selecting a replacement word. Filler word removal (e.g., eliminating words like "um", "ah", "gee", "Oh", Hmmm . . . ", etc.) also requires contextual understanding so that those words are not eliminated from a caption when they actually have meaning.

Hereafter, unless indicated otherwise, the phrase "intended communication" (IC) will be used to refer to the intended meaning of a phrase or voiced communication from an HU and, in cases where captions are generated for an AU's voice signal and meanings of those captions are generated, also to the intended meaning of a phrase or voiced communication from the AU. The process of determining an HU or AU IC will be referred to as "IC identification".

To enable IC identification needed to drive any of language simplification, word swapping, filler word removal, meaning summaries, communication contextualization and communication augmentation as well as to drive any type of action initiation, full understanding of the meaning of an utterance is required so that a speaker's intended meaning or intended communication is not lost in translation. Thus, here, it is insufficient for the system to simply perceive the meanings of separate words and instead the system has to be able to ascertain overall ideas or intended messages that are being delivered via utterances so that those ideas and messages can be rephrased, shortened or otherwise smartly enhanced resulting in better, more-clear and more rapid communication with an AU.

For these reasons, in at least some embodiments of the present disclosure, an intended communication (IC) identification sub-system is contemplated for identifying the intended meanings of utterances generated during AU-HU communications where those meanings are then used to drive enhanced caption processes in any one or a combination of the ways described above. Here, the general idea is to be able to effectively identify a clear and succinct IC for many and in some cases most HU utterances (and AU utterances in at least some cases) that occur during a normal conversation with an AU and then present enhanced captions that clearly state the IC to the AU as opposed to what the HU actually uttered (e.g., verbatim captions), thereby increasing communication effectiveness.

One problem with identifying ICs for each possible HU utterance (and AU utterance in some cases) is that there are literally thousands of ways to express most ideas or meanings and defining all those ways as part of an IC identification system is daunting and likely impossible via simple brute force manual specification of all possible ways to express all possible intended communications. In the present case one partial solution is to identify a set of intended communications that are commonly expressed by HUs and AUs during phone calls as a possible intended communication (PIC) set and, for each of those PICs, use a machine learning system to generate a large number of "associated phrased" that correspond to the PIC (e.g., have essentially the same meaning as the PIC) so that during operation, when one of the large number of associated phrases is received, the system can associate the utterance with the PIC and then replace the utterance with a simplified phrase or other enhanced caption that is consistent with the intended communication (e.g., consistent with the PIC).

To this end, Google's Dialogflow software and other similar software modules and systems (e.g., Amazon's LEX, etc.) have been developed primarily for fielding verbalized user queries or other user utterances (e.g., answers to automated clarifying queries) wherein any user utterance is associated with a specific user intent and then a response process associated with that intent is performed. For instance, a bike owner may call a bike shop to schedule an appointment to replace a tire and, once greeted by an automated voice and asked how the user can be helped, the user may utter "I need to get a tire fixed." In the alternative, the user may utter the phrase "I want to have my bike serviced" or "Can I bring my bike in?" Here, regardless of the user's actual utterance, the system examining the utterance and recognizing the user's intent to schedule a maintenance appointment, may confirm the user's intent and may then automatically walk the user through selection of a calendar appointment for dropping off the user's bike for repair.

In at least some cases, once a general intent is identified, the Dialogflow or other system module may be programmed to examine the utterance to identify qualifying parameters that qualify the intent and makes the intent more specific. For instance, once the intent to schedule a maintenance appointment is identified, the system may be programmed to search the transcribed utterance for a date, a day, a time, etc. As another instance, the system may be programmed to search the transcription for the words "tire", "brake", "new part", "inventory", etc. Knowing a general intent and other uttered qualifying parameters enables the system to ascribe a richer meaning to the user's utterance and may be used to identify a more specific activity for the system to perform in response.

In the above example, the system is programmed to recognize a user's intent regardless of how the intent is phrased. To do this, during a commissioning procedure, a system programmer knowing a possible first user intent (e.g., to schedule an appointment, speak to a sales representative, determine store hours, order a part, etc.) enters that first intent into the system and then specifies (e.g., enters into a computer system) a small set (e.g., 3-6) of differently worded phrases that have similar meaning and that are more or less consistent with the first intent. Once the small intent specific phrase set has been specified for the first intent, a machine learning module uses that small intent specific phrase set to generate a massive intent specific phrase set (e.g., hundreds or even a thousands of phrases) including differently worded phrases that are all generally consistent with the first intent. Once a large intent specific associated phrase set for the first intent is generated and stored, the programmer specifies qualifying parameter sets for the first intent that have a good probability of being uttered by a speaking user in conjunction with a phrase associated with the first intent that can be used to more specifically define user intent associated with an utterance. A list of qualifying parameters is stored for the first intent. The process of specifying an intent, a small subset of phrases that are consistent with the meaning of the intent, using machine learning to generate a large associated phrase set that is associated with the intent and specifying a qualifying parameter set for the intent is performed for many possible or anticipated intents (e.g., 2000) and those intents, associated large phrase sets and qualifying parameter sets are stored for subsequent use in understanding uttered phrases.

After system commissioning, during system use, when a voice signal is received, the signal is transcribed into caption text and the caption text is compared to at least a subset of the phrases in the large associated phrase sets to identify a closest match. Once a closest matching phrase is identified, the intent associated with the closest matching phrase is selected as an intent associated with the caption text. Next, a processor accesses the qualifying parameter set for the selected intent and attempts to identify any of those parameters in the caption text. Identified qualifying parameters are used to more specifically identify the speaker's intent. The intent and qualifying parameters are used to perform one or more actions in response to the received voice signal and that are consistent with the intent associated with the initial utterance.

In the present case, for enhanced caption processes, Dialogflow or some other comparable software application program may be used to specify a large number (e.g., hundreds or even thousands) of possible intended communications (PICs) that are akin to Dialogflow intents and a separate large associated phrase (AP) set and a separate qualifying parameter (QP) list for each of the PICs which are correlated and stored in system database 40. Hereafter, unless indicated otherwise, the phrase "PIC dataset" will be used to refer to a single PIC and its associated large AP set and QP set.

In at least some cases it is contemplated that a generalized set of PIC datasets (e.g., a "generalized PIC set") may be developed and used to handle all phone calls for all HUs and AUs, regardless of user identities. In other cases specialized PIC datasets may be created and used in special circumstances (e.g., based on HU identity, AU identity, HU specialty, HU employer, etc.) to identify ICs either independent of a generalized set or in parallel or otherwise in conjunction with a generalized set of PIC datasets as is described in greater detail hereafter. Thus, here, when captioning is initiated, the system may use user identity to ID a user specific PIC dataset as well as user specific enhanced captioning preferences. Once a speaker's intended communication is determined, a system processor performs one or more of the caption enhancing processes described above and hereafter per AU preferences 39.

In systems that are consistent with the present disclosure, with most enhanced caption preferences, a speaker's IC is only needed as seed information for generating an enhanced caption or information set of some type to present to the AU. In these cases, there is no action that occurs because of the meaning of the utterance and instead, the caption enhancing action is prescribed by the system as specified in an AU's preferences or as programmed. For instance, where an AU's only caption enhancement preference is to simplify caption words, irrespective of the IC ascribed to the utterance, the only actions performed are to replace complex words with simplified words that have essentially the same meaning and to present the enhanced caption (e.g., caption with simplified words replacing complex words) to the AU. As another instance, where an AU's only caption enhancement preference is to provide meaning summaries, irrespective of the IC ascribed to the utterance, the only actions performed are to generate a summary caption for the transcribed text and present the summary caption (e.g., the enhanced caption) to the AU.

In cases where two or more caption enhancing preferences are specified for an AU, a first of the preferences may automatically take precedence over the second of the preferences so that the first preference is processed first followed by the second preference. For instance, where an AU specifies both a word simplification preference and a meaning summary preference, the system may automatically perform any word simplifications first followed by a meaning summary. Thus, there may be a default hierarchy of caption enhancing preferences that is automatically applied to an AU preference set. In other cases, the system may enable an AU to rank importance of enhanced captioning preferences during a commissioning procedure of some type so that the order or enhancements to captions can be customized for an AU.

In still other cases performance of enhanced caption preferences may be contingent on each other. For instance, where an AU's preference set includes meaning summary and word simplification, the system may be programmed to attempt to perform a meaning summary first on every HU utterance and the system may only perform a word simplification when the system cannot generate a highly accurate meaning summary. As another instance, where an AU's preference set includes meaning summary and communication augmentation, the augmentation may be premised on successful meaning summary.

Regarding the IC identification process in general, while systems are contemplated that can identify ICs for a majority of HU utterances, it has been recognized that in most cases the ICs of at least some HU (or AU) utterances will not be discernable or that the accuracy of a discerned IC will be dubious. For instance, in at least some cases, despite extensive commissioning to support large numbers of PICs, an HU may utter a phrase that cannot be reasonably associated with a specific PIC or where confidence in an utterance-PIC association is low.

In most Dialogflow based systems, inability to identify an intent or meaning is a problem as actions to perform based on an intent obviously cannot be performed unless the speaker's intent is known. In the case of a captioning system as in the present disclosure, even when a system cannot determine a communication meaning for an utterance, there is a relatively good fall back option when a speaker's intended communication cannot be confidently identified which is to simply present verbatim text to an AU instead of a preferred enhanced caption of some type. Thus, in some cases where the disclosed processor/server cannot identify an IC for an utterance, the server may simply default to providing a verbatim caption instead of an enhanced caption.

In some embodiments each IC identified by the system may be assigned a confidence factor indicating a calculated likelihood that the IC is accurate. Here, for instance, assume that a caption corresponding to an HU's utterance closely matches only one phrase in one large associated phrase set associated with a first PIC and is appreciably different than all phrases in all other large associated phrase sets that are associated with all of the other system supported PICs. In this case, a high confidence factor would be assigned to the first PIC. In contrast, assume that a caption corresponding to an HU's utterance is most like one phrase in one large associated phrase set but is still very different than that one phrase. In this case a midlevel confidence factor may be assigned to an identified IC. As another example, assume that a caption corresponding to an HU's utterance is similar to phrases that are in large associated phrase sets corresponding to first, second and third different PICs. Here, a low confidence factor may be assigned to an identified IC. In other cases, verbatim captions may be low confidence, and, in those cases, any derived IC would likewise be associated with a low confidence factor.

In cases where an identified IC confidence factor is below a threshold level (e.g., 85%, 90%, 95%, whatever is acceptable within the industry or to an AU), in at least some cases the system will be programmed to simply ignore low confidence ICs. In these cases, instead of performing some enhanced caption function, original transcribed verbatim text may be presented to the AU for consumption. In other cases where low CF ICs occur, the system may be programmed to provide an enhanced caption based thereon along with an associated verbatim caption (e.g., in left and right columns on a display screen) for AU consideration.

In most cases it is expected that enhanced captioning will be highly effective for most HU utterances. In this regard, while HUs are obviously free to voice whatever they want during phone calls, in most cases and on most calls, most if not all HU utterances can be successfully associated with a relatively small set of anticipated PICs. For example, for most calls, it is believed that if the enhanced captioning system is programmed to support a few hundred anticipated or common PICs, the system will be able to successfully identify more than 85% of the ICs associated with a typical HU's utterances and therefore will be able to successfully enhance more than 85% of the captions generated by the transcription system. In a case where the system is programmed to support two to five thousand PICs, the system should be able to successfully identify more than 90% of the ICs associated with a typical HU's utterances and therefore will be able to successfully enhance more than 90% of the captions generated by the transcription system.

Even in the case of a relatively ineffective enhanced captioning system where only 50% or even 25% of captioned phrases can be turned into enhanced captions of an AU's preferred type, the system can be programmed to provide all possible enhanced captions with verbatim captions provided as a backup to enhance and appreciably expedite communications.

While the system described above assumes a generalized PIC set (e.g., generalized set of PIC datasets (e.g., PICs and corresponding large associated phrase sets and qualifying parameter sets)) developed for general use, in some cases it is contemplated that specialized or customized PIC set (e.g., specialized set of PICs and associated large phrase sets and qualifying parameter sets) may be developed for specific industries, specific HUs, specific enterprises (e.g., a large medical practice) or specific types of HUs (e.g., physicians, a specific physician type, IT specialists, etc.). In these cases, depending on who an AU is speaking to, the relay 14 processor may access one or more of the specialized PIC sets and use that set(s) to perform enhanced caption processes more effectively or accurately. Thus, for instance, if an AU is participating in a phone call with her dermatologist, a dermatology PIC set may be accessed and used for IC identification. Here, in addition to using the dermatology PIC set, the system may also use the generalized PIC set so that more PICs are supported by the system in operation. Again, HU voice or identity may be assessed in many different ways at the beginning of any call and used to select optimized PIC datasets to drive caption enhancements.

As another example, people working in a particular high-tech industry may routinely express intended communications that are unique to that industry and which would be difficult to associate with generalized PICs because of the unique intended meaning, phrases or terms used in the industry, etc. Here, an industry specific PIC set may be specified and stored for use when an AU and/or an HU on a call works in the industry associated with the specific PIC set.

Figure 2:
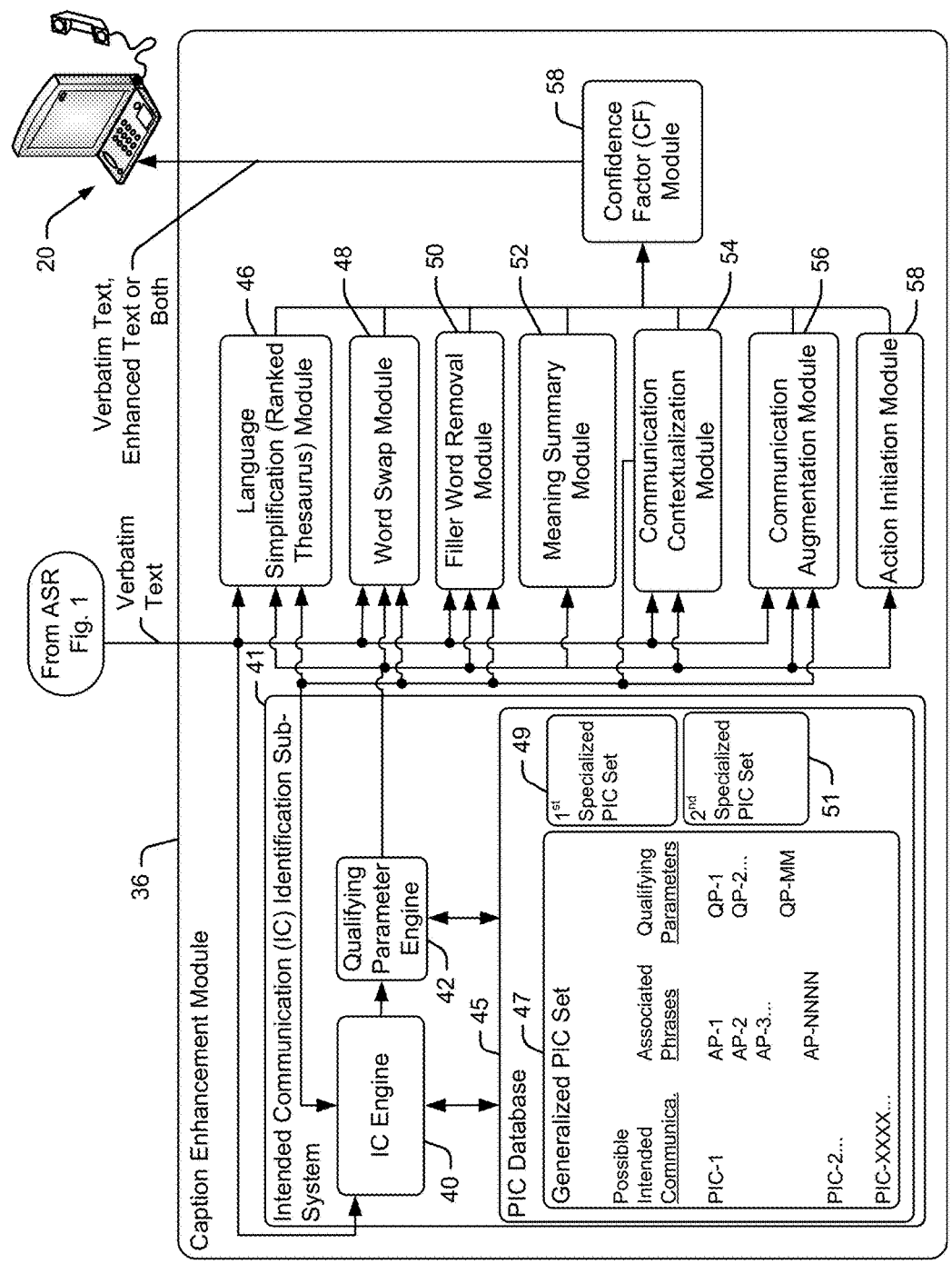
FIG. 2 is a schematic that illustrates the intended communication (IC) identification subsystem from FIG. 1 in greater detail.

Referring now to FIG. 2, the exemplary caption enhancement module 36 receives verbatim text from the ASRs in FIG. 1 and generates enhanced captions that are consistent with the AU caption enhancement preferences 39. The enhanced captions are presented to the AU using device 20. In the exemplary system, caption enhancement module 36 includes an intended communication (IC) identification sub-system 41 and a plurality of enhancer modules 46 through 58 for enhancing the received verbatim text.

Identification sub-system 41 includes an IC engine 40, a qualifying parameters engine 42, and a possible intended communication (PIC) database 45. Exemplary database 45 includes a generalized PIC dataset 47 that includes a list of possible intended communications (PICs) that are supported by the system. For instance, the PIC list includes PIC-1, PIC-2 through PIC-N. Each PIC comprises a possible intended communication which specifies a possible meaning for an HU utterance. For instance, PIC-1 may be "How are you feeling?" while PIC-2 may be "We received your test results."

Database 45 also includes a large associated phrase set for each of the PICs. For instance, the associated phrases associated with PIC-1 include AP-1, AP-2, AP-3 through AP-NNNN. Where PIC-1 includes the intended communication "How are you feeling?", AP-1 may be "What are you feeling right now?", AP-2 may be "Are you feeling good right now?", AP-3 may be "What are your current physical conditions?", etc. Where PIC-2 includes "We received your test results.", associated Aps may include "Your test results are back.", "Your labs are complete and we have received data back.", "Your blood work scores are back from the laboratory.", etc.

Database further includes a qualifying parameter set for each PIC including, for instance, QP-1 through QP-MM that correspond to PIC-1. Where PIC-2 is "Your test results are back.", exemplary QPs may include "blood work", "flu", "negative", "positive", "good", "bad", etc.

Each PIC and associated AP set and QP set is referred to above and generally herein as a PIC dataset (e.g., PIC-1, AP-1 through AP-NNNN and QP-1 through QP-MM comprise a first PIC dataset). Exemplary first and second specialized PIC sets 49 and 51 are also illustrated which may be used in some exemplary systems that are consistent with the present disclosure.

In operation, upon receiving verbatim captioned text associated with an HU utterance, IC engine 40 analyzes the verbatim text by comparing the captioned text to at least a subset of the associated phrases in PIC set 47 (and or sets 49, 51, etc.) and, once a best matching associated phrase is identified, the PIC correlated with the best matching phrase is selected as the IC for the phrase. Next, parameters engine 42 accesses the qualifying parameters for the selected PIC and attempts to locate at least a portion of those parameters in the utterance. When QPs are located in the utterance, they are used along with the PIC to generate a more detailed IC with additional QP information. Hereafter, unless indicated otherwise, a more detailed IC based on one or more QPs will be referred to as a qualified IC ("QIC"). At this point a QIC is associated with the utterance and therefore caption enhancement preferences can be applied.

Referring to FIG. 2, after a QIC is associated with an HU utterance, control passes to the caption enhancing modules (e.g., 46, 48, etc.) where AU preferences for caption enhancements are implemented. While the caption enhancements are shown in parallel, it should be appreciated that those enhancements may be performed in series or in partial series and partial parallel, in full (e.g., each module may enhance captions in some way) or in part (e.g., only one or a subset of the modules 46 through 58 may operate to enhance captions).

In some cases, enhancement modules use only an QIC associated with an utterance to generate enhanced captions (e.g., does not use the verbatim text). For instance, in the case of the meaning summary module 52, that module is provided to simply provide a summary of a verbatim caption and therefore the module only needs the QIC to generate the summary. For instance, where an HU utters the phrase "Well, ah, we received the thrombocytes count and other information from the laboratory today at noon and, um, ah, would like to share the results with you at this, ah, time.", the summary module may generate the summary phrase "Your blood work test results are back." As another instance, the same phrase may be summarized as "Your results are back." and may be presented in the context of a topic indicator (as identified by communication contextualization module 54 described hereafter) like "Blood test results from St. Mary's Lab".

In other cases a module may use an IC associated with verbatim text to understand the "meaning" of the text or how a specific word in the verbatim text is being used and then may also require the verbatim text which can be modified as a function of the IC. For instance, in at least some cases the language simplification module and filler work removal module may use an IC associated with an utterance to assess the meanings of specific words within the utterance and may then identify simplified words or phrases for portions of the verbatim text and swap the simplified words into the verbatim text and also may remove filler words prior to presenting to the AU. For example, where an HU utters the phrase "Well, ah, we received the thrombocytes count and other information from the laboratory today at noon and, um, ah, would like to share the results with you at this, ah, time.", the system may identify an IC and use the IC to understand the meaning of the verbatim utterance and then swap in words resulting in the following phrase: "We received the platelets count and other information from the lab today and would like to share the results."

Referring still to FIG. 2, in at least some cases, the caption enhancement modules include a communication contextualization module 54 which is programmed to monitor identified ICs (e.g., ICs that the system associates with HU utterances) and to discern or identify current conversation topics and, more specifically, when conversation topics change during an AU-HU call. Here, module 54 is programmed to compare each IC generated to a most recent known topic of conversation and, when an IC topic is different than the most recent known topic, the system identifies a new current topic of conversation. For instance, if a first conversation topic is weather related (e.g., a current topic is "weather"), when the system recognizes that a most recent IC is related to last weekend's football game, the system may be programmed to change the current topic from weather to the current football game.

In some cases, instead of switching the current topic of conversation after an IC topic mismatch to the most recent IC topic, module 54 may implement a hysteretic process whereby two or three consecutive HU utterances have to be at least consistent with a new IC topic that is different than the most recent known topic of conversation in order for the topic engine to switch to a new current topic of conversation. Here, where a current topic is used to qualify an IC or enhanced captions in some way, once a new topic is identified, the module 54 may automatically go back and alter enhanced captions or related information presented to an AU to reflect the change in topic at the right point in a conversation. For instance, where a hysteretic lag requires three ICs associated with a new topic of conversation to confirm the new topic, Once the new topic is identified, module 54 may automatically go back and modify content presented to an AU to indicate in some way that all three of the ICs associated with the new topic are in fact associated with the new topic or may go back and actually generate different ICs for all three topics by using the new topic as a QP for each of the three prior ICs. In at least some cases current topics are fed back from module 54 to IC engine to inform the PIC identification process and/or are provided to others of the enhancement modules 46, 48, 50 and 56 for processing when generating enhanced captions.

Referring still to FIG. 2, in at least some embodiments, the system further includes a confidence factor (CF) module 60 which, once an enhanced caption has been identified, performs a CF process for assessing likelihood that the enhanced caption reflects the actual or intended communication by the HU that uttered the original words. Here, CF module 60 may use many different factors independently or in some combination to assess enhanced caption CFs including but not limited to (i) similarity between verbatim captions and enhanced captions, (ii) number of qualifying parameters recognized in a verbatim caption, (iii) amount of verbatim caption that is dismissed as filler words, (iv) number of associated phrases that are similar to a verbatim caption, (v) similarity between an associated phrase and a "matching" enhanced caption, (vi) relatively similarity between an enhanced caption to a "matching" associated phrase and the enhanced caption and a next most likely associated phrase, (vii) possibility of a topic change prior to meeting a hysteretic threshold, (viii) perceived communication line quality, (ix) speed of HU utterances, (x) characteristics of HU voice signal (e.g., high or low pitch, degree of accent, etc.), (xi) level and/or frequency of automated verbatim caption error corrections, (xii) level and/or frequency of manual CA assisted caption error corrections, (xiii) type of captioning (e.g., automated with an ASR, CA generated and/or corrected, etc.), etc.

Based on CFs associated with enhanced captions, the system may be programmed to operate differently. For instance, where an enhanced caption CF is above some high threshold level, the system may simply present the enhanced caption to an AU without qualification and when the CF for a specific enhanced caption is below the threshold, the system may either present the enhanced caption to the AU with a qualification tag (e.g., "Low CF" above the enhance caption text) or may not present the enhanced caption at all, instead simply presenting the verbatim caption text or a different enhanced caption text. For example, where a CF associated with a caption summary type enhancement is below a CF threshold, the system may instead generate and present an enhanced caption that includes language simplification of verbatim text (e.g., a simpler enhancement).

In some cases the system may generate several enhanced caption options in series when needed (e.g., in a case where a CF for a first caption is low, the second enhanced caption may be generated and its CF compared to a threshold CF level) or in parallel (e.g., generate first and second enhanced captions in parallel. Where two of more enhanced captions are generated in parallel for one verbatim caption, the system may only use or consider using the second when a CF for the first enhanced caption is below a threshold level. In other cases the system may select among two enhanced captions (e.g., one being a summary caption and the other being a language simplification caption) based on CFs (e.g., which one is higher or is one CF close to a second CF (e.g., the CF for a summary caption is within 10% of a language simplification caption), then pick the one CF which is preferred).

In some cases, which caption (e.g., enhanced or verbatim, if enhanced which enhanced, etc.) is presented to an AU may be a function of other factors instead of or in addition to AU preferences and CFs. For instance, in some cases where captioning falls behind AU-HU voice communications, the system may be programmed to favor summary captioning instead of other enhanced captioning forms and/or instead of verbatim captions in order to reduce the voice-captioning lag time. As another instance, where the meaning of a caption is heavily dependent on a current topic of conversation, the system may automatically present an enhanced caption that includes the contextual information as opposed to a verbatim or other enhanced caption type.

Figure 3:
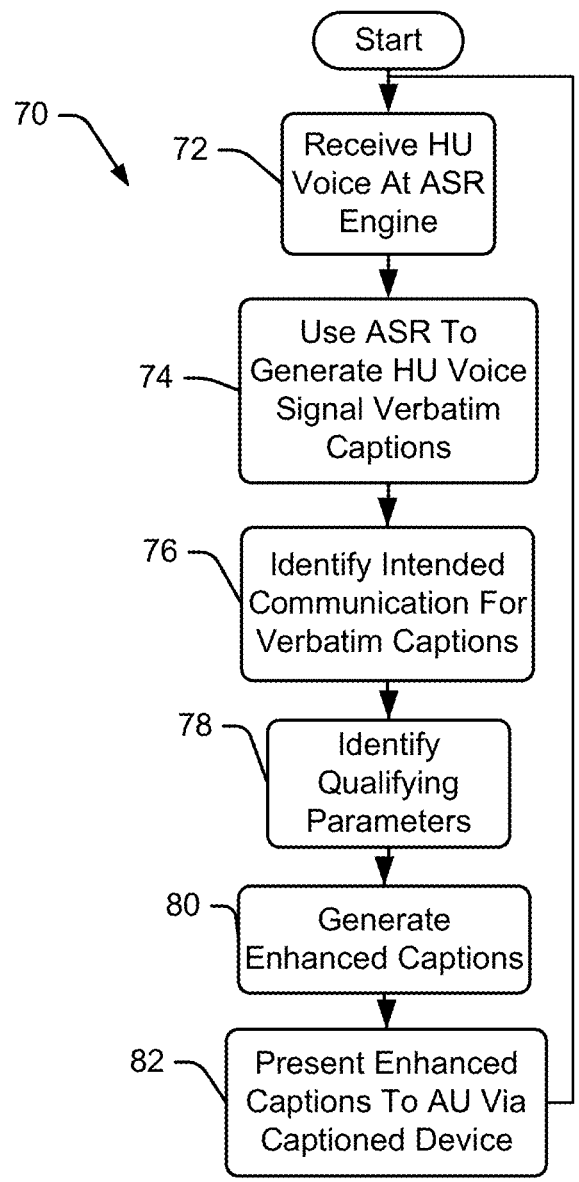
FIG. 3 is a flow chart representing process that may be implemented by the FIG. 1 system in at least some embodiments of the present disclosure.

Referring now to FIG. 3, an exemplary process 70 that may be performed by system server 32 is illustrated that is consistent with at least some aspects of the present disclosure. Process 70 starts at block 72 when an HU's voice signal utterance is received by one of the ASR engines or some other type of captioning system (e.g., CA assisted). At block 74 the ASR engine is used to transcribe the utterance to verbatim captions. At block 76 the system uses a Dialogflow type module to identify an intended communication (IC) corresponding to the verbatim captions/utterance and at block 78 the system identifies qualifying parameters in the utterance that are associated with the identified IC.

Referring still to FIG. 3, at step 80 the system generates enhanced captions that reflect the IC and any qualifying parameters and that are consistent with an AU's preferences or some default caption settings. At block 82 the enhanced captions are transmitted to the AU device 20 (see again FIGS. 1 and 2) where the enhanced captions are presented via a device display screen.

Figure 4:
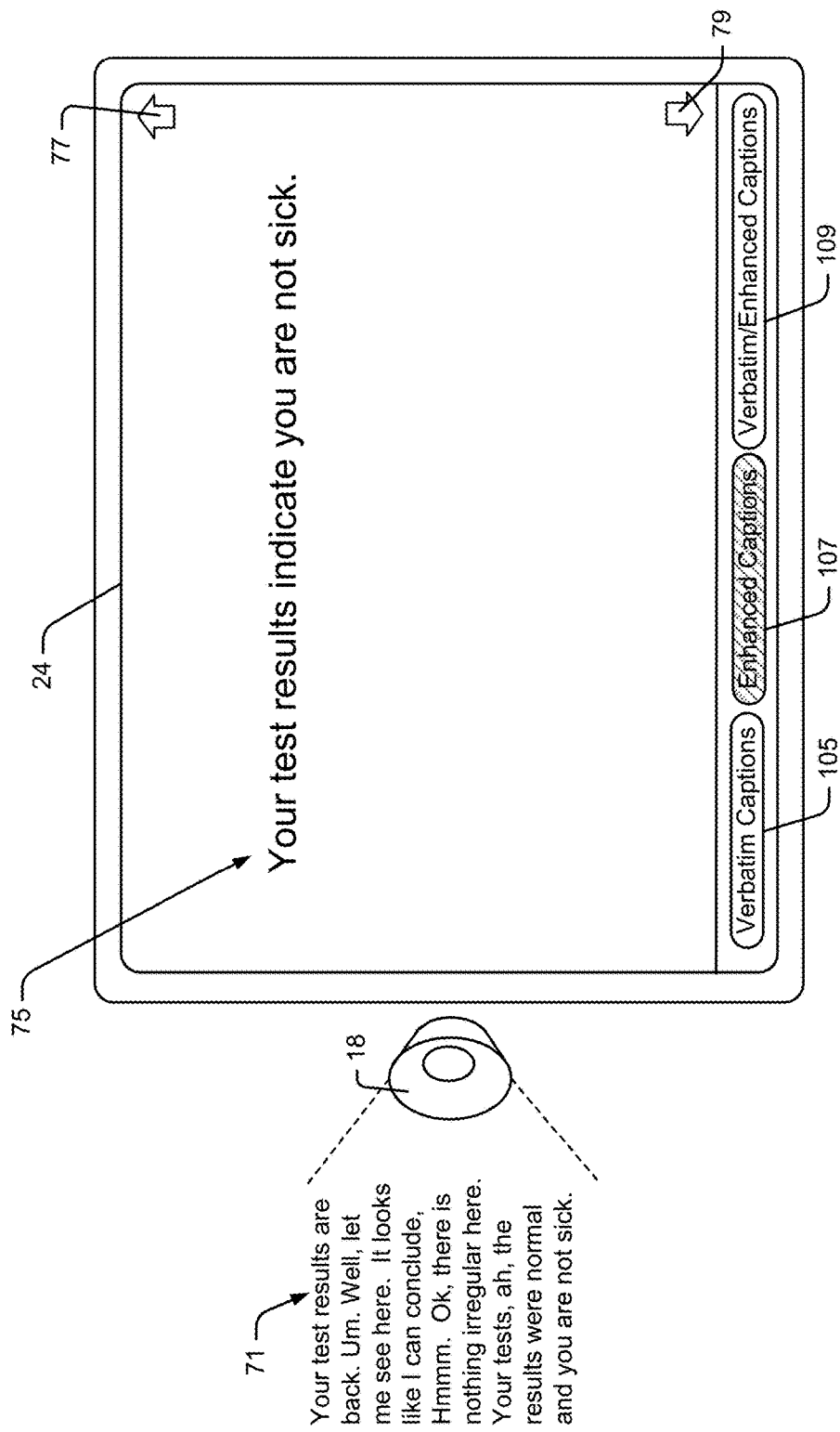
FIG. 4 is an AU device screen shot that shows an exemplary enhanced caption displayed while an associated HU voice signal is broadcast for AU consumption.

Referring now to FIG. 4, an exemplary AU device display screen 24 is shown along with a device speaker 18. As seen, audio of an HU's voice utterance is broadcast via speaker 18 to be heard by the AU while an enhanced caption 75 is nearly simultaneously presented on display screen 73. In the illustrated example, the broadcast original voice signal includes the phrases "Your test results are back. Um. Well, let me see here. It looks like I can conclude, Hmmm. Ok, there is nothing irregular here. Your tests, ah, the results were normal, negative really, which means normal, and you are not sick" and the enhanced caption phrase states "Your test results indicate you are not sick." Here, a summary caption is presented visually instead of verbatim text associated with the HU's utterance. Up and down scrolling arrows are also provided as shown at 77 and 79 for moving back and forth through previously presented captions.

In at least some cases an AU will be able to set caption preferences for different calls while a call is ongoing. Thus, for instance, for a first call where an HU speaks slowly, an AU may prefer verbatim captions instead of enhanced as the AU should be able to consume essentially real time captions as the HU speaks. In other cases where an HU speaks quickly and an AU would have to consume a lot of words to keep up with HU utterances and/or where the HU uses many complex words that the AU is unfamiliar with, the AU may prefer some type of enhanced captioning as described herein during a call. In FIG. 4, on screen "Verbatim Captions" and "Enhanced Captions" buttons 105 and 107 are presented that can be selected via touch or a cursor of some sort to switch between verbatim and enhanced captioning options, respectively, while a call in on going.

In other cases, the system may automatically switch between different verbatim and enhanced captioning options based on one or more system operating parameters. For instance, in a case where verbatim captions are preferred and an HU is speaking at a relatively slow rate, the system may automatically present verbatim captions. Here, if the speaker increases speaking rate to above some threshold level, the system may automatically switch to a summary type caption enhancement to minimize the content that an AU needs to consume via presented text. In other cases a switch to summary type captioning may occur only if the ASR or other verbatim captioning process falls behind the broadcast HU voice signal by some threshold duration (e.g., 12 seconds, 20 seconds, etc.) and, once captioning is within a second threshold duration (e.g., three seconds) of the broadcast voice signal 71, the system may revert back to verbatim captions.

In some cases, the system may enable an AU to receive both verbatim and enhanced captions simultaneously so that the AU can view and choose which captions to consume essentially in real time as they are presented. Thus, here, where an AU reads verbatim captions on screen 24 and has a hard time understanding the meaning, the AU could simply refer to summary captions for clarity. Similarly, where an AU reads enhanced captions on screen 24 and is confused as to what was said, the AU could refer to the verbatim captions which may provide clarity. A third on screen "Verbatim/Enhanced Captions" button 109 is presented in FIG. 4 for selecting a verbatim and enhanced captioning option.

Figure 5:
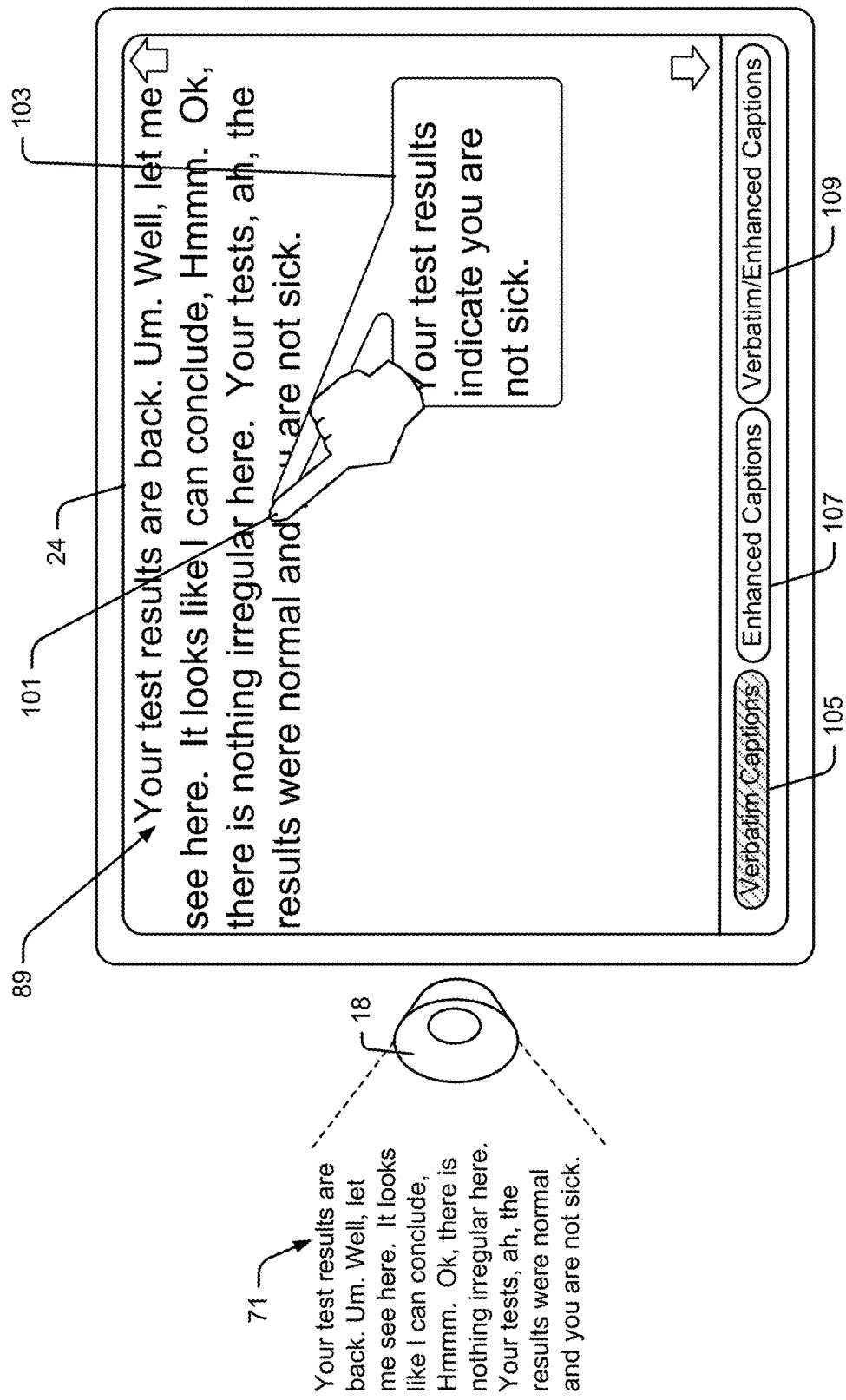
FIG. 5 is similar to FIG. 4, albeit where verbatim captions are presented to an AU and where a pointing icon is used to select the verbatim captions and to open a window in which a summary type enhanced caption associated with the selected verbatim caption is presented.

Referring now to FIG. 5, the verbatim option 105 is shown highlighted (e.g., left up to right cross hatching) to indicate current selection. Verbatim captions are presented at 89 that correspond directly to HU voice utterances broadcast via speaker 18. In the illustrated FIG. 5 example, an AU uses an interface device to move a hand cursor representation 101 around on the captioned device display screen to select (e.g., click or double clip thereon or at least hover over) verbatim captions 89 causing the system to open an enhanced caption window 103 in which enhanced captions corresponding to the selected verbatim captions are presented. Shortly (e.g., 2-8 seconds) after window 103 is opened, in at least some embodiments the window automatically closes or is moved off the page as captions are added to the screen and captions 89 scroll off the screen. In other cases, once an enhanced caption window is opened, an AU may have to close that window manually.

Interface controlled pointing icon 101 can be moved around on display screen 24 to perform pointing and then selection (e.g., click, double click, hover) activities. Here, the interface for controlling pointing icon 101 may include the touch sensitive pad 23 shown in FIG. 1 or it may include a touch sensitive screen on portable wireless device 29 that operates like a track pad to wirelessly interface with device 20 to move the cursor around. In other cases, screen 24 may be touch sensitive and be directly touchable for interacting with the system.

In other cases, AU preferences regarding verbatim, enhanced and verbatim/enhanced captioning may be settable in the AU preferences database 39 (see again FIG. 1) so that, unless changed by the AU, the preferences are initiated automatically once captioning services are initiated. In still other cases, an AU may set caption type preferences in database 39 that are based on HU voice characteristics or even based on specific HU voices or HU identities. Thus, for instance, for a first HU an AU may prefer just enhanced captions and for a second HU, the AU may prefer both verbatim and enhanced captions. Here, speaker profiles 35 as described above would be usable to recognize specific HU voices and caption type would then be initiated per HU specific preferences.

Figure 6:
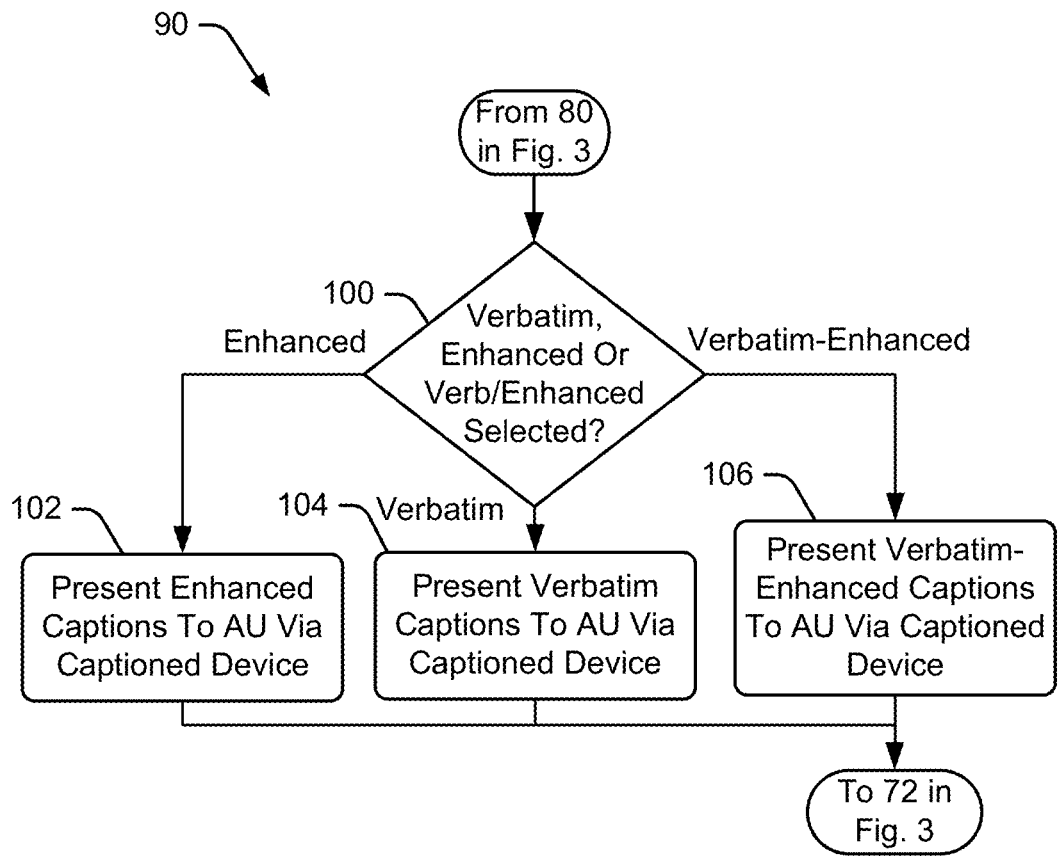
FIG. 6 is a flow chart that may be substituted for a portion of the flow chart shown in FIG. 3 which includes process steps enabling an AU to select one of verbatim captions, enhanced captions and both verbatim and enhanced captions.

Referring now to FIG. 6, a sub-process 90 for providing AU options for verbatim and/or enhanced captions that may be swapped into the FIG. 3 process is shown. Referring also to FIG. 3, after an enhanced caption is generated at block 80, control may pass to block 100 where a user settable preference for verbatim caption, enhanced captions or both verbatim and enhanced captions is checked. Depending on caption type, control passes to one of the process blocks 102, 104 or 106 where captions of the selected type are presented to an AU via the AU's captioned device 20. Thus, if an AU selected enhanced captions, control passes from block 100 to block 102 where enhanced captions are presented to the AU. Similarly, if the AU selected verbatim or the user selected both verbatim and enhanced captions, control passes to block 104 or block 106 where verbatim captions or both verbatim and enhanced captions are presented to the AU, respectively.

Figure 7:
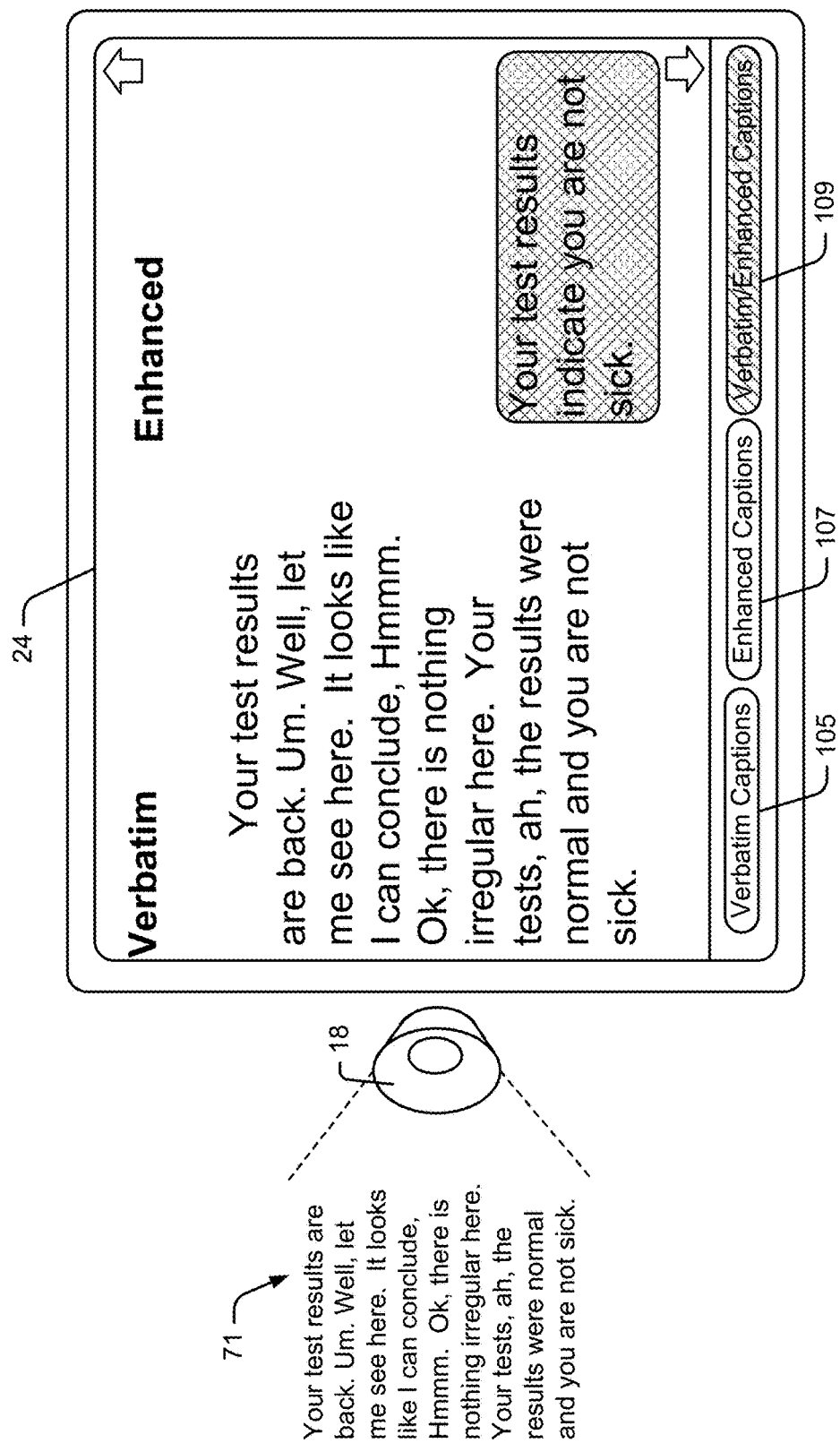
FIG. 7 is similar to FIG. 4, albeit where both verbatim and enhanced captions are presented along with broadcast of an associated HU voice signal for AU consumption.

FIG. 7 shows an exemplary screen shot on AU device display screen 24 that includes first and second columns where verbatim captions are presented in a scrolling fashion in the first column and corresponding enhanced captions are presented in a scrolling fashion in the second column. In the illustrated example, the enhanced caption is presented at a location that is substantially horizontally aligned with the end of an associated verbatim caption as the enhanced caption often cannot be generated until near the end of the verbatim caption. In other cases, even if the enhanced caption is firmed up near the end of an associated verbatim caption, the enhanced caption may be presented at a location horizontally aligned with the top portion of the verbatim caption. While the font size of each of the enhanced and verbatim captions are shown to be similar in FIG. 7, in at least some cases one or the other may be larger or otherwise visually distinguished to increase an AU's ability to see those captions.

Figure 8:
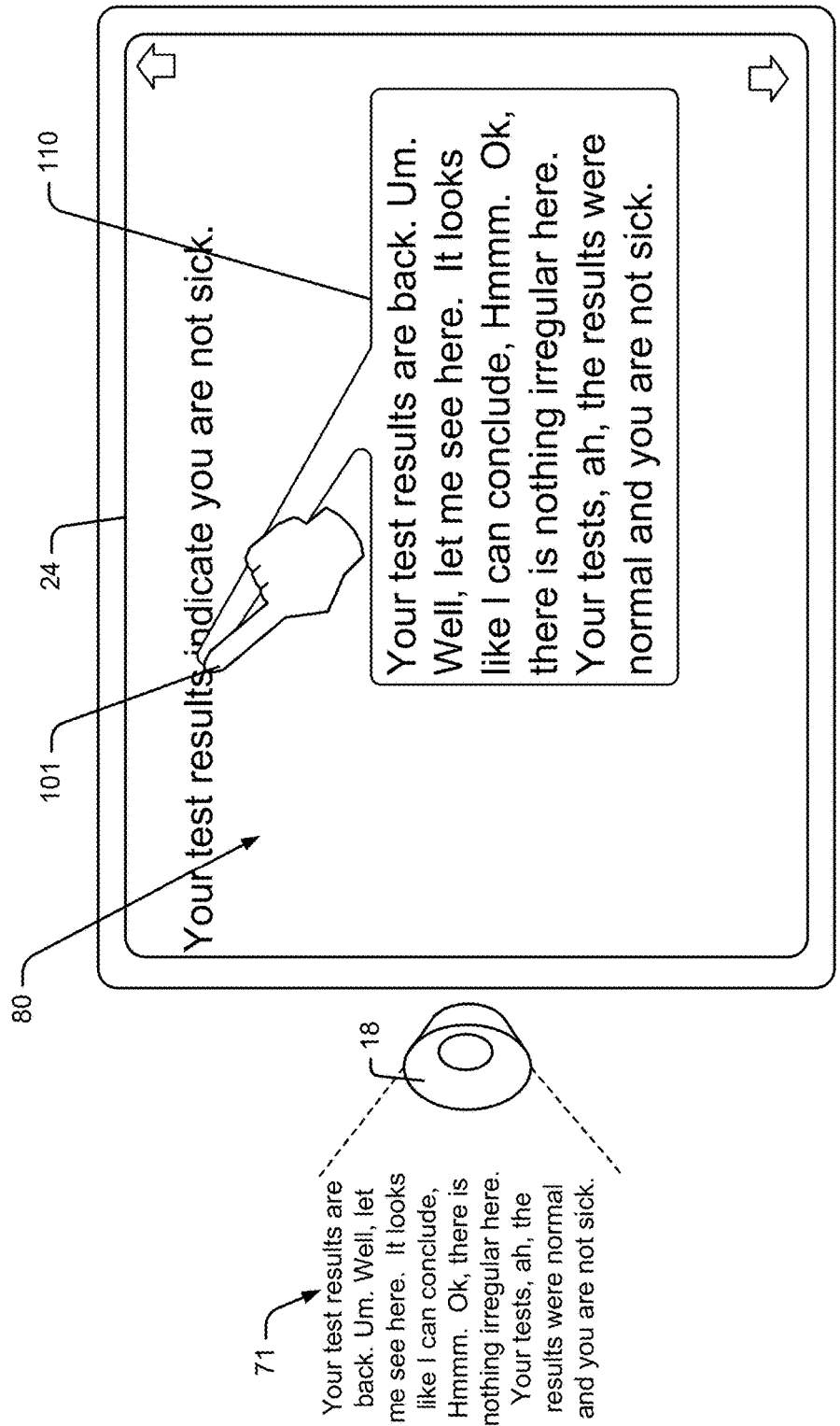
FIG. 8 is similar to FIG. 4 albeit where a summary type enhanced caption is presented and a pointing icon is shown selecting the enhanced caption to open a window in which verbatim captions for the HU voice signal are presented.

FIG. 8 shows an exemplary AU display screen shot where summary type enhanced captions are presented as primary text captions while an HU voice signal associated therewith is broadcast to an AU. In FIG. 8, pointer icon 101 is shown selecting an enhanced caption which causes a verbatim caption window 110 to open up. Verbatim captions corresponding to the broadcast HU voice signal 71 are provided in the new window 110.

In the case of the communication contextualization enhanced caption option, the idea is to generate enhanced captions where each caption has more information than an associated verbatim caption where the additional information renders the enhanced caption more informative and easier to understand than the original verbatim caption on its own. In this regard, it has been recognized that simple captions can cause confusion as they are often presented without context. Confusion is particularly problematic in cases of some elder AUs that may become confused when captions are considered out of context. For instance, many elder AUs suffer from many different ailments, see and communicate with doctors and other health service providers, are issued many diagnoses and often undergo many tests and treatments where captions out of context can be erroneously associated with wrong information. In contextual enhanced captions, information from prior utterances during a call is used to add information to a current IC to generate a more complex IC that is more likely to be understood on its own. While these types of enhanced caption are typically more informative than associated verbatim captions that does not necessarily mean the more informative captions will be longer or more verbose. For example, assume Dr. Petrie's nurse practitioner (an HU) and an AU are participating in a voice call and have been discussing a possible skin cancer diagnosis when the nurse utters the phrase "Your test results are back. Um. Well, let me see here. It looks like I can conclude, Hmmm. Ok, there is nothing irregular here. Your tests, ah, the results were normal and you are not sick."

Referring again to FIG. 2, module 54 may be tracking the current topic of conversation or context of the discussion (e.g., possible skin cancer diagnosis) as well as that the discussion is related to Dr. Petrie and that the test was a biopsy. In this case, instead of simply generating a simple summary type enhanced caption like "Your test results indicate you are not sick", the system may use the contextual information (e.g., possible skin cancer diagnosis, Dr. Petrie and biopsy test) to generate a more informative enhanced caption like "Doctor Petrie's biopsy related test results indicate you do not have skin cancer." This enhanced caption indicates the doctor associated with the test, the test type and the ailment that the conclusion is related to and therefore, on its own, is much more informative than the summary type enhanced caption.

Figure 9:
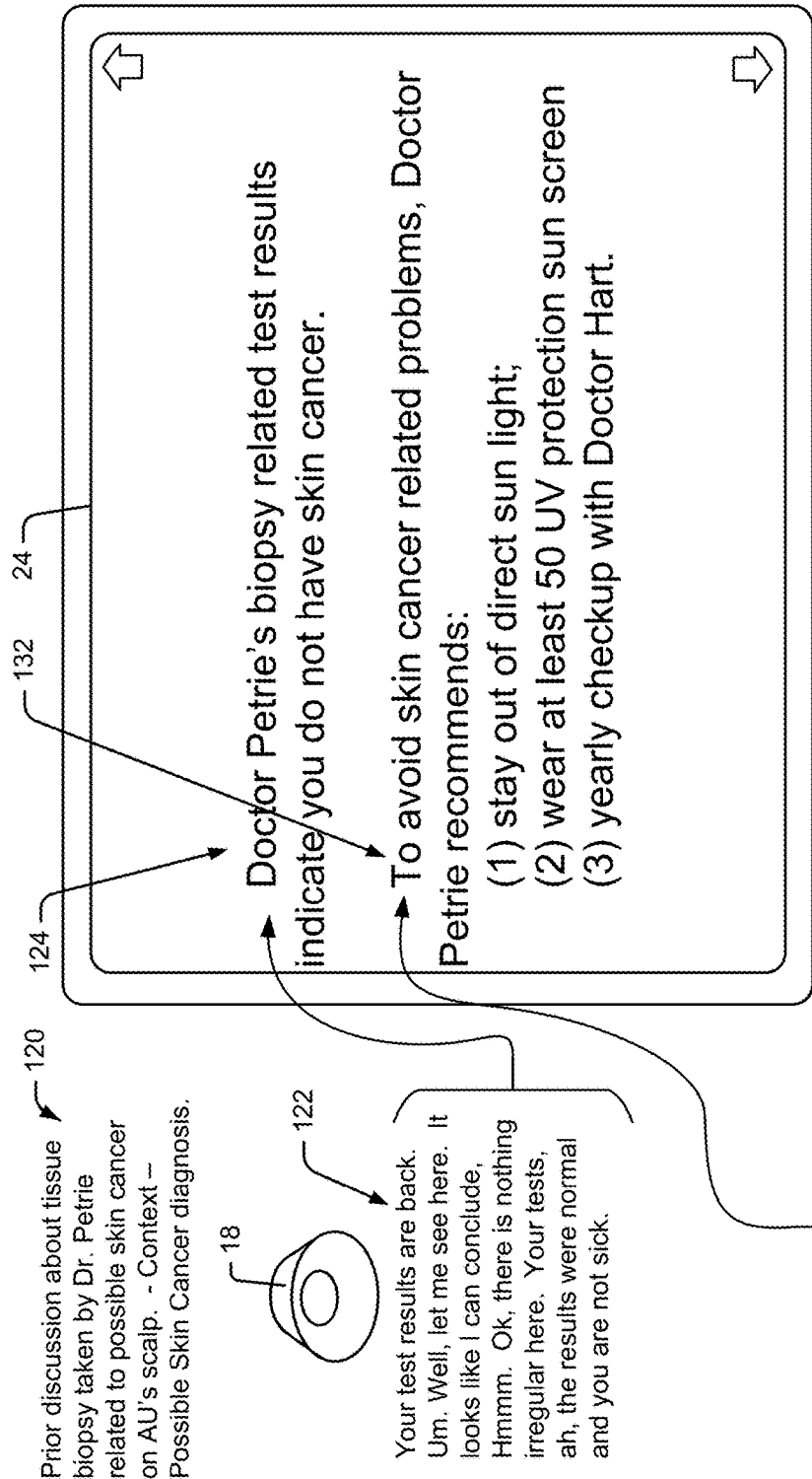
FIG. 9 is similar to FIG. 4 wherein several enhanced captions are shown on an AU device display screen shot.

Consistent with the above example, see FIG. 9 where prior HU-AU discussion during a call is represented at 120, a most recent utterance is represented at 122 and a contextually enhanced caption is shown at 124. Based on the prior discussion at 120, the system knows that the nurse and AU were discussing a tissue biopsy from the AU's scalp that was taken by Dr. Petrie to check for skin cancer. The caption 124 is generated by the system identifying and storing prior discussion content as well as a general IC associated with the utterance at 122. Here, the caption at 124 should be contrasted with the caption at 75 in FIG. 4 which is simpler and clearly not as informative.

Referring still to FIG. 9, another utterance by Dr. Petrie is shown at 130 and an associated contextually enhanced caption is shown at 132. Here, the system still contextually assumes that utterances are related to Dr. Petrie and therefore, even though actual utterance at 130 does not mention Dr. Petrie, the system automatically adds a Dr. Petrie reference to the enhanced caption 132. In the case of utterance 130, the system tracks ICs as the utterance is voiced, identifies three different advice related ICs and then generates enhanced caption 132 accordingly.

Obviously, the utterance at 130 is long and would likely be voiced over a period of tens of seconds in most cases. Here, the system would continually work up one IC at a time as new voice signal is received so the enhanced caption 132 would be constructed over some time and in fact its format and information may be changed over time. Thus, when the utterance about direct sun light is voiced, the other utterances about sun block and a checkup with Dr. Hart would still not have been voiced. At this point the caption at 132 would only include the single recommendation that the AU stay out of direct sun light and the recommendation likely would not be provided as a list. Once the second recommendation to use 50 UV sunscreen is voiced and associated with an IC, the system may go back and reformat the first light related recommendation as part of a list also including the 50 UV protection sunscreen. Thus, in at least some cases, enhanced captions may be provided to an AU and then subsequently modified in form and/or content based on subsequently voiced content.

Figure 10:
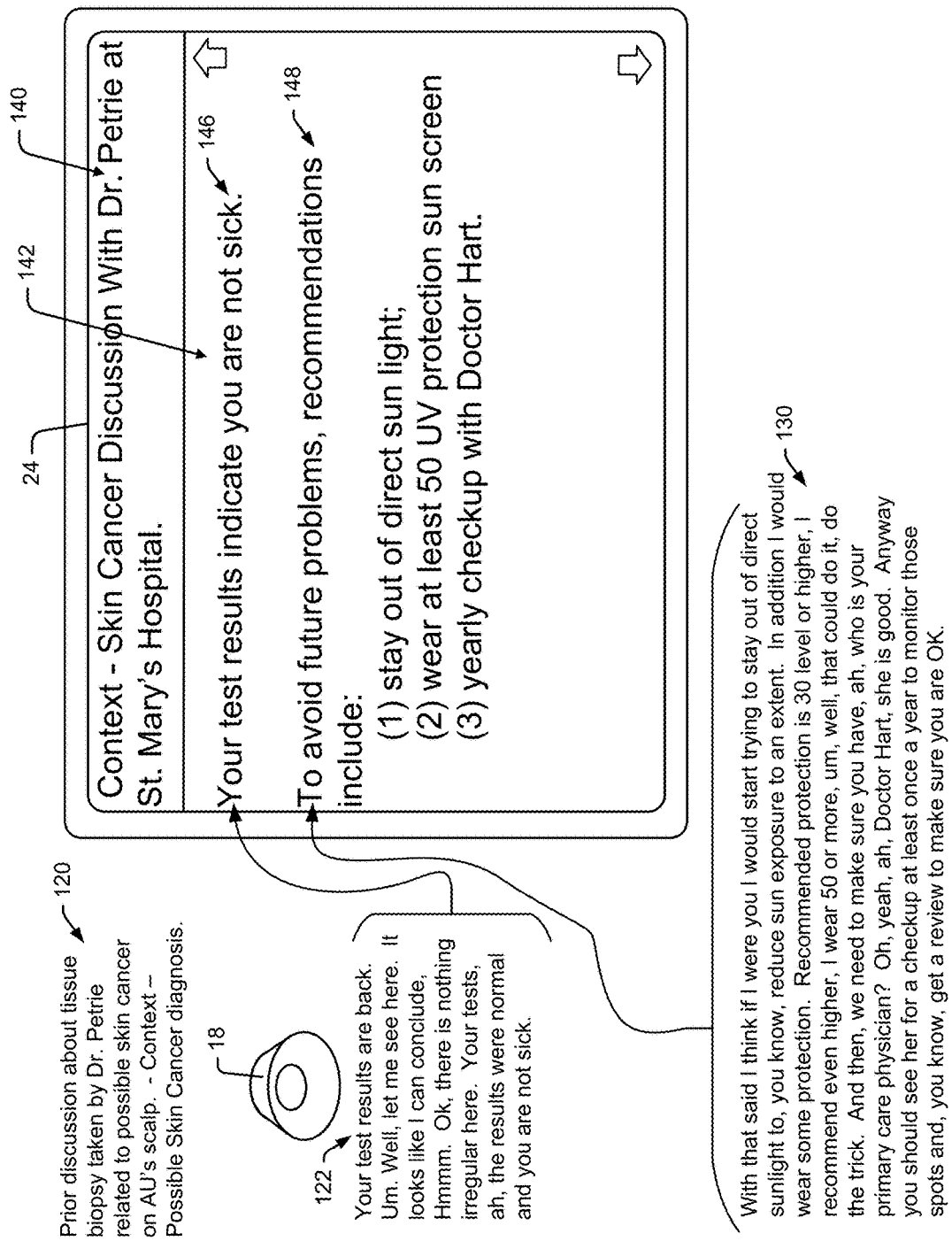
FIG. 10 is similar to FIG. 4 wherein a context field is provided as well as several enhanced captions for AU consumption.

Referring now to FIG. 10, another exemplary AU device screen shot is shown wherein a context of current topic of conversation field 140 is provided in an upper ribbon portion of the screen shot and an enhanced captions field 142 is provided there below. Here, the system tracks current context or a current topic of conversation and provides general context or topic of conversation information for the current topic in context field 140. In addition, the system generates single utterance enhanced captions, one for each HU utterance, and those captions are presented in a scrolling fashion in caption field 142. Thus, instead of directly embellishing each enhanced caption with contextual information, the overall current topic of conversation is presented in field 140 which changes over time as general conversation topics change.

Figure 11:
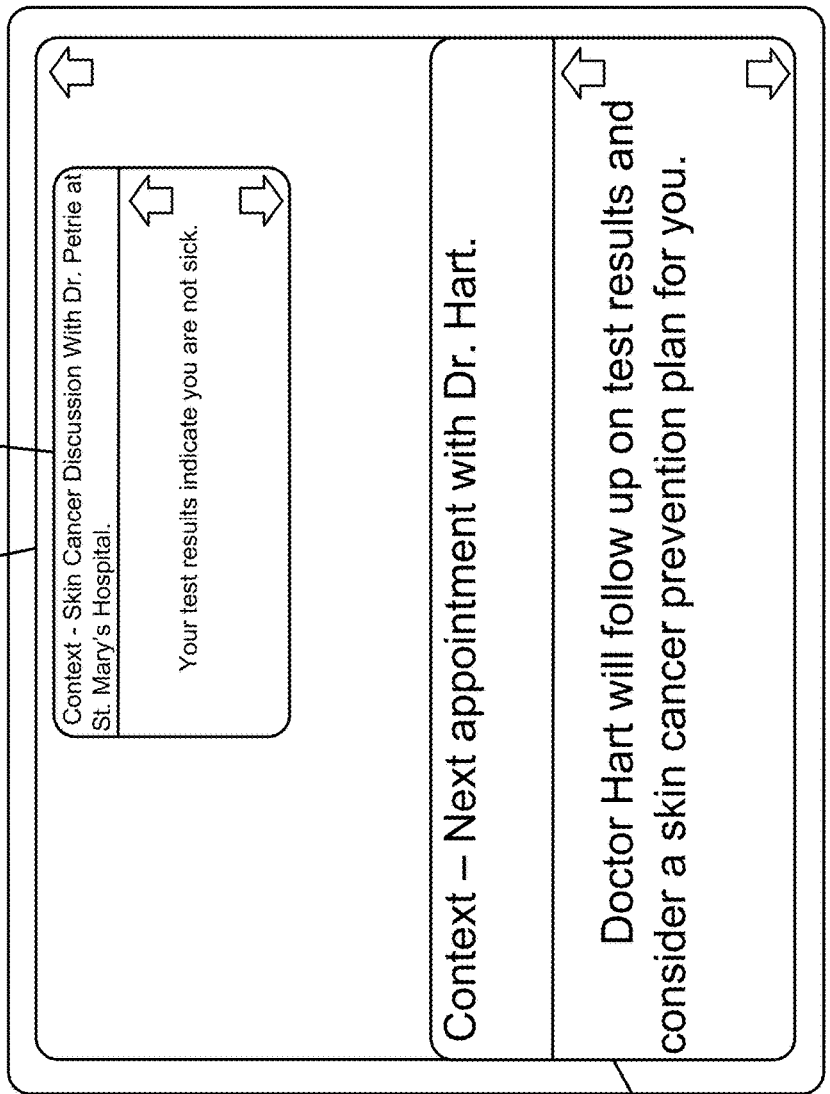
FIG. 11 is similar to FIG. 4 albeit showing two different content and enhanced caption fields corresponding to two different topics of conversation.

In some cases, the system may be programmed to automatically generate separate topic of conversation fields to help an AU understand how a conversation is progressing and how topics are changing over time. This feature can also help an AU locate different parts of a conversation if searching back in captions for specific information that was discussed. To this end see the exemplary screen shot shown on screen 24 in FIG. 11 that includes first and second topic fields 150 and 152, a first field 150 associated with a skin cancer discussion with Dr. Petrie and a second field 152 associated with a next appointment topic as labelled. While captions may be divided in real time into different topic fields in some cases or at some times when topics can clearly be discerned on the fly, in other cased topic fields may be generated at a later time (e.g., off line after a conversation has been completed) and used to reformat captions previously presented in a scrolling or other format.

Figure 12:
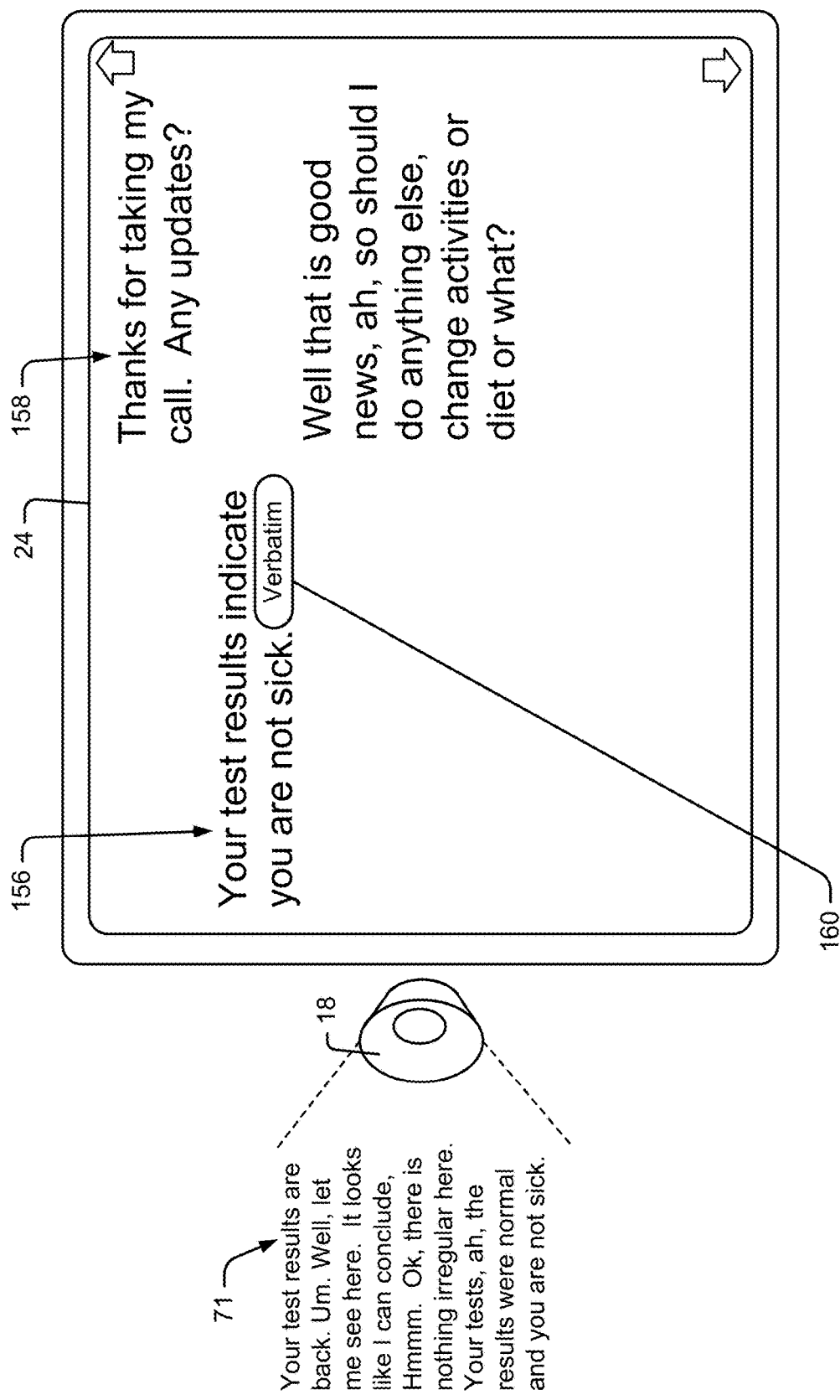
FIG. 12 is similar to FIG. 4 where a system generates both AU and HU captions and presents enhanced summary type captions for HU utterances while presenting verbatim captions for AU utterances.
Figure 13:
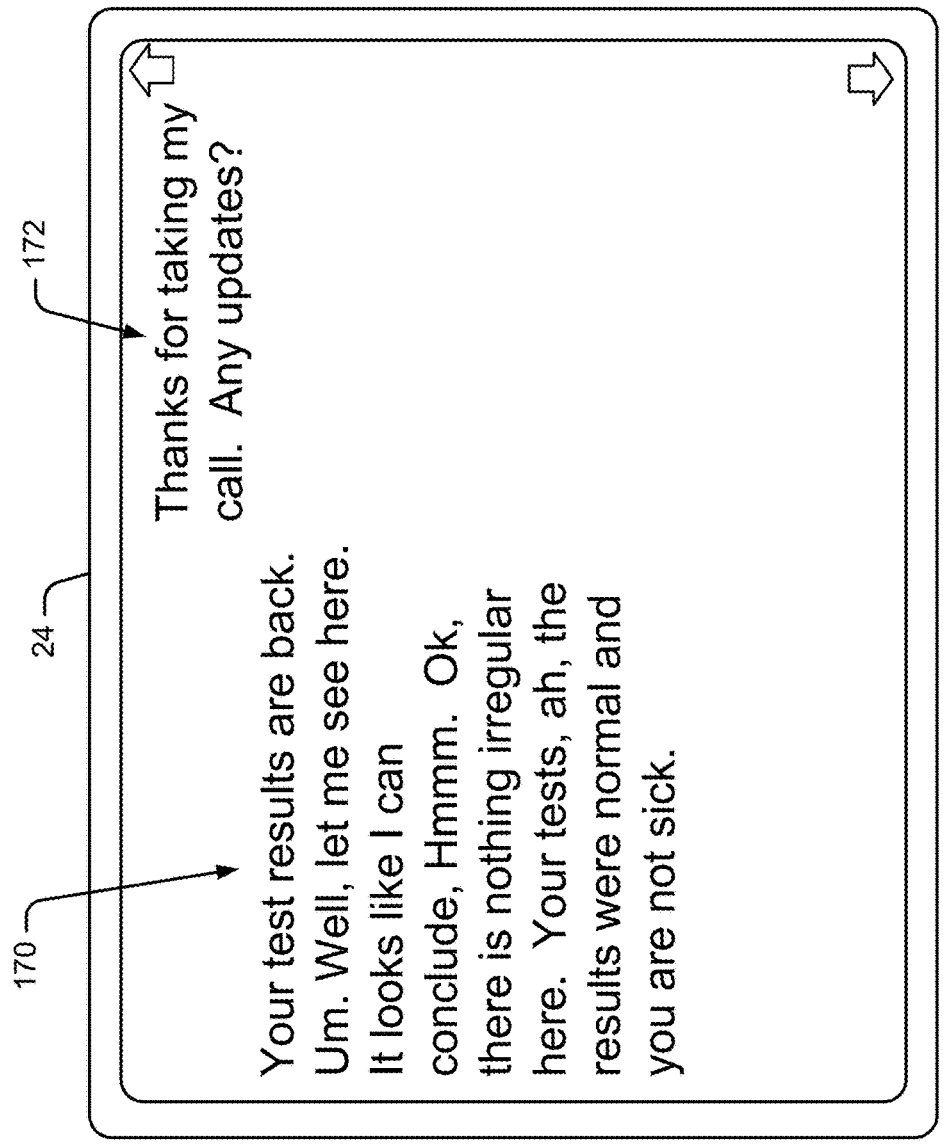
FIG. 13 is similar to FIG. 4 wherein verbatim HU captions are presented to an AU while summary type enhanced captions of AU utterances are presented.
Figure 13:
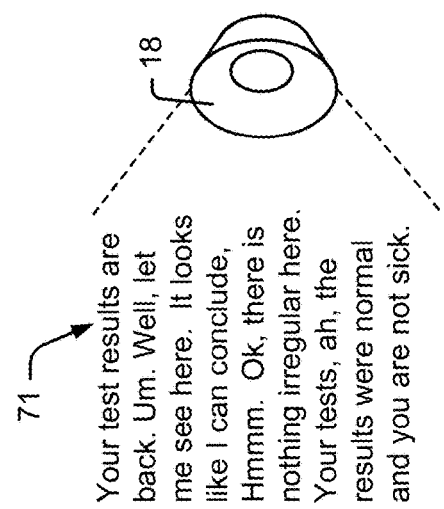

Again, in general the systems described above are described in the context of processes that caption HU voice signals and ignore AU voice signals or utterances. In other cases, verbatim captions may be generated for AU utterances as well as HU utterances and those AU verbatim captions may be used for various purposes. For instance, as shown in FIG. 12, verbatim AU captions 158 may be provided along with HU captions or enhanced HU captions 156 to an AU via device 20 to provide additional context to the AU for the HU captions presented. In FIG. 12, a verbatim tag 160 is provided that is spatially associated with enhanced HU captions at 156 which can be selected to convert the enhanced captions to a verbatim caption text if desired. As another instance, AU captions may be processed to generate enhanced AU captions that are presented to the AU, again, to provide context for what an HU is saying. In addition, as shown in FIG. 13, in some cases or in some modes of operation, verbatim HU captions 170 may be generated and presented to an AU along with enhanced (e.g., summary) type AU captions 172 in a two column format or in some other format that distinguishes the different captions from different sources. Here, the summary AU captions provide context to the AU without full blown verbatim captioning which can be distracting to some AUs where the context helps the AU follow along with the verbatim HU captions at 170.

As another instance, an AU's verbatim captions may be tracked and used as additional context for generating verbatim HU captions and/or enhanced HU captions. For example, an HU may not mention test results during a call but an AU may mention test results and the AU's utterance may then be used to provide context for the HU's utterance "We found a blockage" so that an enhanced caption "The test results showed that you have a blockage." Thus, in some cases captions of AU utterances may be used to generate enhanced HU captions where only the HU captions are presented to the AU for consumption.

Figure 14:
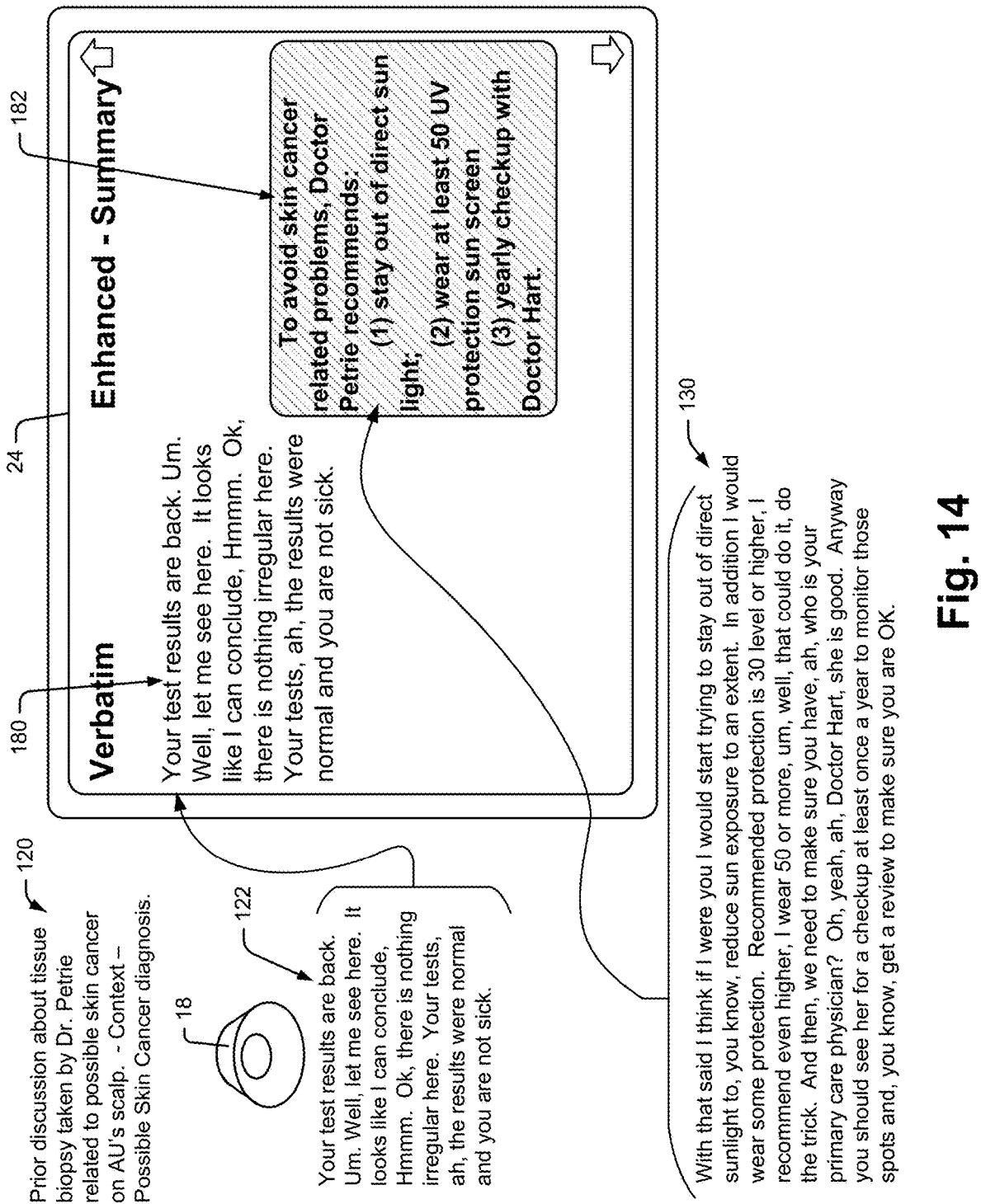
FIG. 14 is similar to FIG. 4 wherein some HU voice signal verbatim captions are presented while some enhanced captions are presented to an AU.

In cases where the system automatically switches between enhanced captions and verbatim captions for any reason, in at least some embodiments the system will visually tag or otherwise highlight or visually distinguish enhanced and verbatim captions in some manner so that the AU understands the difference. For instance, see FIG. 14 where verbatim HU captions corresponding to voice signal 122 are presented at 180 in a verbatim column. After the verbatim captions are presented at 180, the system automatically switches to enhanced summary type HU captions and presents summary captions at 182 for voice signal 130. In addition to being presented in different columns, the enhanced captions are distinguished from verbatim via bold text and a highlight box or field around the enhanced summary captions.

In most cases verbatim captions will be generated at least some time (e.g., one or more seconds) prior to summary or other types of enhanced captions that are derivatives of the verbatim captions. In the interest of presenting text representations of HU utterances to an AU as quickly as possible, in at least some cases verbatim text is transmitted to and presented by an AU caption device 20 immediately upon being generated. Here, if the system subsequently generates an enhanced caption, the system may transmit the enhanced caption to the AU device and the AU device may be programmed to swap in any enhanced caption for an associate verbatim caption. In other cases, the AU device may present summary captions adjacent verbatim captions as an alternative text to be consumed.

In at least some embodiments it is contemplated that an HU device or communication system will play a great role in enhanced captioning. For instance, in the case of an oncologist, the oncologist may use complex cancer related and genetics terms, phrases and acronyms which a relay may be ill equipped to simplify. In these cases, the HU system may automatically identify any complex terms of art uttered by an oncologist and may automatically provide information to the relay or other system processing device for developing enhanced captions.

Figure 15:
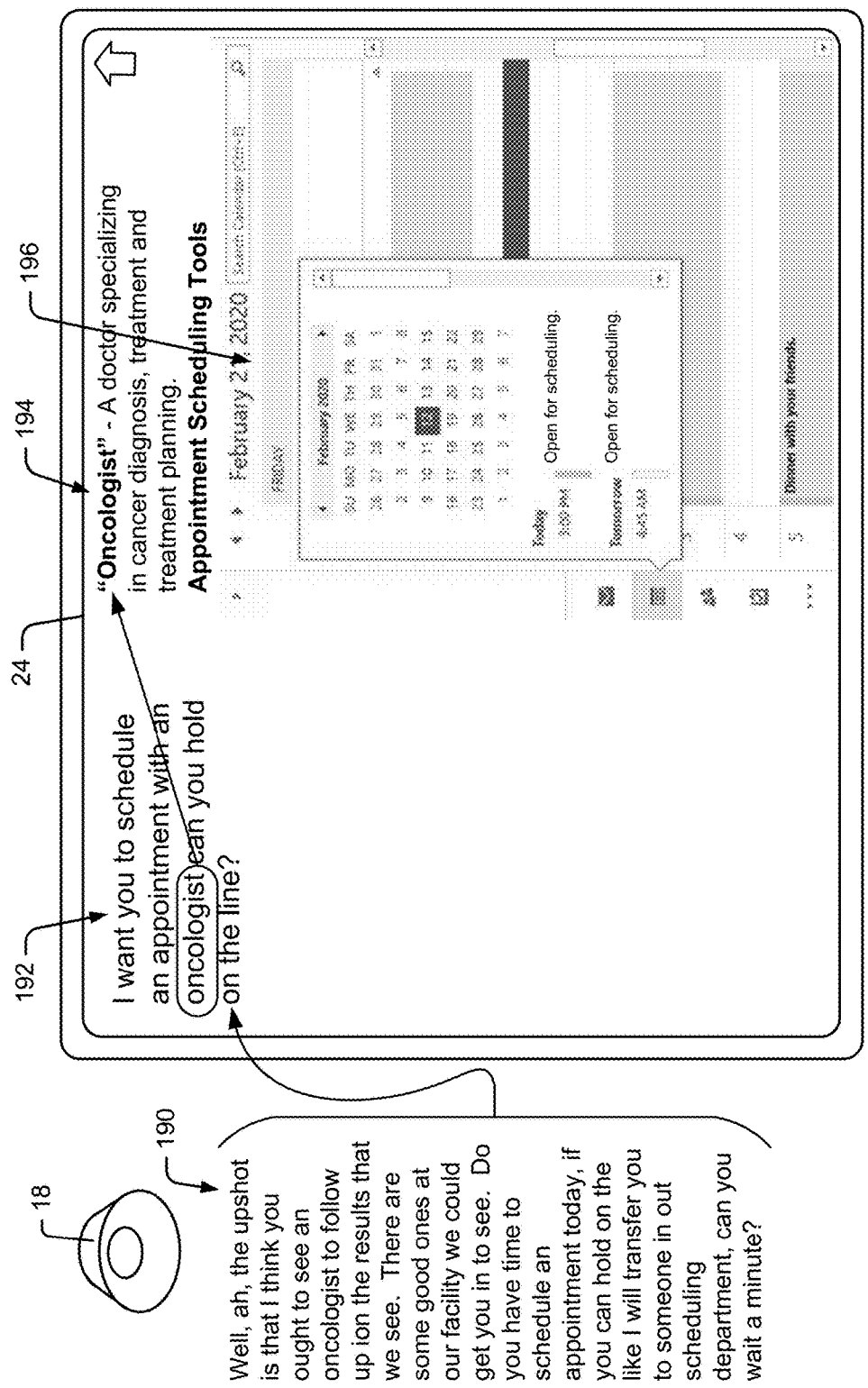
FIG. 15 is similar to FIG. 4 wherein, in addition to an enhanced summary type caption, a definition of a caption word is presented to augment an AU's understanding of the caption and wherein an AU's calendar is presented to the AU as a result of HU utterances during a call.

Referring to FIG. 15, an exemplary screen shot of display 24 is shown that includes examples of both a communication augmentation and an action initiation. As shown, an HU voices the utterance at 190 which results in a summary type enhanced caption at 192. The word "oncologist" appears in the enhanced caption 192 which may be unfamiliar to an AU. The system, recognizing that the term "oncologist" may be difficult for the AU to understand, automatically obtains a definition for the word and presents the word as augmented information at 194. In the illustrated embodiment the word oncologist in the caption is graphically associated with the definition as shown but other ways to associate the word and definition are contemplated.

Referring still to FIG. 15, the system also recognizes that the HU is suggesting an appointment with an oncologist. Here, the suggested appointment causes the system to automatically link to the AU's calendar to identify appointment time slots as options for the AU to schedule an appointment so that when the AU speaks to the scheduler, the AU task of identifying times that work is expedited. In this case, open slots may also require sufficient time to travel to and from an appointment location at a doctor's office or medical facility. Many other actions based on HU and AU utterances are contemplated.

One problem with summarizing or otherwise enhancing captions is that there is a risk that any type of enhancement may simply be wrong and intended communication errors could have a substantial effect on AU understanding and even activities. For instance, where the system inaccurately determines that a doctor prescribes a specific dose of pain medication for a patient that could have unintended results. One way to deal with potential enhanced captioning errors is for the system to identify utterances related to topics that are particularly important and, for those utterances, always present verbatim captions. For instance, when a physician HU utters a phrase that has anything to do with a drug, a test result, an appointment or a procedure, the system may automatically recognize the topic of the phrase and then present verbatim HU captions or both verbatim and enhanced captions for that phrase to limit the possibility of any type of enhanced captioning error.

Another solution for minimizing the effects of enhanced captioning errors is to route captioning feedback back to an HU and present that feedback for HU consumption. To this end, see again FIG. 1 where an HU may use a tablet type communication device 12a instead of or in addition to a phone device 12 during a communication session. Here, device 12a may link wirelessly or may be wired to phone device 12 or may link via a local WIFI system and the Internet to server 32 for receiving any verbatim or enhanced captions. Device 12 may present HU, AU or both HU and AU captions to the HU for consideration. Thus, where an HU utters a phrase and enhanced captions are generated for that phrase, those captions would be transmitted to the HU device 12a and immediately presented for consideration. Here, if the HU recognizes that an enhanced caption error results in a communication that is inconsistent with the HU's intended communication, the HU has the option to correct the error if it is meaningful or could simply ignore the error if it is not important.

As described above, captioning may be dynamic even after initial hypothesis are presented to an AU so that any captioning errors can be corrected upon being identified (e.g., in line corrections may be made in real time as identified). Also, as described above, in many cases, in order to be able to generate enhanced captions, the system has to be able to identify an HU's IC (e.g., intended communication) to inform the enhancement. In addition to ascribing an IC to each initial verbatim caption hypothesis, the system can also ascribe an IC to any corrected verbatim caption. In many cases caption errors will not change the IC associated with an HU's utterance and, in those cases, the system may be programmed to only make caption error corrections when ICs related to an initial caption hypothesis and an error corrected caption are different. In other words, if the IC associated with an initial caption hypothesis is the same as an IC associated with an error corrected caption, the system may forego making the error correction in order to limit error correction changes and distraction that could be associated therewith. Here, only "meaningful" error corrections that change the IC related to an HU utterance would be facilitated on an AU display screen.

While the invention may be susceptible to various modifications and alternative forms, specific embodiments have been shown by way of example in the drawings and have been described in detail herein. However, it should be understood that the invention is not intended to be limited to the particular forms disclosed. For example, while the systems described above each audibly broadcasts HU voice signals to an AU, in some cases the system may instead broadcast simulated voice messages based on enhanced captions (e.g., a summary voice message as opposed to the actual HU voice message).

As another example, in at least some embodiments essentially all relay functions and processes may be performed by an AU's device 20 where the AU runs one or more ASRs as well as caption enhancing programs or modules as described above. In other cases an HU device may generate HU voice signal verbatim captions and send those captions on to a relay for generating enhanced captions that are then sent to the AU device for display (e.g., either directly or back through the HU device to the AU device).

Thus, the invention is to cover all modifications, equivalents, and alternatives falling within the spirit and scope of the invention as defined by the following appended claims.

What is claimed is:

1. A method for facilitating communication between an assisted user (AU) using an AU communication device including a display and a hearing user (HU) using an HU communication device, each communication device including a speaker and a microphone and the AU communication device also including a display screen, the method comprising the steps of:
   receiving an HU voice signal as the AU and HU participate in a call using the AU and HU communication devices, respectively;
   transcribing HU voice signal segments into verbatim caption segments that accurately represent the words spoken by the HU to generate the voice signal segments;
   for at least a subset of the verbatim caption segments, processing the verbatim caption segments to identify intended communications (IC) wherein the IC is the communication intended by the HU upon uttering an associated one of the HU voice signal segments;
   for each of the ICs, using the IC to generate enhanced captions that is different than the associated verbatim caption;
   and
   for a subset of the enhanced captions, presenting the enhanced captions via the AU communication device display for consumption instead of presenting the verbatim captions; and
   for each HU voice signal segment where an associated enhanced caption is not presented via the display, presenting the verbatim caption via the AU communication device display for consumption.

2. The method of claim 1 wherein the step of transcribing includes using an automated speech recognition engine to convert the HU voice signal segments to verbatim caption segments.

3. The method of claim 1 wherein at least a subset of the enhanced captions include a summary type enhanced segment.

4. The method of claim 1 wherein at least a subset of the enhanced captions include a word simplification enhanced segment.

5. The method of claim 1 wherein at least a subset of the enhanced captions include a communication contextualization type enhanced segment.

6. A method for facilitating communication between an assisted user (AU) using an AU communication device including a display and a hearing user (HU) using an HU communication device, each communication device including a speaker and a microphone and the AU communication device also including a display screen, the method comprising the steps of:
   receiving an HU voice signal as the AU and HU participate in a call using the AU and HU communication devices, respectively;
   transcribing HU voice signal segments into verbatim caption segments that accurately represent the words spoken by the HU to generate the voice signal segments;
   processing each verbatim caption segment to identify an intended communication (IC) wherein the IC is the communication intended by the HU upon uttering an associated one of the HU voice signal segments;
   for at least a portion of the HU voice signal segments:
   (i) using an associated IC to generate an enhanced caption that is different than the associated verbatim caption;
   (ii) for each of a first subset of the HU voice signal segments, presenting the verbatim captions via the AU communication device display for consumption;
   (iii) for each of a second subset of the HU voice signal segments, presenting enhanced captions via the AU communication device display for consumption, and for each enhanced caption, calculating a confidence factor (CF) indicating likelihood the segment reflects an HU's intended communication.

7. The method of claim 6 further including the step of, for each CF, comparing the CF to a threshold CF and, when the CF exceeds the threshold CF, presenting the enhanced caption associated with the CF via the AU communication device display.

8. The method of claim 7 further including the step of, for each CF, when the CF is less than the threshold CF, presenting the verbatim caption associated with the CF via the AU communication device display.

9. The method of claim 1 wherein the enhanced captions includes first and second sets of enhanced captions and wherein the first set is of a type different than the second set.

10. The method of claim 1 further including visually distinguishing the enhanced captions from the verbatim captions on the display.

11. The method of claim 1 further including presenting the verbatim captions in one column on the display and presenting the enhanced captions in a second column on the display.

12. The method of claim 1 further including presenting a user interface to the AU and receiving commands via the interface selecting one of verbatim and enhanced captions, the method including presenting verbatim captions when the verbatim option is selected and presenting enhanced captions when the enhanced option is selected.

13. The method of claim 12 wherein the interface also enables the AU to select a third option for presenting each of verbatim captions and enhanced captions.

14. A method for facilitating communication between an assisted user (AU) using an AU communication device including a display and a hearing user (HU) using an HU communication device, each communication device including a speaker and a microphone and the AU communication device also including a display screen, the method comprising the steps of;
 receiving an HU voice signal as the AU and HU participate in a call using the AU and HU communication devices, respectively;
 transcribing HU voice signal segments into verbatim caption segments that accurately represent the words spoken by the HU to generate the voice signal segments;
 presenting each verbatim caption segment via the AU communication device display for consumption;
 processing at least a subset of the verbatim caption segments to identify an intended communication (IC) wherein the IC is the communication intended by the HU upon uttering an associated one of the HU voice signal segments;
 for each of at least a subset of the HU voice signal segments, using an associated IC to generate an enhanced caption that is different than the associated verbatim caption; and
 presenting at least a subset of the enhanced captions via the AU communication device display for consumption simultaneously presenting each verbatim caption segment.

15. The method of claim 14 wherein an IC is identified for each of the verbatim caption segments.

16. The method of claim 14 wherein the verbatim caption segments are presented in a first vertical column and the enhanced caption segments are presented in a second vertical column.

17. The method of claim 14 wherein each enhanced caption includes a summary type caption that has substantially the same meaning as an associated verbatim caption.

18. The method of claim 14 further including broadcasting the HU voice signal to the AU via a speaker.

19. A method for facilitating communication between an assisted user (AU) using an AU communication device including a display and a hearing user (HU) using an HU communication device, each communication device including a speaker and a microphone and the AU communication device also including a display screen, the method comprising the steps of:
 receiving an HU voice signal as the AU and HU participate in a call Lasing the AU and HU communication devices, respectively;
 transcribing HU voice signal segments into verbatim caption segments that accurately represent the words spoken by the HU to generate the voice signal segments;
 presenting each verbatim caption segment via the AU communication device display for consumption;
 processing at least a subset of the verbatim caption segments to identify an intended communication (IC) wherein the IC is the communication intended by the HU upon Littering an associated one of the HU voice signal segments;
 for each of at least a subset of the HU voice signal segments, using an associated IC to generate an enhanced caption that is different than the associated verbatim caption; and
 presenting at least a subset of the enhanced captions via the AU communication device display for consumption in addition to presenting each verbatim caption segment and, for each enhanced caption, calculating a confidence factor (CF) indicating likelihood the segment reflects an HU's intended communication and presenting the confidence factor via the display.

20. A method for facilitating communication between an assisted user (AU) using an AU communication device including a display and a hearing user (HU) using an HU communication device, each communication device including a speaker and a microphone and the AU communication device also including a display screen, the method comprising the steps of:
 receiving an HU voice signal as the AU and HU participate in a call using the AU and HU communication devices, respectively;
 transcribing HU voice signal segments into verbatim caption segments that accurately represent the words spoken by the HU to generate the voice signal segments;
 presenting each verbatim voice signal segment via the AU communication device display for consumption;
 for each of at least a subset of the verbatim caption segments:
 (i) processing the verbatim caption segment to identify an intended communication (IC) wherein the IC is the communication intended by the HU upon uttering an associated one of the HU voice signal segments;
 (ii) using the IC to generate an enhanced caption segment that is different than the associated verbatim caption segment;
 (iii) receiving a user selection via the AU communication device selecting one of the verbatim caption segments presented on the AU communication device display; and
 (iv) in response to receiving the selection, presenting the enhanced caption segment that is associated with the selected verbatim caption segment via the AU communication device display simultaneously with the selected verbatim caption segment.

\* \* \* \* \*

UNITED STATES PATENT AND TRADEMARK OFFICE
CERTIFICATE OF CORRECTION

| | |
|---|---|
| PATENT NO. | : 12,035,070 B2 |
| APPLICATION NO. | : 17/984445 |
| DATED | : July 9, 2024 |
| INVENTOR(S) | : Christopher Engelke et al. |

It is certified that error appears in the above-identified patent and that said Letters Patent is hereby corrected as shown below:

In the Claims

Claim 1, Column 33, Line 54, "segments" should be --segment--.

Claim 1, Column 33, Line 55, "intended communications" should be --an intended communication--.

Claim 1, Column 33, Line 58-59, "enhanced captions" should be --an enhanced caption--.

Claim 14, Column 35, Line 35, "simultaneously" should be --in addition to--.

Claim 19, Column 35, Line 56, "Lasing" should be --using--.

Claim 19, Column 36, Line 10, "Littering" should be --uttering--.

Signed and Sealed this
Tenth Day of September, 2024

Katherine Kelly Vidal
*Director of the United States Patent and Trademark Office*